(12) United States Patent
Stanfield et al.

(10) Patent No.: US 12,328,018 B2
(45) Date of Patent: Jun. 10, 2025

(54) ELECTRIC VEHICLE (EV) FAST CHARGE STATION AND SYSTEM

(71) Applicant: THE NOCO COMPANY, Glenwillow, OH (US)

(72) Inventors: James Richard Stanfield, Glendale, AZ (US); Nitish Agrawal, Flagstaff, AZ (US)

(73) Assignee: The Noco Company, Glenwillow, OH (US)

( * ) Notice: Subject to any disclaimer, the term of this patent is extended or adjusted under 35 U.S.C. 154(b) by 668 days.

(21) Appl. No.: 17/644,829

(22) Filed: Dec. 17, 2021

(65) Prior Publication Data

US 2022/0115877 A1    Apr. 14, 2022

Related U.S. Application Data

(63) Continuation-in-part of application No. PCT/US2021/044321, filed on Aug. 3, 2021, which is a continuation of application No. 16/984,817, filed on Aug. 4, 2020, now Pat. No. 11,600,996, application No. 17/644,829 is a continuation-in-part of application No. 16/984,817, filed on Aug. 4, 2020, now Pat. No. 11,600,996, and a continuation-in-part of application No. 16/921,029, filed on Jul. 6, 2020, now Pat. No. 11,390,176, said application No. 16/984,817 is a continuation-in-part of application No. 16/018,411, filed on Jun. 26, 2018, now Pat. No. 10,730,396, said application No. 16/921,029 is a continuation-in-part of application No. 16/018,411, (Continued)

(51) Int. Cl.
*H02J 7/00* (2006.01)
*B60L 50/40* (2019.01)
*H01M 10/052* (2010.01)

(52) U.S. Cl.
CPC ............ *H02J 7/0018* (2013.01); *B60L 50/40* (2019.02); *H01M 10/052* (2013.01); *H01M 2220/20* (2013.01)

(58) Field of Classification Search
CPC ....................................................... H02J 7/00
See application file for complete search history.

(56) References Cited

U.S. PATENT DOCUMENTS 5,436,550 A    7/1995  Arakawa
8,785,023 B2   7/2014  Horne et al.
(Continued)

FOREIGN PATENT DOCUMENTS

EP    2538518    12/2012
GB    2572758    10/2019
(Continued)

OTHER PUBLICATIONS

European Patent Office, Appl. 21852396.7, Extended European Search Report, Jun. 10, 2024.
(Continued)

*Primary Examiner* — Robert Grant
(74) *Attorney, Agent, or Firm* — Jones Day

(57) ABSTRACT

An electric vehicle (EV) charging station for fast charging (e.g. 5 to 15 minutes) an electric vehicle (EV). The EV charging station can be configured to include one or more energy storage device comprising multiple electric reservoir modules.

30 Claims, 45 Drawing Sheets

Related U.S. Application Data filed on Jun. 26, 2018, now Pat. No. 10,730,396, which is a continuation of application No. PCT/US2018/024058, filed on Mar. 23, 2018.

(60) Provisional application No. 62/476,499, filed on Mar. 24, 2017.

(56) References Cited

U.S. PATENT DOCUMENTS

| | | | |
|---|---|---|---|
| 2007/0144605 A1 | 6/2007 | Horowitz | |
| 2008/0067974 A1 | 3/2008 | Zhang et al. | |
| 2010/0228415 A1 | 9/2010 | Paul | |
| 2011/0156672 A1 | 6/2011 | Gakhar et al. | |
| 2012/0074901 A1 | 3/2012 | Mohammed | |
| 2012/0139480 A1 | 6/2012 | Kaneko et al. | |
| 2012/0212174 A1 | 8/2012 | Ishikawa et al. | |
| 2012/0243958 A1 | 9/2012 | Guo | |
| 2013/0011704 A1 | 1/2013 | Horne et al. | |
| 2013/0049676 A1 | 2/2013 | Ishikawa et al. | |
| 2013/0059177 A1 | 3/2013 | De Jonghe et al. | |
| 2013/0113413 A1 | 5/2013 | Harty | |
| 2013/0221918 A1 | 8/2013 | Hill et al. | |
| 2013/0257146 A1 | 10/2013 | Nojima et al. | |
| 2014/0167694 A1 | 6/2014 | Gjinali et al. | |
| 2014/0191718 A1 | 7/2014 | Reineccius et al. | |
| 2015/0054460 A1 | 2/2015 | Epstein et al. | |
| 2015/0069970 A1 | 3/2015 | Sarkar et al. | |
| 2015/0183332 A1 | 7/2015 | Yun et al. | |
| 2015/0333512 A1 | 11/2015 | Saussele et al. | |
| 2016/0121735 A1* | 5/2016 | Sugano | H02J 7/342 320/109 |
| 2016/0165716 A1 | 6/2016 | Ido et al. | |
| 2016/0167678 A1 | 6/2016 | Jestin et al. | |
| 2016/0341773 A1 | 11/2016 | Reineccius et al. | |
| 2018/0037121 A1 | 2/2018 | Narla | |
| 2018/0109120 A1 | 4/2018 | Nakao | |
| 2018/0297477 A1 | 10/2018 | Stanfield | |
| 2020/0366104 A1 | 11/2020 | Stanfield | |

FOREIGN PATENT DOCUMENTS

| | | |
|---|---|---|
| JP | 2004-236469 | 8/2004 |
| JP | 2008-308030 | 12/2008 |
| JP | 2011-097825 | 5/2011 |
| JP | 2011-193716 | 9/2011 |
| JP | 2012-034554 | 2/2012 |
| JP | 2012-172500 | 9/2012 |
| JP | 2013-027177 | 2/2013 |
| JP | 2013-192310 | 9/2013 |
| JP | 2014-230301 | 12/2014 |
| JP | 2015-109724 | 6/2015 |
| JP | 2016-111748 | 6/2016 |
| JP | 2016-214014 | 12/2016 |
| JP | 2020-512802 | 4/2020 |
| WO | WO 2013/137232 | 9/2013 |
| WO | WO 2014/068733 | 5/2014 |
| WO | WO 2014/184729 | 11/2014 |
| WO | WO 2015/083578 | 6/2015 |
| WO | WO 2021/092658 | 5/2021 |

OTHER PUBLICATIONS

Patent Cooperation Treaty, PCT/US2022/074459, International Preliminary Report on Patentability, Jun. 27, 2024.
UK Intellectual Property Office, Appl. GB2300471.6, Examination Report, Jun. 24, 2024.
IP India, Appl. 202337001369, Examination Report, Jan. 25, 2024.
IP Australia, Appl. 2021322105, Examination Report No. 1, Feb. 6, 2024.
IP Australia, Appl. 2021240310, Examination Report No. 3, May 12, 2023.
Patent Cooperation Treaty, PCT/US2021/044321, International Preliminary Report on Patentability, Feb. 16, 2023.
IP Australia, Appl. 2021322105, Examination Report No. 2, Apr. 5, 2024.
Japan Patent Office, Appl. 2023-506528, Notice of Reasons for Refusal, Mar. 12, 2024.
IP Australia, Appl. 2018237596, Examination Report No. 1, May 20, 2020.
IP Australia, Appl. 2018237596, Examination Report No. 2, May 18, 2021.
IP Australia, Appl. 2021240310, Examination Report No. 1, Aug. 11, 2022.
IP Australia, Appl. 2021240310, Examination Report No. 2, Oct. 25, 2022.
Canada Intellectual Property Office, Appl. 3,056,907, Examination Report, Nov. 3, 2020.
European Patent Office, Appl. 20182706.0, European Search Report, Jul. 17, 2020.
European Patent Office, Appl. 21198999.1, European Search Report, Oct. 16, 2021.
Japan Patent Office, Appl. 2019-552118, Notice of Reason of Refusal, Jan. 7, 2021.
Japan Patent Office, Appl. 2021-123444, Notice of Reason of Refusal, Jul. 5, 2022.
Patent Cooperation Treaty, PCT/US2018/024058, International Search Report, Jun. 14, 2018.
Patent Cooperation Treaty, PCT/US2022/074459, International Search Report and Written Opinion, Jan. 2, 2023.
Canada Intellectual Property Office, Appl. 3,127,239, Examination Report, Apr. 14, 2023.
Japan Patent Office, Appl. 2023-506528, Notification of Reasons for Refusal, Sep. 3, 2024.
Canada Intellectual Property Office, Appl. 3,222,488, Examination Report, Feb. 24, 2025.

* cited by examiner

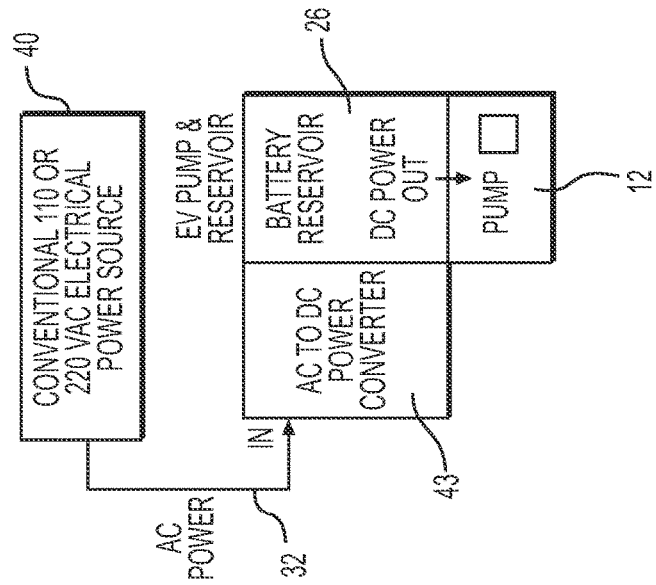
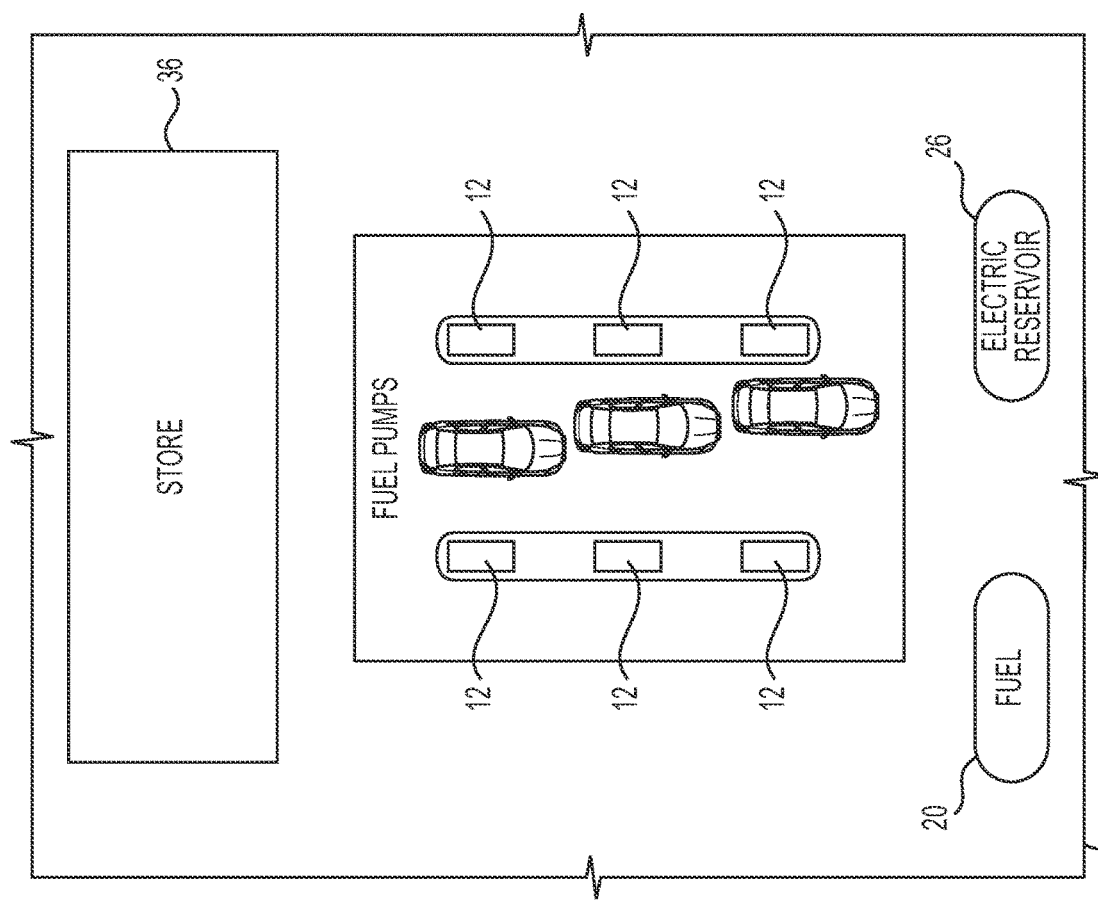
FIG. 3
FIG. 2

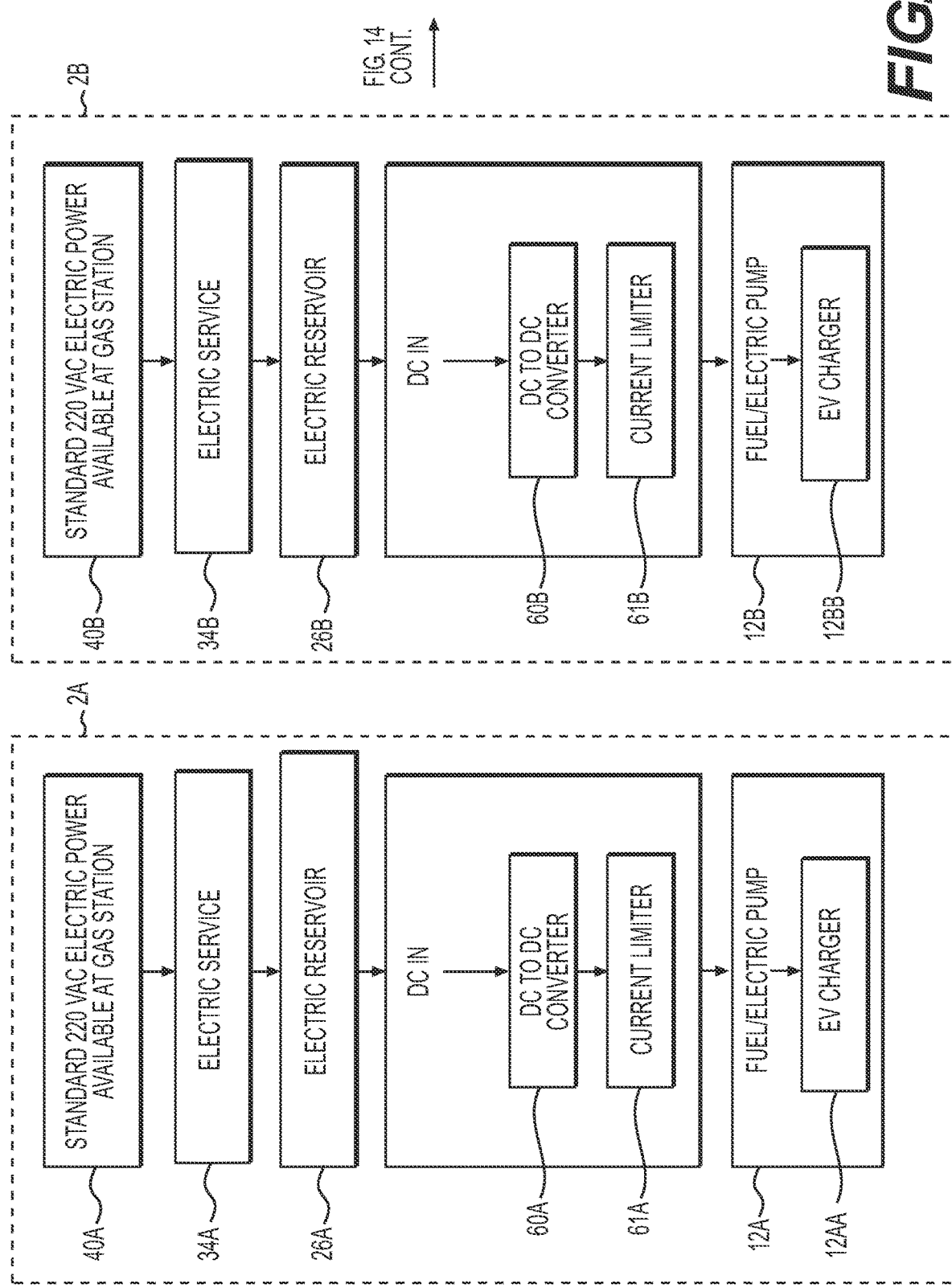

| BATTERY MODULE SPECIFICATIONS | |
|---|---|
| BATTERY TYPE | NOCO DUAL USE INDUSTRIAL BATTERY |
| BATTERY CHEMISTRY | LITHIUM POLYMER: COBALT, PLUS NMC |
| # OF INDIVIDUAL CELLS | TBD |
| # OF BATTERY UNITS | 7 |
| BATTERY MODULE CONFIGURATION | 7S1P |
| BATTERY MODULE NOMINAL VOLTAGE | 90 |
| BATTERY PACK C-RATING (1-SECONDS) | 20C |
| BATTERY PACK CONTINUOUS RATING | 3C |
| BATTERY PACK BURST CURRENT (3-SECONDS) | |
| FAST CHARGE DEMO | TBDA |
| BATTERY PACK CAPACITY | |
| FAST CHARGE DEMO | 120Ah |
| BATTERY PACK WATT-HOURS | |
| FAST CHARGE DEMO | 10.08KWh |
| BATTERY LIFE AND COMPLIANCE | |
| BATTERY LIFECYCLE | >1000 CYCLES |
| BATTERY APPROVALS | UN38.3, IEC 62133, RoHS, IATA, UL 1642 |

*FIG. 21*

| CABLING SPECIFICATIONS | |
|---|---|
| CABLING STRUCTURE | |
| TBD | |
| | |
| | |
| | |
| CABLE CLAMPS | |
| TBD | |
| | |
| | |
| | |
| CABLE SIZE | |
| TBD | 8 AWG |
| | 8 AWG |
| | 6 AWG |
| | 4 AWG |
| CABLE LENGTHS | |
| TBD | |
| ADDITIONAL CABLE INFORMATION | |
| CABLE INSULATION | SILICONE, UL APPROVED |
| CABLE TEMPERATURE RATING | -40°C TO +200°C |
| CABLE IMPRINTING | NOCO TO PROVIDE ARTWORK. ARTWORK INCLUDES FONT TYPE, FONT SIZE, AND FONT COLOR. |

*FIG. 22*

| ADDITIONAL PRODUCT SPECIFICATIONS | |
|---|---|
| IP RATING | IP65 |
| OPERATING TEMPERATURE | -20°C TO 60°C |
| STORAGE TEMPERATURE | -XX°C TO XX°C |
| PLASTIC HOUSING | POLYCARBONATE (PC) |
| PLASTIC COLOR(S) | SEE DESIGN FILE |
| RETAIL PACKAGING | ARTWORK AND SPECIFICATIONS |
| INNER AND MASTER CARTONS | ARTWORK AND SPECIFICATIONS |
| SERIAL NUMBERING | ARTWORK AND SPECIFICATIONS |
| WARRANTY | VIA RMA ALLOWANCE |
| PRODUCT COMPLIANCE | CE, FCC, CTICK, UN38.3, IATA, UL2743, ROHS, WEEE |

*FIG. 23*

| DUAL USE BATTERY SPECIFICATIONS | |
|---|---|
| MODEL | DEMO |
| RATED CAPACITY | 120Ah |
| WATT-HOURS | 1.44KWh |
| CONFIGURATION | 4S4P |
| NOMINAL VOLTAGE | 12V |
| CONTINUOUS DISCHARGE C-RATING | 2C |
| CONTINUOUS DISCHARGE CURRENT | 220A |
| BURST C-RATING (1-SECONDS) | 20C |
| BURST AMPERAGE (1-SECONDS) | 1200A |
| MAXIMUM CHARGE VOLTAGE | 14.4V |
| DISCHARGE VOLTAGE CUTOFF | 9.2V |
| COLD CHARGE CURRENT (-0°C TO -15°C) | 1.0A (CONSTANT-CURRENT) TO 16.8V, 0.1A (CONTACT-VOLTAGE) TO 16.8V |
| RAPID CHARGE CURRENT | 4.0A (CONSTANT-CURRENT) TO 16.8V, 0.1A (CONTACT-VOLTAGE) TO 16.8V |
| INTERNAL RESISTANCE | >15 mOhm |
| OPERATING CHARGE TEMPERATURE | 0°C TO 45°C |

*FIG. 24*

SAE J1772-2009 ELECTRIC VEHICLE CONNECTOR.

COMPARISON BETWEEN EXTENDED COMBO2 - DC CHARGER (LEFT) AND NORMAL TYPE 2 - 1-3 PHASE AC CHARGER (RIGHT).

| HOT INDICATOR | |
| --- | --- |
| TEMPERATURE RANGE | LED INDICATION |
| 40°C OR BELOW | OFF. |
| 40°C TO 59°C | ON SOLID. |
| GREATER THAN 60°C | FLASHES AT 2Hz. DO NOT ALLOW BATTERY CHARGING OR DISCHARGING |

*FIG. 39*

ELECTRIC VEHICLE (EV) FAST CHARGE STATION AND SYSTEM

FIELD

The present invention is directed to a fast charge electric vehicle (EV) charge station and system, for example, for high speed charging or recharging of electric vehicles (EVs). The fast charge or recharge electrical vehicle (EV) station and system, for example, can be configured to provide both high speed charging or recharging of electric vehicles (EVs), and filling of fuel powered vehicles.

BACKGROUND

Electric vehicles (EVs) have grown in use around the world with a strong interest in clean emissions, quiet driving, and low maintenance. Advancements in battery technology have supported improvements in vehicle speed as well as driving distance. Battery charging has improved to help support this growth and provide recharging times as low as two hours for a complete charge of large EV batteries (e.g. as in Chevrolet Volt or Tesla Model S). The push to improve recharge times has driven battery manufacturers to improve technology and provide "fast charge" capability in their batteries. The goal is to allow EV cars to recharge in close to the same time as refueling a gasoline vehicle (e.g. 10-15 minutes).

A problem arises with fast recharging of large vehicle batteries because of the large amount of AC Power required from the utility power grid for each (or multiple) vehicle(s) during recharge. For example, a normal size sedan such as a Chevrolet Volt could require power as high as 350 KW during the recharge process to achieve targeted recharge times. This power requirement when multiplied by several vehicles being charged simultaneously would require a huge AC power source (such as utility power grid infrastructure to support a large industrial load, followed by AC/DC conversion) at the recharging site. This type of AC power source is not available at many locations. The power surges during recharging also cause problems with the utility companies' ability to predict power requirements in specific locations. Adding to this particular problem is the sparse locations of recharge stations. EV recharge pumps must be available at gas stations to allow the EV market to grow.

SUMMARY

To provide sufficient power at most locations, power must be stored and/or generated in a controlled, even manner using one or more storage capacity "electric reservoir" or "battery reservoir" or "energy reservoir" or "power reservoir." This one or more electric reservoirs can then be used as a main recharge energy source for recharging the electric vehicles (EVs). Battery technology already exists to support the "reservoir" requirement. Several different electric power storage technologies can be used, including flow batteries, lithium-ion batteries, power storage capacitors (e.g. ultra capacitors) and/or fuel cells. Other electromechanical technologies such as flywheel energy storage can also be used. The one or more electric reservoirs, for example, can be placed underground in a similar fashion currently used for storing fuel (e.g. gasoline, diesel) at a gas station and/or it can be located above ground.

The one or more electric reservoirs can be charged using power that already exists at a conventional gas station. Using this method allows the utility company to predict and accommodate the power usage and avoid power surges. For example, the one or more electric reservoirs can be recharged continuously, intermittently, variably, or in a programmed manner from an electrical power source (e.g. existing power source(s), new power source(s), electrical power grid, power transmission line(s), power distribution system, power station, electrical generator, fuel type electrical generator, solar, solar panels, solar photovoltaic, thermal, solar thermal, wind power generators, wind mills).

The energy stored in the electric reservoir can be used as the power source for recharging the electric vehicle(s) at the station. A recharge unit (e.g. electric pump) very similar (in physical size and form) to a conventional gas pump can be used to make the proper conversion of power required for charging the EV. Since the power source for an EV is a DC battery and the electric reservoir can be a DC electric reservoir (e.g. DC flow battery, DC Li-ion battery, DC Li-ion battery array), the power conversion required can simply be direct or a DC to DC conversion, avoiding the power losses with AC to DC conversions used in most battery chargers today.

The energy generated by a power generator (e.g. electrical power generator) can also be used, with or without the electrical reservoir, as the power source for recharging the electric vehicle(s) at the station. The power generator can be located on-site (i.e. located at the station) or off-site (i.e. located off the station premises, however, nearby or at a distance from the station premises). The power generator can be installed on the premises of the station, or can be a portable power generator. For example, the power generator can be partially or fully contained within a cargo container, or a similarly constructed container, that can be transported and installed at the station as a power generator unit providing significant power output. Further, the power generator can be a single power generator or multiple power generators (e.g. connected together to provide a power station).

The operator of the recharging station can charge customers for recharging their EVs in a same or similar manner to gasoline customers. They will be able to work with the utility company on the costs for keeping the reservoir charged as well as amortize the costs for adding/supporting the reservoir and EV Chargers or EV Pumps (e.g. electric chargers or outlets). The operator can build in profits required and charge the EV customers accordingly. This removes the burden for utility companies of having to provide industrial sized power grid infrastructure, such as additional towers, power lines, substations, which might be impractical for most locations.

Using a reservoir approach allows a conventional gas station to be converted by simply adding an EV Charger or EV Pump (e.g. refueling EV pump) or multiple EV Chargers or EV Pumps to provide fast charging of EV(s). This fast charging will allow EVs to easily travel across country just like a gasoline fueled vehicles do today, which will allow EVs to become more mainstream.

The presently described subject matter is directed to a station for refueling fuel vehicles and/or recharging electric vehicles.

The described subject matter is directed to an electric recharge station.

The presently described subject matter is directed to an electric/fuel station.

The presently described subject matter is directed to an improved gas station comprising or consisting of both gas pumps and electric pumps or EV chargers.

The presently described subject matter is directed to an electric recharge/fuel station comprising or consisting of at least one fuel pump and at least one electric pump or EV charger.

The presently described subject matter is directed to an electric recharge/fuel station comprising or consisting of at least one fuel pump and at least one electric pump or EV charger.

The presently described subject matter is directed to an electric recharge/fuel station comprising or consisting of at least one fuel pump and at least one electric pump or charger, wherein the at least one fuel pump is spaced apart a predetermined distance from the at least one electric pump or charger.

The presently described subject matter is directed to an electric recharge/fuel station comprising or consisting of at least one fuel pump and at least one electric pump or charger, wherein the at least one fuel pump and at least one electric pump or charger are provided in a single unit.

The presently described subject matter is directed to a fuel/electric station comprising or consisting of at least one fuel pump and at least one electric pump or charger, wherein the at least one fuel pump and at least one electric pump or charger are separate units.

The presently described subject matter is directed to a fuel/electric station comprising or consisting of multiple fuel pumps and multiple electric pumps or EV chargers.

The presently described subject matter is directed to a fuel/electric station comprising or consisting of multiple fuel pumps locate and multiple electric pumps or chargers, wherein the fuel pumps are located in at least one row and the electric pumps or chargers are located in at least one another row.

The presently described subject matter is directed to a fuel/electric station comprising or consisting of at least one electric reservoir.

The presently described subject matter is directed to a fuel/electric station comprising or consisting of multiple electric reservoirs.

The presently described subject matter is directed to a fuel/electric station comprising or consisting of at least one onsite electric reservoir.

The presently described subject matter is directed to a fuel/electric station comprising or consisting of at least one electric reservoir located below ground level.

The presently described subject matter is directed to a fuel/electric station comprising or consisting of multiple electric reservoirs located below ground level.

The presently described subject matter is directed to a fuel/electric station comprising or consisting of at least one electric reservoir located above ground level.

The presently described subject matter is directed to a fuel/electric station comprising or consisting of multiple electric reservoirs located above ground level.

The presently described subject matter is directed to a fuel/electric station comprising or consisting of at least one electric reservoir.

The presently described subject matter is directed to a fuel/electric station comprising or consisting of multiple electric reservoirs.

The presently described subject matter is directed to a fuel/electric station comprising or consisting of at least one onsite electrical reservoir.

The presently described subject matter is directed to a fuel/electric station comprising or consisting of multiple onsite electric reservoirs.

The presently described subject matter is directed to a fuel/electric station comprising or consisting of at least one electrical reservoir located below ground level.

The presently described subject matter is directed to a fuel/electric station comprising or consisting of multiple electric reservoirs located below ground level.

The described subject matter is directed to a fuel/electric station comprising or consisting of at least one electric reservoir located above ground level.

The presently described subject matter is directed to a fuel/electric station comprising or consisting of multiple electric reservoirs located above ground level.

The presently described subject matter is directed to a fuel/electric station comprising or consisting of at least one fuel tank and at least one electrical reservoir located below ground level.

The presently described subject matter is directed to a fuel/electric station comprising or consisting of multiple fuel tanks and multiple electric reservoirs located below ground level.

The presently described subject matter is directed to a fuel/electric station comprising or consisting of at least one gas tank and at least one electric reservoir located below ground level, wherein the at least one gas tank and at least one electric reservoir are spaced apart at least a predetermined distance.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir.

The presently described subject matter is directed to an electric vehicle (EV) charging station for charging an electric vehicle (EV), the EV charging station comprising or consisting of at least one power source; a plurality of electrical services receiving power from the at least one power source; a plurality of primary electric reservoirs receiving power, respectively, from the plurality of electrical services; a plurality of secondary electric reservoirs receiving power, respectively, from the first primary electric reservoirs; and a plurality of EV chargers receiving power, respectively, from the plurality of secondary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising a tertiary electric reservoir receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of primary electric reservoirs, and the EV charger is a plurality of EV chargers receiving power, respectively, from the plurality of secondary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of electric primary electric reservoirs, the tertiary electric reservoir is a plurality of tertiary electric reservoirs receiving power, respectively, from the plurality of secondary electric reservoirs, and the EV charger is a plurality of EV chargers receiving power, respectively, from the plurality of tertiary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the EV charger.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the EV charger, wherein the EV charger comprises a fourth DC to DC power converter for converting DC power to DC power for supplying DC power to the EV.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir, further comprising a third DC to DC power converter receiving DC power from the tertiary electric reservoir and converting the DC power to DC power for supplying DC power to the EV charger.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir, further comprising a third DC to DC power converter receiving DC power from the tertiary electric reservoir and converting the DC power to DC power for supplying DC power to the EV charger, wherein the EV charger comprises a fifth DC to DC power converter for converting DC power to DC power for supplying DC power to the EV.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises a flow battery.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises a Li-ion battery.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises an electrical storage capacitor.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir. The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the EV charging station is configured to selectively or simultaneously provide power for charging the EV from the electrical source, primary electric reservoir and/or the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the EV charging station is configured to selectively or simultaneously provide power for charging the EV from the electrical source, the primary electric reservoir, second electric reservoir and/or the tertiary electric reservoir.

BRIEF DESCRIPTION OF DRAWINGS

FIG. 2 is another diagrammatic view of the fuel/electric station shown in FIG. 1.

FIG. 3 is a diagrammatic view of the structure and arrangement of the fuel/electric station shown in FIG. 1.

FIG. 21 is a table showing base battery module specifications for the fast charge electric vehicle (EV) system according to the present invention.

FIG. 22 is a table showing cabling specifications for the fast charge electric vehicle (EV) system according to the present invention.

FIG. 23 is a table showing additional product specifications for the fast charge electric vehicle (EV) system according to the present invention.

FIG. 24 is a table showing dual use battery specifications for the fast charge electric vehicle (EV) system according to the present invention.

FIG. 39 is a table showing the specifications of a hot battery indicator for use in the base battery module.

DETAILED DESCRIPTION

Figure 1:
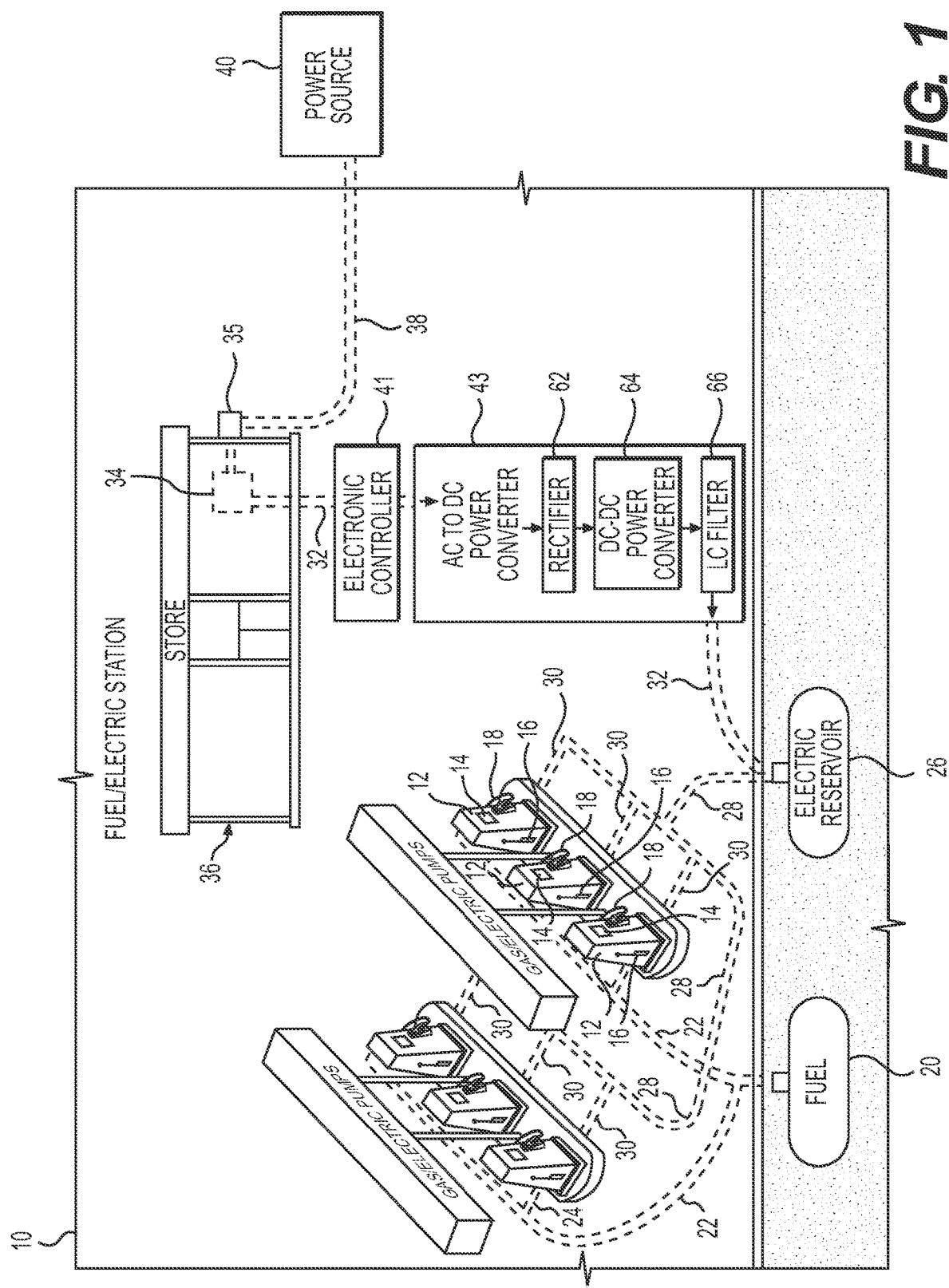
FIG. 1 is a diagrammatic view of a fuel/electric station according to the present invention.

A fuel/electric station 10 configured for providing both fuel for fuel type vehicles and fast charging of electric vehicles (EV) according to the present invention is shown in FIGS. 1 and 2. The fuel/electric station 10 is structured, arranged, and designed to 1) dispense fuel (e.g. gas, diesel, propane, liquid propane, hydrogen); and 2) charge or recharge electric vehicles (EVs).

The fuel/electric station 10 comprises multiple fuel/electric pumps 12 (e.g. gasoline pumps). The fuel/electric pumps 12 each comprise an electric vehicle charger or EV charger for recharging EVs and a fuel pump for refueling fuel type vehicles with fuel (e.g. gasoline, diesel, gas, propane, liquid propane, hydrogen). The fuel/electric pumps 12 each can comprise electrical components such as electrical components for charging EVs (e.g. EV charger, DC-DC converter, battery, Li-ion battery, power storage capacitors, fuel cells) and for refueling conventional fuel type vehicles, for example, having internal combustion engines (e.g. fuel pump, fuel meter, fuel filter, electrical control), for example, within a housing or compartment(s) of the fuel/electric pumps 12. The fuel/electric pumps 12 can include cooling equipment (e.g. fan, refrigeration, cooling circulation system), for example, to remove heat from housing, compartments, and electrical components.

The fuel/electric pumps 12 are shown in FIG. 1 as three (3) fuel/electric pumps 12 per row with two (2) rows. However, more or less fuel/electric pumps 12 can be provided in the rows, or more or less rows can exist.

Figure 7:
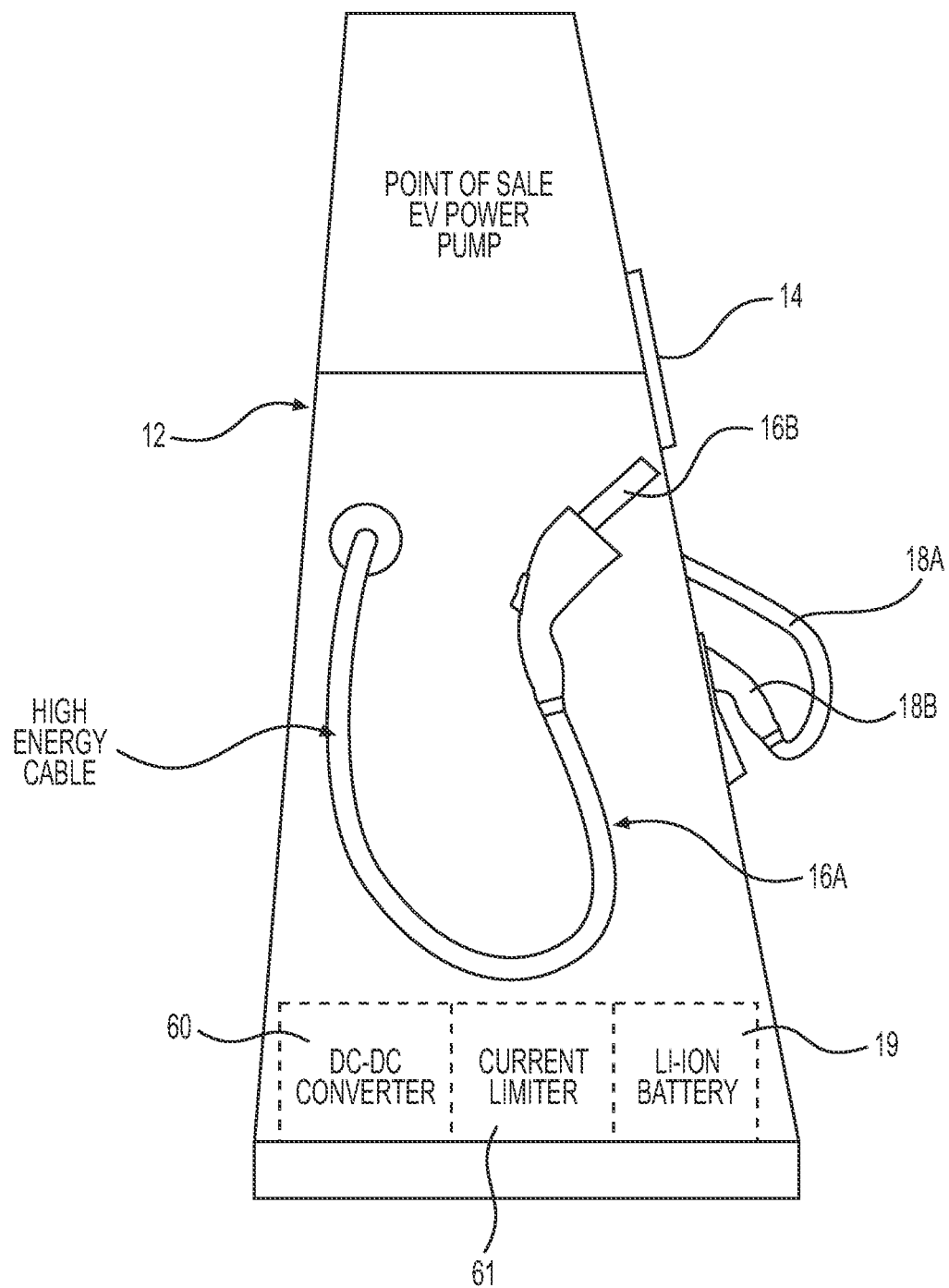
FIG. 7 is a side elevational view of a fuel/electric pump according to the present invention.

As shown in FIG. 7, the fuel/electric pumps 12 each have a display 14, electric charging cable 16A with an electrical connector 16B configured for EV hook up and recharging, a gas hose 18A fitted with a gas nozzle 18B, a DC-DC converter 60, a current limiter 61, and an internal Li-ion battery 19 (e.g. battery, batteries, power storage capacitors, fuel cells). Alternatively, the fuel/electric pumps 12 can be structured or configured as electric pumps configured to only charge EVs (i.e. "electric charging only" pumps) or structured or configured as fuel pumps configured to only pump fuel (i.e. "fuel filling only" pumps). The fuel pumps (e.g. gasoline pumps) can be spaced apart from the electric pumps comprising or consisting of EV chargers in various arrangements and/or locations on the premises of the fuel/electric station 10.

Again, the fuel/electric pumps 12 shown comprise the components or parts for both pumping gas and EV charging. For example, the fuel/electrical pumps 12 can comprise the Li-ion battery 19, power storage capacitors, fuel cells, electronic controller configured to control voltage and current supplied by the Li-ion battery 19 to the electric vehicle (EV), fuel pump components, and/or safety electronics (e.g. stop all dispensing, stop EV charging, stop fuel pumping, trigger Halon fire system, electrical spark suppression, operational lock out detection and controls for "fuel filling only" filling mode or "electric charging only" charging mode).

Again, the arrangement shown in FIGS. 1 and 2, can be modified with the rows of fuel/electric pumps 12 shown replaced with one or more rows of "fuel filling only" pumps and one or more rows of "electric charging only" pumps physically spaced apart and separate same for safety reasons (e.g. to prevent fuel vapor in proximity to electric equipment and potential electrical sparks). However, the fuel/electric pumps 12 can be configured or designed to provide electric spark suppression, high level of electrical grounding, redundant electrical grounding, separate compartments or containment structures for separate gas and electric operations, air venting or air or gas (e.g. nitrogen) circulation pumps, fans, and/or refrigeration to allow both gas and electric operations within the same fuel/electric pumps 12. Again, the fuel/electric pumps 12 can be configured or designed to only allow one mode of operation at a time, for example, with a time pause in-between operations to allow air venting or circulations pumps to remove any remaining fuel or fuel vapor to atmosphere after gas operation mode.

The fuel/electric station 10 comprises an underground fuel storage tank 20 connected to the individual fuel/electric pumps 12 via a main fuel supply line 22 connected to and supplying individual fuel lines 24 (i.e. fuel distribution arrangement and system). The fuel/electric station 10 further comprises an underground electric reservoir 26 connected to the individual fuel/electric pumps 12 via a main power line 28 connected to and supplying individual electric lines 30 (i.e. electric distribution arrangement and system). The fuel/electric station 10 is anticipated to provide high speed charging or recharging of electric vehicles (e.g. configured to charge or recharge electrical vehicles (EVs) in 5 to 15 minutes) in a similar time frame to filling up a fuel type vehicle with fuel.

As an alternative to the fuel/electric station 10 shown in FIGS. 1 and 2, multiple fuel tanks 20 and/or multiple electric reservoirs 26 can be provided at the fuel/electric station 10 to meet greater and/or peak demands. For example, the fuel/electric station can comprise or consist of multiple power subunits each comprising an electrical reservoir and multiple fuel/electric pumps 12.

The electric reservoir 26 can be an apparatus or device configured to store a large amount of electric power. For example, the electric reservoir 26 can be a battery, flow battery, Li-ion battery, Li-ion battery array (e.g. banks of batteries), power storage capacitors (e.g. ultra capacitors) and/or fuel cells. For example, the electric reservoir 26 can be a large flow battery or multiple Li-ion batteries (e.g. located adjacent to the fuel/electric pumps 12, located internally within fuel/electric pumps, and configured to fast charge EVs). The electric reservoir 26 can be designed, constructed, and sized to accommodate demand based upon the forecasted number of EVs to be recharged hourly, daily, weekly, monthly, and yearly schedules.

The electric reservoir 26 is supplied power via underground power line 32 connected to an electric service 34 (e.g. electrical service panel), for example, located in store 36 or other suitable location onsite the station. A high power service line 38 supplies power from a power source 40 (e.g. power grid, electric power grid, power station, electric power station, transmission line, electric transmission line, transmission station, electric transmission station, generator(s), electric generator(s), fuel generator(s), fuel powered generator(s), photovoltaic power generation system, solar panel(s), wind power, wind power generator(s)), energy storage equipment; power storage equipment, and other suitable power sources. A power meter 35 (e.g. located on side of store 36) can be provided to meter the incoming power from the power source 40.

Further, an electronic controller 41 can be provided in the power line 32 for controlling the charging of the electric reservoir 26 via the power line 32. For example, the electronic controller 41 can be a component or part of the electric reservoir 26 or a separate component or part (e.g.

located on the premises of the fuel/electric station 10). The electronic controller 41, for example, can be a programmable electronic controller.

In addition, an AC/DC converter 43 can be provided in the power line 32 for converting the incoming AC power into DC power for charging of the electric reservoir 26 via the power line 32, as shown in FIGS. 1 and 3. For example, the AC/DC converter 43 can be a component or part of the electric reservoir 26 or a separate component or part (e.g. located on the premises of the fuel/electric station 10).

The electric reservoir 26 can be recharged in various manners. For example, the electric reservoir 26 is continuously charged, intermittently charge, variably charged, charged on demand, and/or charged according to a program or algorithm. For example, the charging strategy can be to charge the electric reservoir 26 in a manner reducing or minimizing the demand (e.g. avoiding peak demand on the power source 40) while meeting the demand for charging the forecasted number of electric vehicles throughout the daily schedule. The program or algorithm can be configured to learn and store data on the amount of demand at a given time during each particular day throughout the year, season (e.g. summer, fall, winter, and spring), and holidays to update and improve the forecast for demand in the future.

The charging of the electric reservoir 26 can involve continuous charging the electric reservoir 26 at an even or varying rate. Alternatively, the electric reservoir 26 can be intermittently recharged at a fixed rate, and/or charged at different rates at different period of time. In any event, the intent is to structure and arrange the fuel/electric station 10 to provide enough power availability to always meet peak demands for recharging EVs at the fuel/electric station 10 while minimizing peak power demands on the power source 40.

Figure 4:
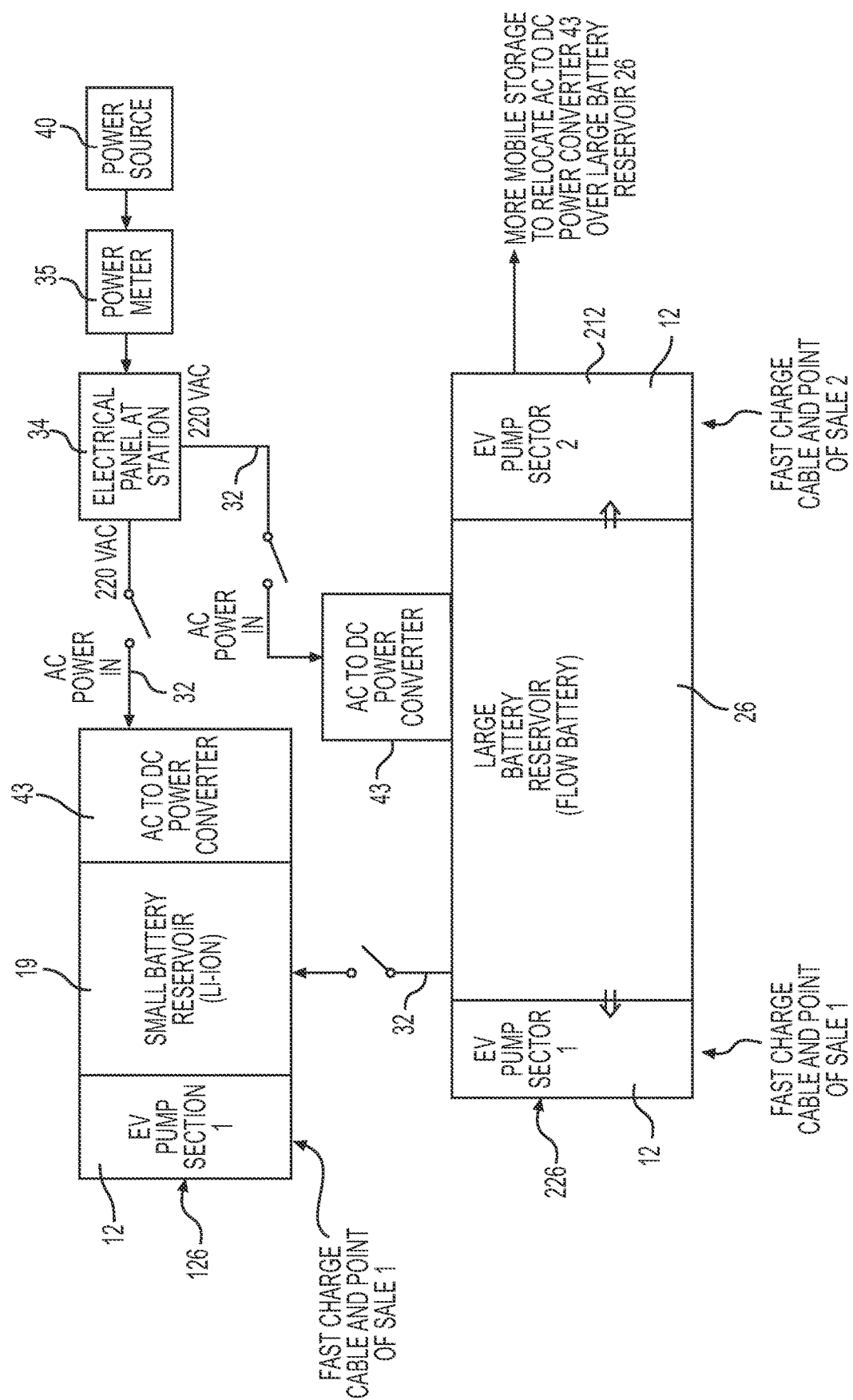
FIG. 4 is a diagrammatic view of the structure and arrangement of a fuel/electric station, for example, a portable fuel/electric vehicle (EV) station for use with the fuel/electric vehicle (EV) station shown in FIG. 1, or for use on a lot, for example, at a remote location.

The fuel/electric station 10 is shown in FIGS. 1-3, and/or another operation (e.g. a lot located at a different location, for example, a remote location) can be fitted with electrical power units 126, 226, as shown in FIG. 4. The electrical power units 126, 226 shown are structured and arranged for providing electric recharging only; however, the units 126, 226 can be modify to provide both fuel refueling for conventional fuel type vehicles or electric recharging for EVs. The electric power units 126, 226 can be connected to and powered, for example, by electric panel 34 of the fuel/electric station 10.

The portable version of electric power units 126, 226 can be portable electric power units. For example, a 20 foot mobile storage container can be fitted with an electric charging only pump 12, and a 40 foot mobile storage container can be fitted with two (2) electric charging only pumps 12. The portable power units 126, 226 can be transported to a site (e.g. new station site, local station site, remote station site), and connected up to start operations. The portable version of the electric power units 126, 226 can be particularly useful for providing temporary operation, remote operation, and provide inexpensive, reusable, or repositionable operation.

Figure 5:
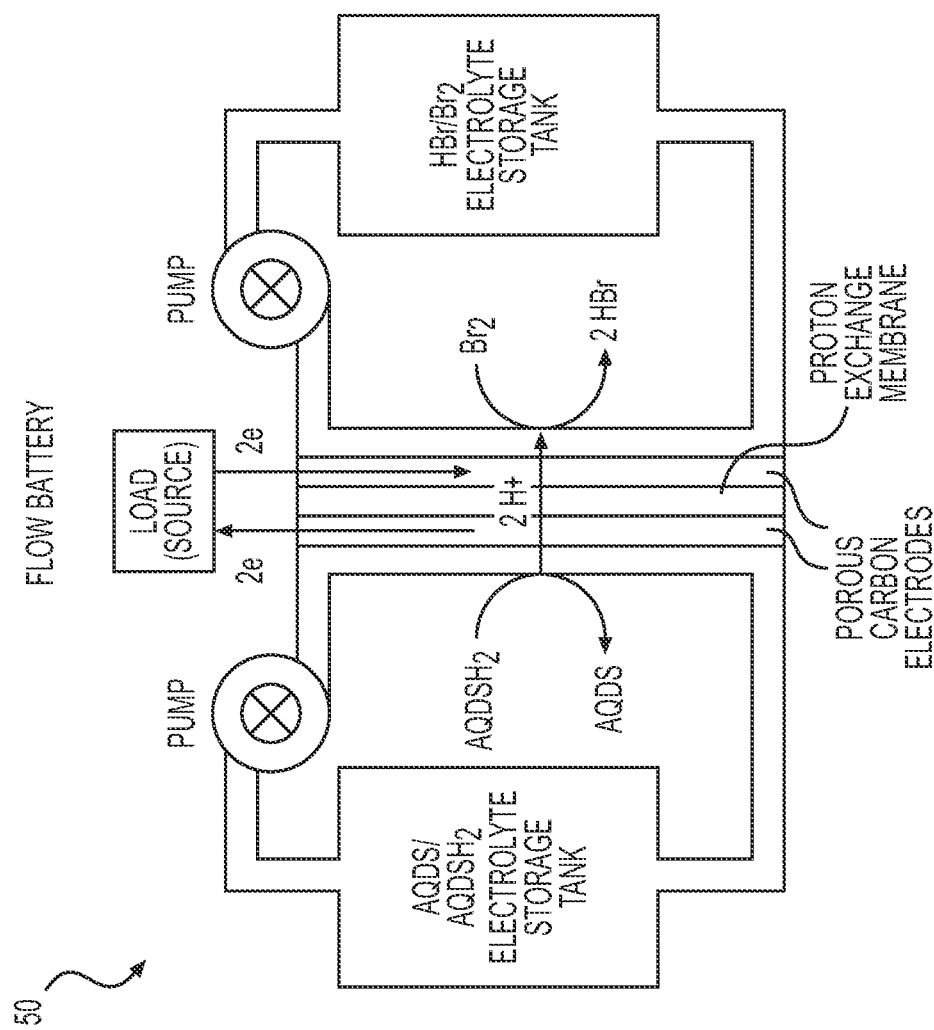
FIG. 5 is a diagrammatic view of a flow battery for use in the fuel/electric vehicle (EV) station shown in FIGS. 1-3.

The electric reservoir 26 shown in FIGS. 1-3, for example, can be a flow battery 50 shown in FIG. 5. Specifically, the flow battery 50 can be structured, configured, and or designed for use as the electric reservoir 26 in the fuel/electric station 10 shown in FIGS. 1-3 or the portable versions of the electric power units 126 and 226 shown in FIG. 3.

The flow battery 50, for example, comprises an AQDS/AQDSH electrolyte storage tank having a circulating pump, and an $HBr/BR_2$ electrolyte storage tank having another circulating pump along with a pair of spaced apart porous carbon electrodes separated by a proton exchange membrane. The flow battery 50 is connected to the electrical supply cable 32 (electric source) and the main power supply cables 22 leading to the fuel/electric pumps 12 to supply same.

Figure 6:
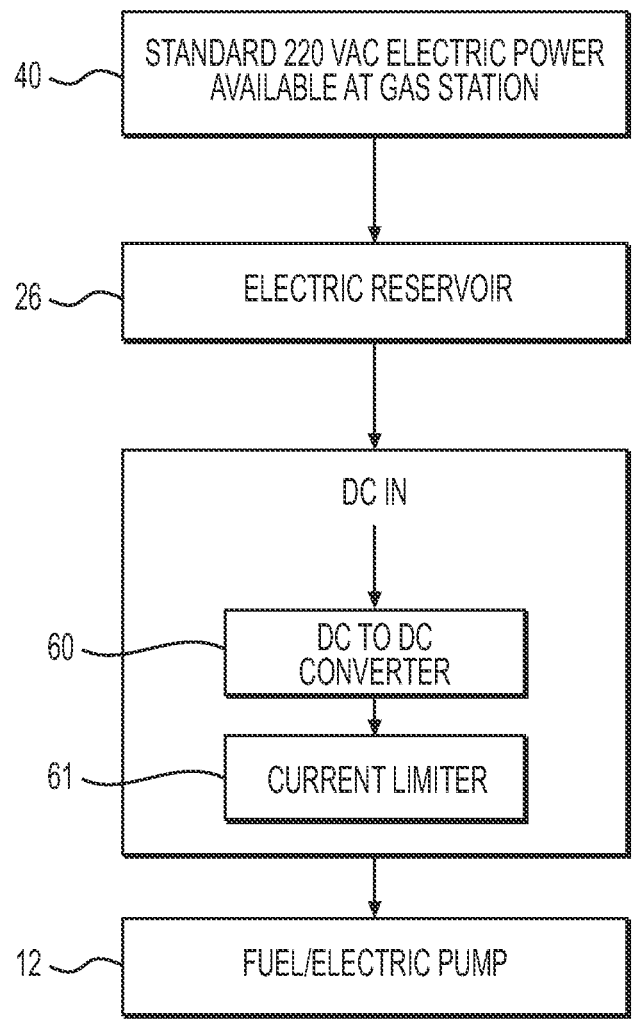
FIG. 6 is a flow chart showing power flow from the electric reservoir (e.g. flow battery, Li-ion battery, power storage capacitors, fuel cells) to the fuel/electric pump (e.g. EV pump, EV charger, and/or fuel pump).

As shown in FIG. 6, at least one DC to DC converter 60 can receive power from the electric reservoir 26 and then supply power to the fuel/electric pumps 12. The converter 60 can be a component or part of the electric reservoir 26 and/or a component or part of the fuel/electric pumps 12.

Flow Battery

Again, the electric reservoir 26 can be a one or more flow batteries 50. The open circuit voltage of a redox flow battery cell stack is directly proportional to the number of stacks in series, like any other battery.

For charging an EV battery, the voltage provided by the flow battery 50 must be adjustable to the level to which the EV battery needs to be charged to (e.g. may assume several different intermediate levels during the charge process). A properly designed DC-DC converter 60 (e.g. housed in the fuel/electric pump 12, as shown in FIG. 7) with appropriate sensing and feedback mechanisms, following the flow battery, provides for the desired voltage to charge the EV battery. For example, Tesla Model S has a battery voltage of approximately 350 VDC.

The voltage available from the electric reservoir 26 (e.g. flow battery 50) itself will depend on its configuration (i.e. number of cells in a stack, number of stacks in series). For instance, the following has been demonstrated with Vanadium flow batteries installed in 2009, including 3 cell stacks with 40 cells in each stack. The stacks are electrically connected in series, which gives a potential of about 165 V (Riso National Laboratory for Sustainable Energy Report, Riso-R-1753(EN), February 2011, Technical University of Denmark).

This voltage may be increased by adding more cell stacks in series. Another way to increase the voltage to the desired charge level is to use a power electronic boost converter in the DC-DC converter 60 present at the fuel/electric pump 12. The choice of topology to get to the desired charge voltage will depend on the economics of each option and the physical space (real estate) required by each option.

The output voltage of the DC-DC converter 60 will depend on the EV model being charged, which may have vastly different battery voltages or charge port form factor. It is conceivable that the DC-DC converter power electronics may be able to provide the required voltage level for a certain range of battery voltages. If the EV battery voltage requirement is beyond what a single DC-DC converter 60 design can provide or an entirely different charge port form factor, then a different pump type 212 will need to be provided, interfacing the same electric reservoir 26 (e.g. flow battery 50).

Any EV battery will need to be charged at a current level recommended by its manufacturer, which must not exceed a maximum current level to protect the EV battery and to limit the voltage drop in the cables connecting to the charge inlet port on the EV. The current limit function in the DC-DC converter 60 will provide that protection.

If the output voltage of the electric reservoir 26 (e.g. flow battery 50) is higher than the EV battery voltage, then the DC-DC converter 60 will be of the "buck" type, consisting of either MOSFET or IGBT type power electronic switches. Due to the high current involved during fast charging, it would be preferred to operate the switches with a low loss switching approach, such as "zero-voltage switching" and synchronous rectification. The DC-DC converter 60 would then simply consist of the power electronic switches arranged in a "half-bridge" followed by a current limiter 61 (e.g. LC filter) to reduce the voltage ripple caused by the power electronic switching mechanism.

If the output voltage of the electric reservoir 26 (e.g. flow battery 50) is lower than or close to the EV battery voltage, then the DC-DC converter 60 will have a first "boost" stage, followed by a "DC link" capacitor, followed by a "buck" stage and the LC filter. The "boost" stage steps up voltage available from the flow battery to a higher voltage, which is then down-converted to the EV battery voltage as required during the charge process. The operation of both the boost and buck stage would again be done while minimizing the losses in the converter.

The AC-DC power converter 43 located after the AC power source 40 supplying the electrical panel 40 or the cable 32 can incorporate a rectifier 62 stage followed by a DC-DC converter 64 stage. The rectifier 62 stage is needed to convert the AC voltage to a DC voltage. The DC-DC converter 64 or converter stage is required to convert the rectified (DC) voltage to the electric reservoir 26 voltage, as required during its charging process. The rectifier stage is typically of the full bridge "controlled rectifier" type implemented using MOSFET or IGBT type switches. The rectifier stage will be controlled to achieve "power factor correction" on its AC side to meet the power quality requirement set by the utility. The DC-DC converter 64 stage may be a "buck" type or a "boost" followed by a "buck" type, depending on whether the flow battery voltage is lower or higher, respectively, than the rectified voltage. The DC-DC converter 64 stage can include an LC filter 66 to remove the voltage ripple caused by the power electronic switching mechanism. Again, the power electronic switches will need to be operated to minimize the losses.

EV Power Pump High Energy Cable

The high energy cable 16A of the fuel/electric pump 12 (FIG. 7) will be capable of safely delivering 350 KW of power to recharge the electric vehicles. Large copper cables must be used to manage this much power. The power will be a combination of voltage and current. Electric vehicles today are being built using batteries as high as 350-400 VDC. In the future, this voltage is going to be higher to support longer driving distances as well as faster speeds. The charge currents are expected to be 400-500 amps to provide Fast Charge success.

The charge cable must be made using 0000AWG (approximately 0.5" diameter) or larger diameter to handle the charge currents required. The interface to the vehicle must be large conductors also. One large cable or two smaller cables can be used to provide the necessary power delivery. The advantage of two cables is they would make it easier to handle between the EV power pump and the EV. The two cables connection can also be used as a safety key for the charging process. More specifically, the EV power pump must detect solid connections of both conductors to enable the charge process to begin. An "electronic safety key/lock" will also be used to insure that the connection to the pump is a valid EV ready to be charged. This safety key can be part of the pumps safety software and the EV must provide a valid response in order for the pump to be enabled. In this way, the pump will never turn high power on to the cables unless it safely and clearly determines that a valid EV is connected and ready to charge.

The conductors between the EV power pump and the EV must be made of highly conductive heavy gauge metal such as copper or silver and must be a low corrosion type. The connectors at the end of the high energy cable 16A must not have any exposed metal parts for safety purposes, and if two cables are used the cables must be either interchangeable or must be keyed so they cannot be improperly inserted or connected.

Using high conductive cables and contacts will insure minimum energy losses during the critical charge process. It is very important that maximum energy (i.e. power times time) is delivered during the charge process.

Charge interruption safety will also be provided to protect against accidents such as a person trying to drive away during the charge process or even environmental accidents such as earthquakes. An Inhibit signal will be provided from the pump that the EV manufacturer can use to disable the EV from driving during the charge process. But just in case the cable is accidentally pulled out of the pump during the charge process, the pump will detect this condition and shut power off so that it is not available to the outside world.

A master shut off lever will also be provided that turns power off from the Battery Reservoir for safety purposes.

Maximum Power Sharing

Figure 8:
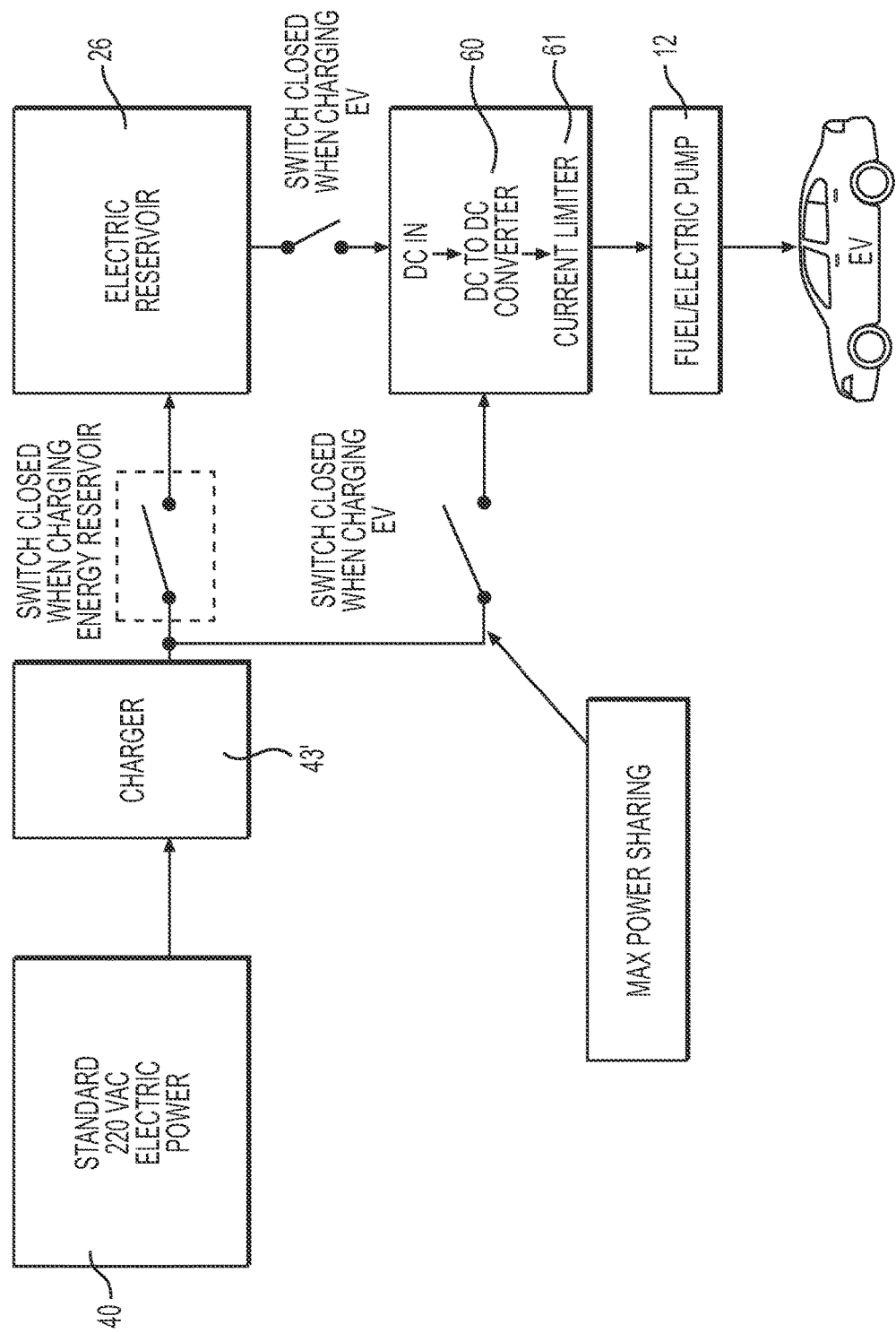
FIG. 8 is a diagrammatic view showing power sharing of the charging of an EV from the power source and the electric reservoir.

The high speed electric vehicle charge or recharge station and system according to the present invention can include a maximum power sharing function between charging the energy reservoir and charging the EV, as shown in FIG. 8.

If the electric reservoir 26 used, for example, is a Redox Flow Battery 50, it cannot be charged while delivering power to the output. This is because the pump flow changes direction accordingly. Because of this limitation, it is possible to utilize the extra power normally being used for charging the Redox Flow Battery to assist in charging the actual EV.

This feature allows for relay switching for selecting a charging target. During the time that there is no EV at the pump, the Redox Battery can be selected and continually charged. As soon as the EV is ready to be charged, the system can switch the selection over to provide maximum charge to the EV by delivering the power that was going to the energy reservoir to the EV.

It is noted that the charger 43' (FIG. 8) can comprise the AC TO DC POWER CONVERTER 43 shown in FIG. 1 along with other electrical components or parts to configure the charger 43' for charging the electric reservoir 26. Alternatively, the charger 43' can be a different type of charger compared to the AC TO POWER CONVERTER 43'.

Figure 9:
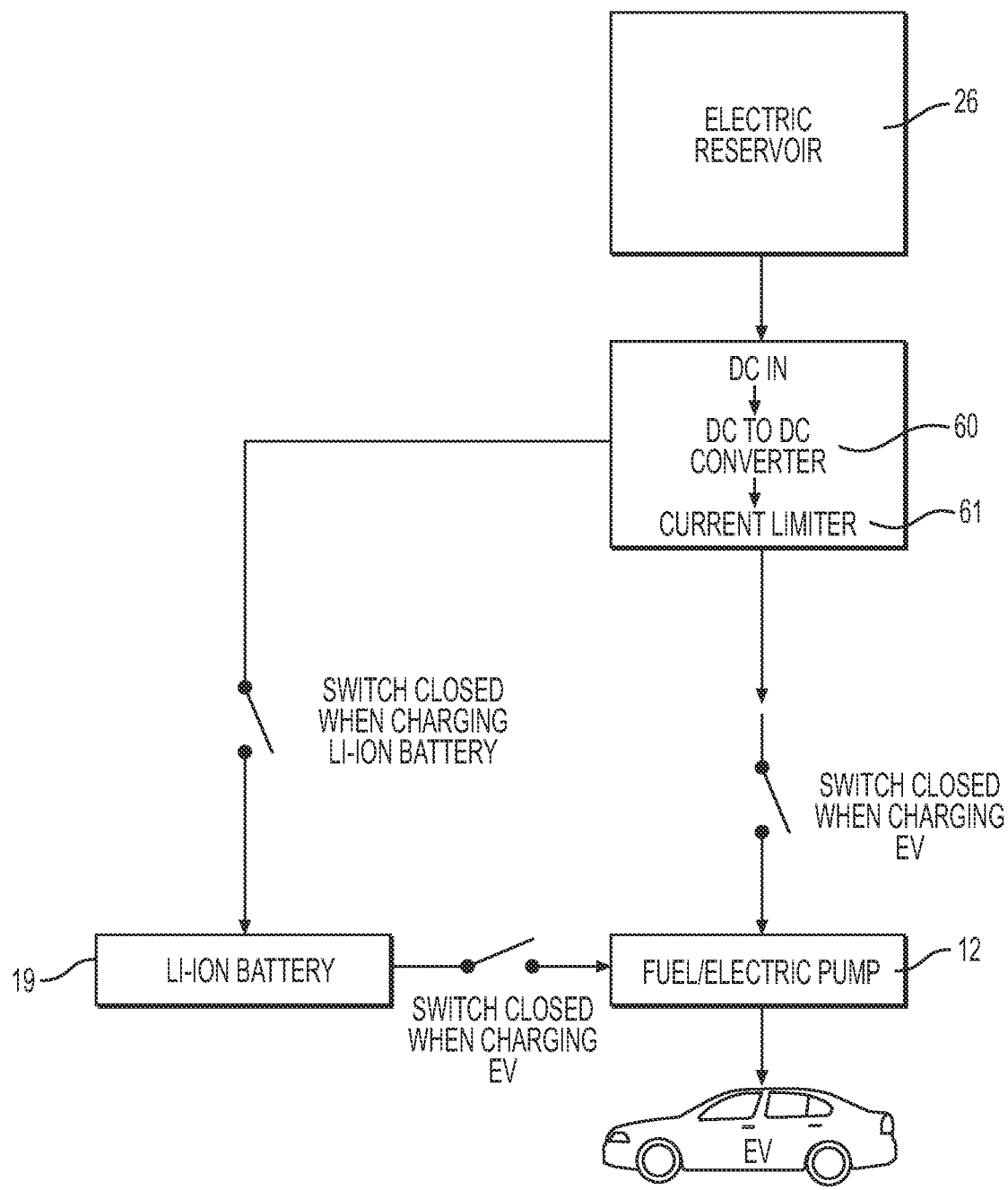
FIG. 9 is a diagrammatic view showing power sharing of the charging of an EV from the electric reservoir and/or Li-ion battery of the fuel/electric pump.
Figure 10:
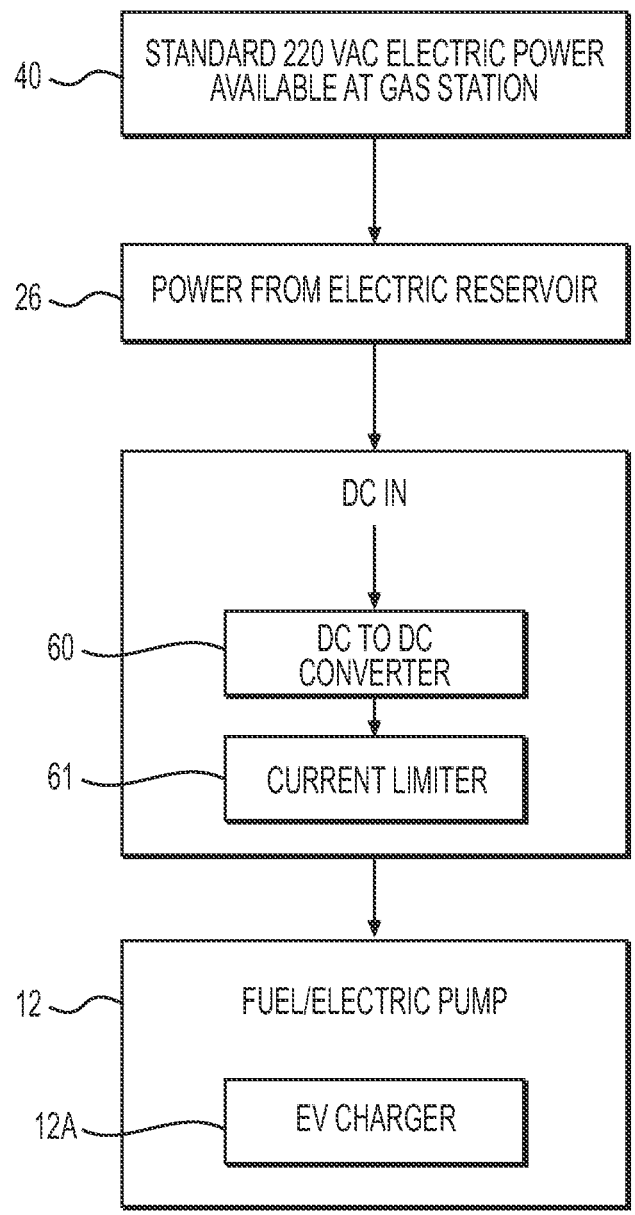
FIG. 10 is a flow chart showing power flow from the electric reservoir (e.g. flow battery, Li-ion battery, power storage capacitors, fuel cells) to the fuel/electric pump comprising a fuel pump and an EV charger.

This type of feature can be similarly applied to the fuel/electric pump 12, as shown in FIG. 9. The DC power from the electric reservoir 26 is directed to the DC-DC converter 60. The DC-DC power from the DC-DC converter 60 can be selectively used to charge the Li-ion battery 19 or can be used to charge the EV being charged by the fuel/electric pump 12. Alternatively, power from the DC-DC converter 60 and the Li-ion battery 19 can simultaneously be used to charge the EV due to the switching arrangement shown in FIG. 9.

The features of FIGS. 8 and 9 can be separate or combined together into the fuel/electric station 10.

Fuel/Electric Pump

The fuel/electric station 10 comprises a plurality of fuel/electric pumps 12. The fuel/electric pumps 12 can be configured in at least three (3) basic modes, including 1) configured for both EV charging and fuel filling; 2) configured for EV charging only; and 3) configured for fuel filling only.

The fuel/electric pumps 12 comprises an EV charger 12A, as shown in FIGS. 10-13. The EV charger 12A comprises electrical components for charging an EV, for example, a DC-DC converter.

Modular Power Subunits

Figure 14:
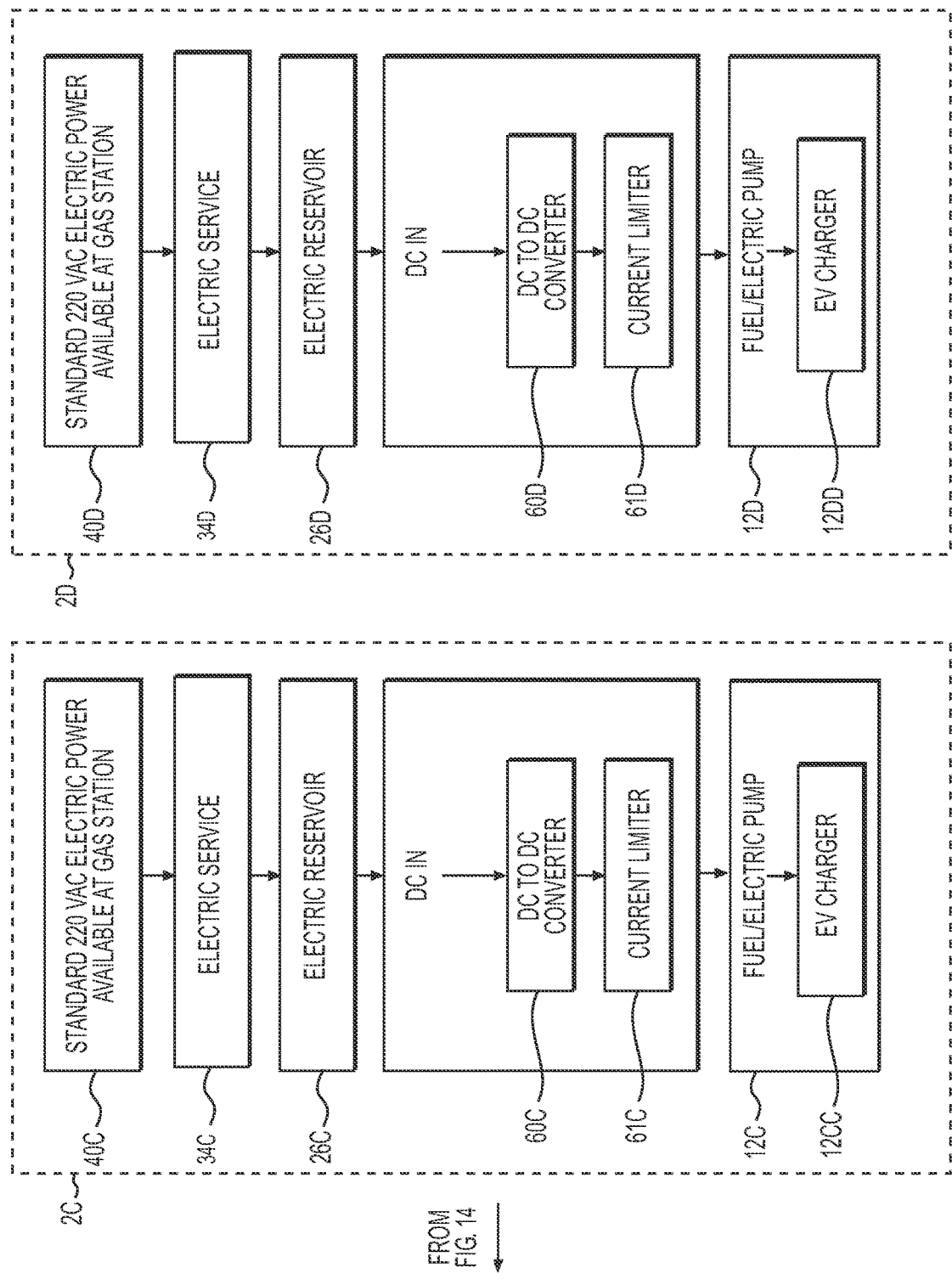
FIG. 14 is a diagrammatic view showing a fuel/electric station comprising of multiple (e.g. four (4)) modular power subunits.

The fuel/electric station 10 comprise one or more modular power subunits. For example, the fuel/electric station 10 comprises four (4) modular power subunits 2A, 2B, 2C, 2D, as shown in FIG. 14. The modular power subunits are configured to allow one or more additional modular power subunits to be added and installed in the fuel/electric station 10 to increase the charging capacity of the fuel/electric station. For example, the fuel/electric station 10 can comprise one or more modular power subunits (e.g. one (1) to one-hundred (100) modular power subunits 2 installed at one or more fuel/electric stations 10 located at one or more interconnected sites. For example, many modular power subunits can be supplied to a parking garage or interconnected parking garages to accommodate charging a large number or fleet of electrical vehicles.

The modular power subunits 2A, 2B, 2C, 2D can be supplied power from one or more power sources (e.g. one or more power supply lines from power grid, power stations, power generators, solar panels, wind power generators, power storage facilities or devices). For example, the modular power subunits 2A, 2B, 2C, 2D are provided power from four power sources 40A, 40B, 40C, 40D, as shown in FIG. 14 that are the same power source or different power sources.

The four (4) modular power subunits 2A, 2B, 2C, 2D, as shown in FIG. 14, are each provided with separate electrical services 34A, 34B, 34C, 34D.

Figure 11:
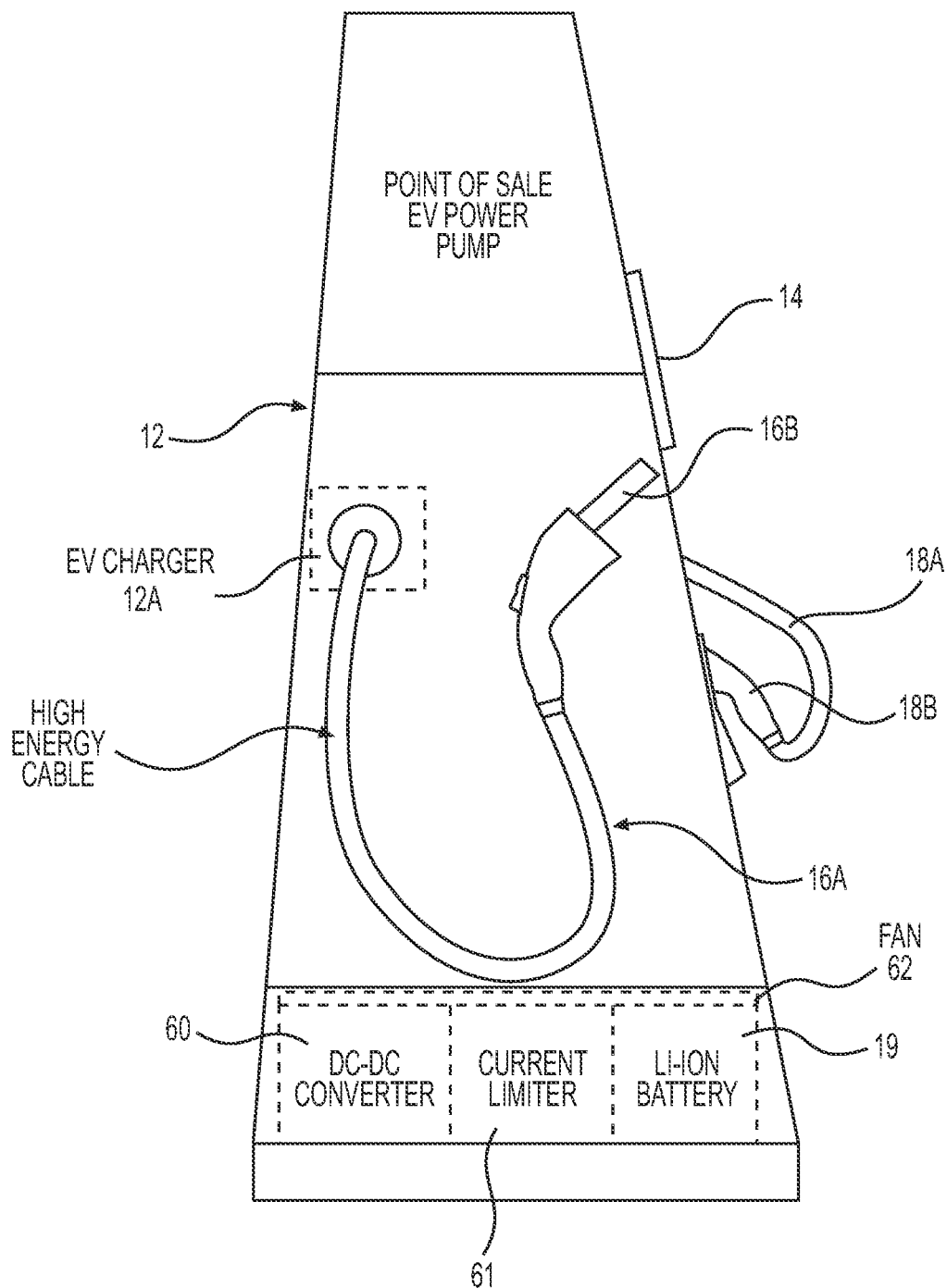
FIG. 11 is a side elevational view of a fuel/electric pump according to the present invention comprising a fuel pump and EV charger.
Figure 12:
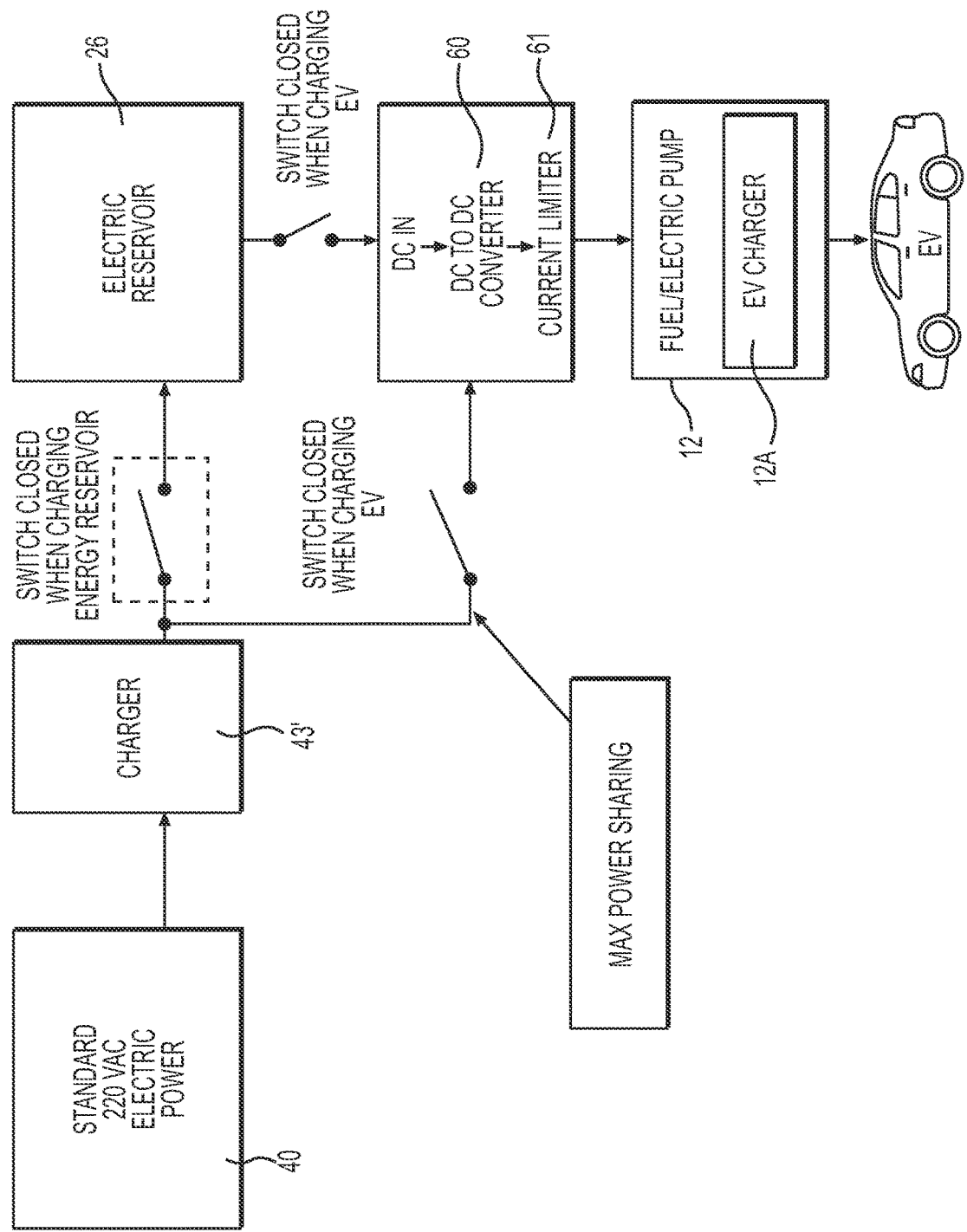
FIG. 12 is a diagrammatic view showing power sharing of the charging of an EV from a power source (e.g. power grid) and an electric reservoir.
Figure 13:
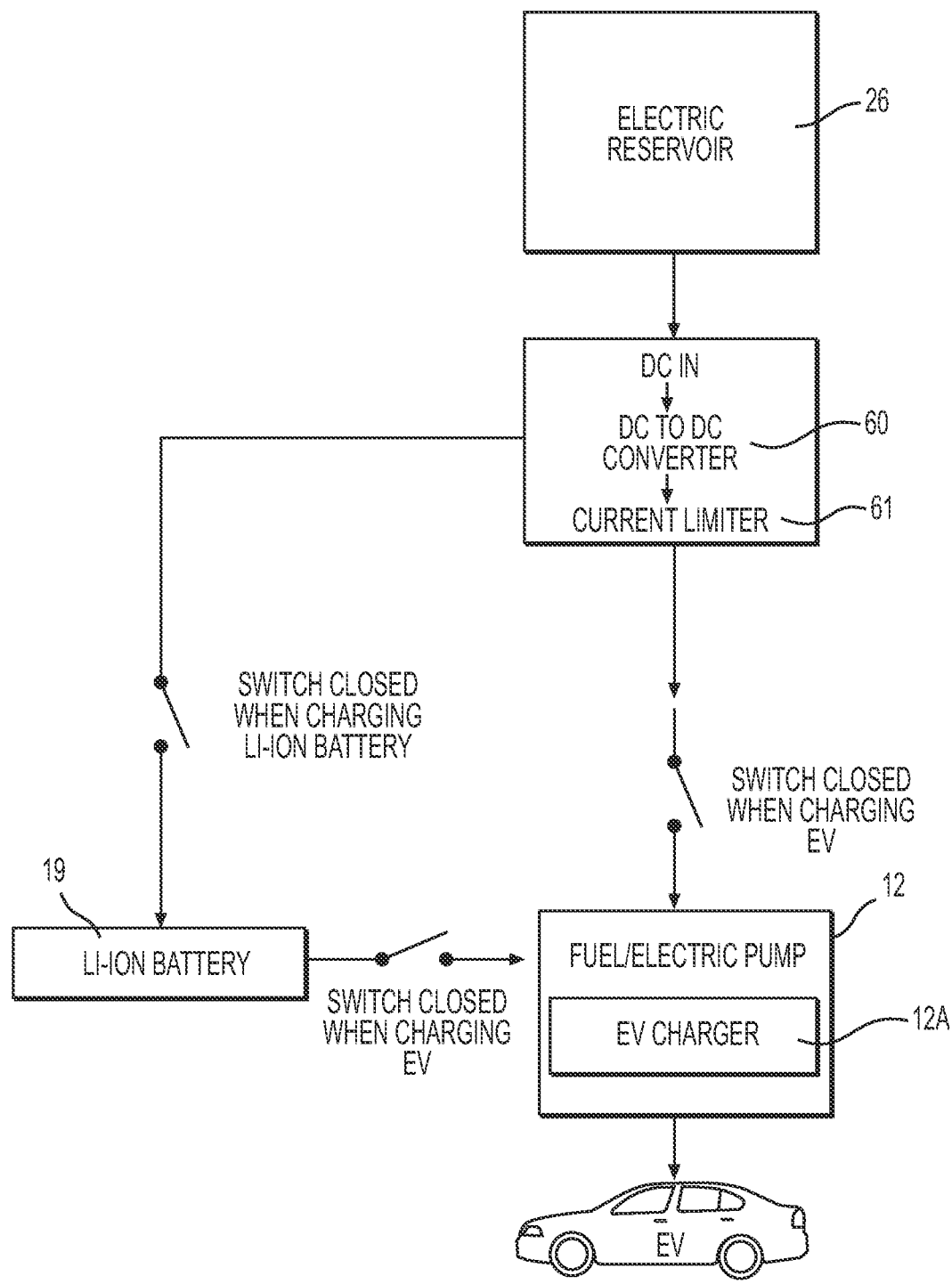
FIG. 13 is a diagrammatic view showing power sharing of the charging of an EV from the electric reservoir and the Li-ion battery of the fuel/electric pump.

The modular power subunits 2A, 2B, 2C, 2D, for example, comprise or consist of one or more electric reservoirs. In FIG. 14, the modular power subunits 2A, 2B, 2C, 2D comprise, respectively, electric reservoirs 26A, 26B, 26C, 26D. The fuel/electric pumps 12A, 12B, 12C, 12D, for example, each comprise a Li-ion battery 19 (FIG. 11).

The modular subunits, for example, are provided with various AC to DC and DC to DC converters to tailor power to particular components or parts of the fuel/electric station 10. For example, a DC to DC converter is provided upstream of each electric reservoir to tailor charging power for the particular electric reservoirs.

Multiple Levels of Electric Reservoirs

Figure 15:
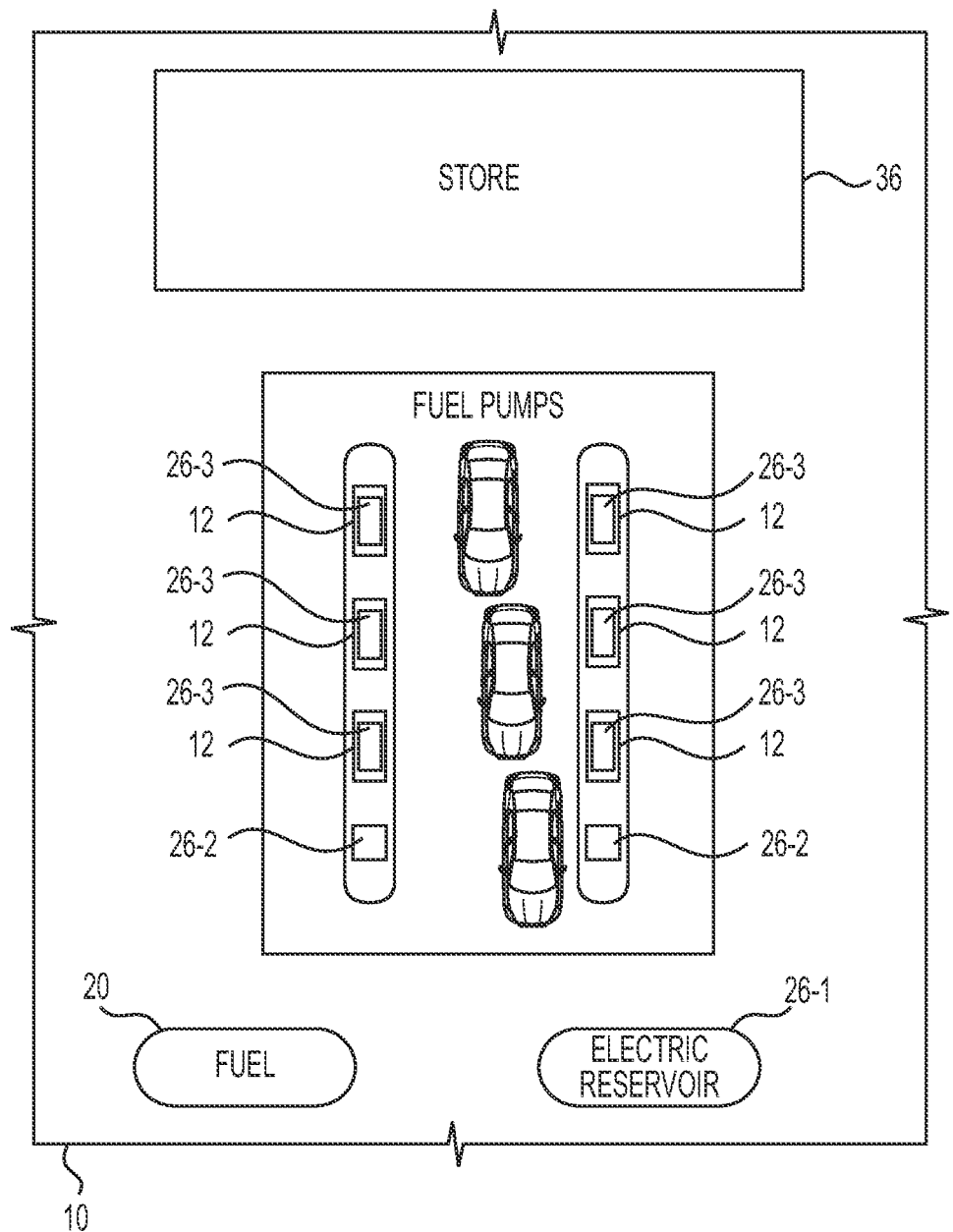
FIG. 15 is a diagrammatic view of the fuel/electric vehicle (EV) station shown in FIG. 1 enhanced with additional electric reservoirs.
Figure 16:
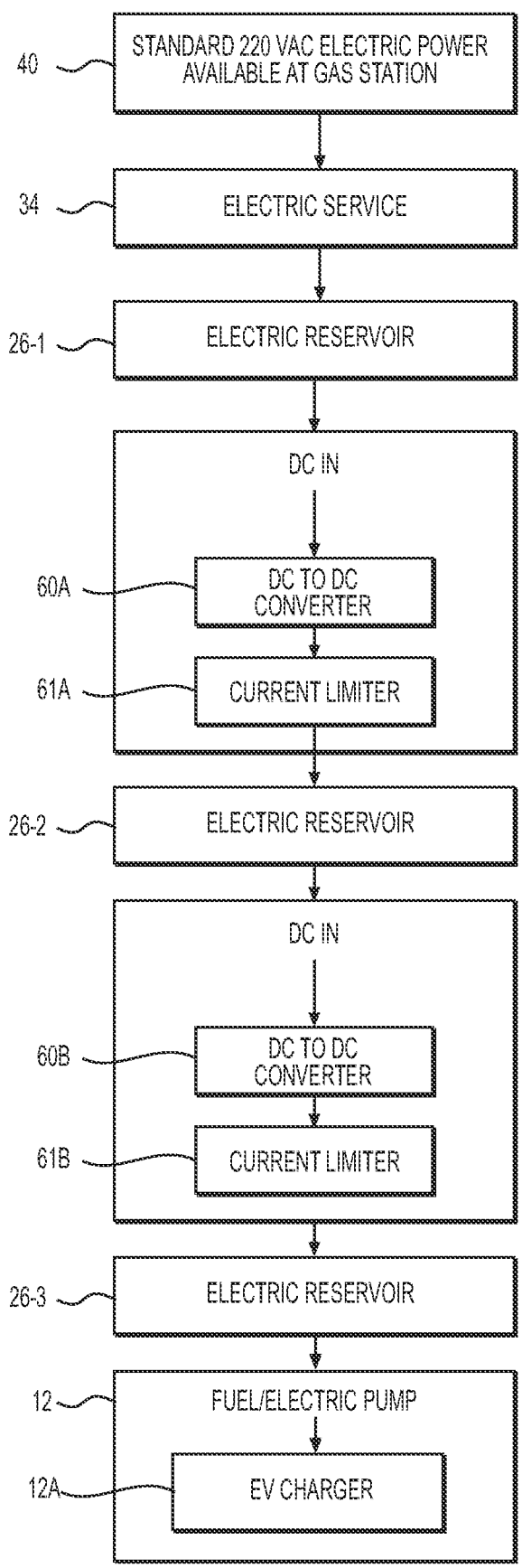
FIG. 16 is a flow chart showing power flow from the electric reservoir (e.g. flow battery, Li-ion battery, power storage capacitors, fuel cells) to the secondary electric reservoir (e.g. battery, Li-ion battery, power storage capacitors, fuel cells) to the tertiary electric reservoir (e.g. battery, Li-ion battery, power storage capacitors, fuel cells) of the fuel/electric pump (e.g. EV pump, EV charger, and/or fuel pump).

The fuel/electric station 10 comprises one or more electric reservoirs. For example, the fuel/electric station 10 comprises, for example, a primary electric reservoir 26-1, and a secondary electric reservoir 26-2, as shown in FIGS. 15 and 16. As a further example, the fuel/electric station 10 comprises a primary electric reservoir 26-1, a secondary electric reservoir 26-2, and a tertiary electric reservoir 26-3, as shown in FIGS. 15 and 16. An additional layer(s) of electric reservoirs (e.g. four or more) can be provided at the fuel/electric station 10 to provide the fuel/electric station 10 with additional electric power storage capacity, power redundancy, and power switching of one or more electric reservoirs to a particular fuel/electric pump 12. For example, the various electric reservoirs alone or in combination can be switched on to a particular fuel/electric pump 12 to meet charging demand at the particular fuel/electric pump 12 and all other fuel/electric pumps in use. A computer control system is provided to monitor the demand at each fuel/electric pump 12 and switch appropriate power to meet the demand of each fuel/electric pump 12, for example, at programmed times or in real time.

Communications

Communications is required between the EV Charger and the vehicle. Communications standards have been already created for the EV industry such as IEC 61851-21, IEC 61851-23, IEC 61851-24, ISO 15118, PLC and more.

Hardware and software is integrated to support one or more of these standards to allow for proper handshaking between the EV Charger and the vehicle. This hardware/software supports Digital communication, digitally encoded information exchanged between a d.c. EV charging station and an EV, as well as the method by which it is exchanged.

Figure 17:
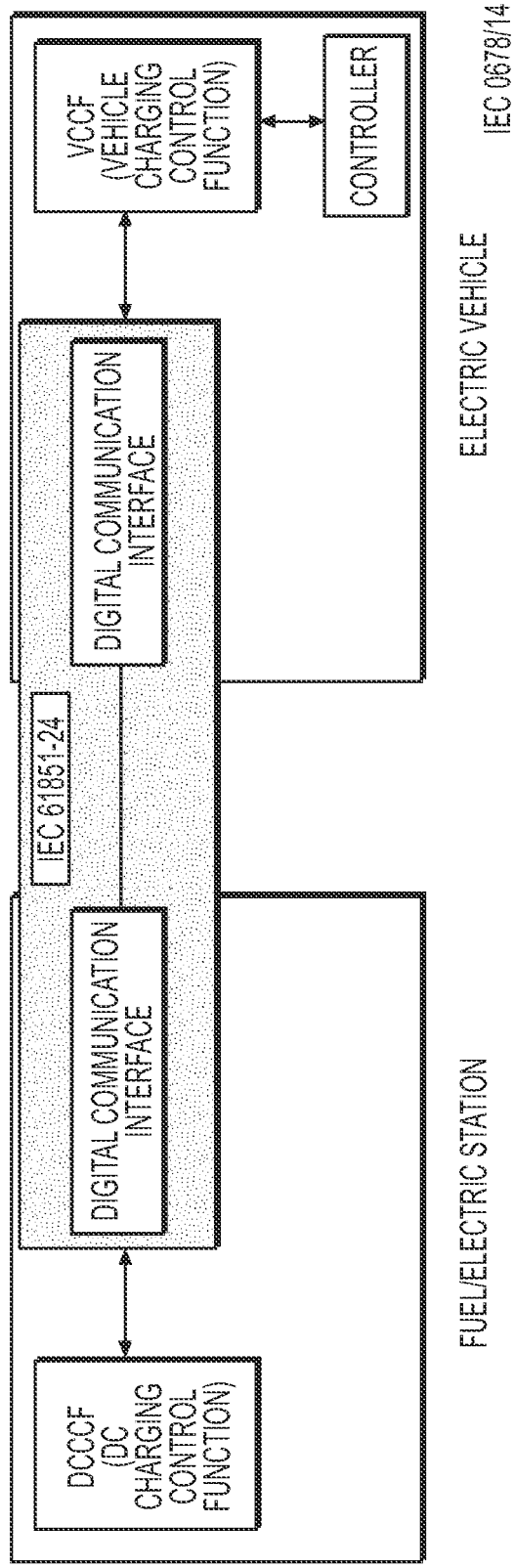
FIG. 17 is a block diagram of a communication system for the fuel/electric vehicle (EV) station according to the present invention for communicating with electric vehicles being recharged.

The Digital communication between the d.c. EV charging station (e.g. fuel/electric station 10) and an electric vehicle for control of d.c. charging is shown in FIG. 17.

Figure 18:
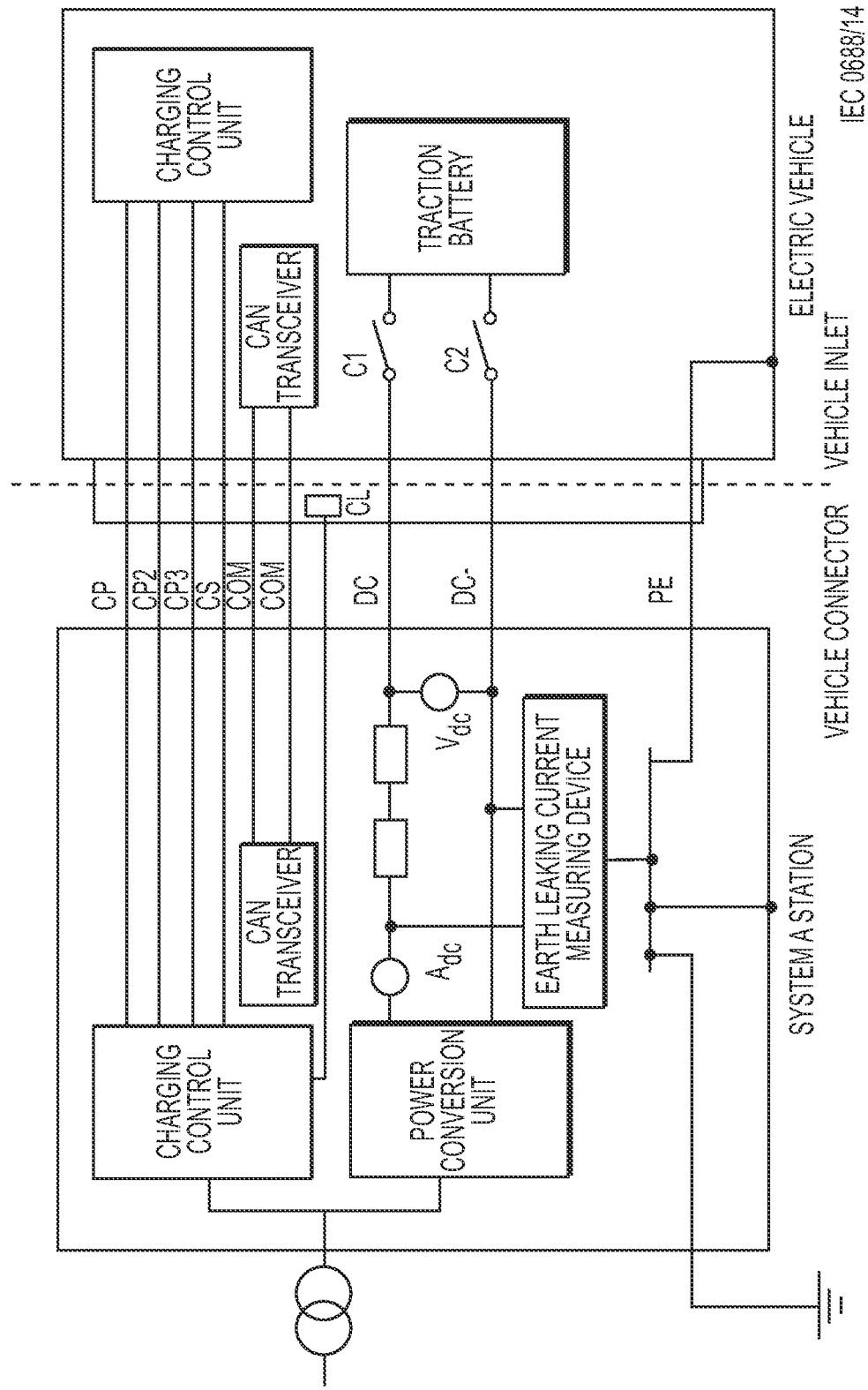
FIG. 18 is a diagram of the communication interface of the communication system shown in FIG. 17.

A schematic block diagram example of system A is shown in FIG. 18. The interface circuit between the station and the electric vehicle for charging control is provided for digital communication with the vehicle.

Fast Charge Electric Vehicle (EV) System

Figure 19:
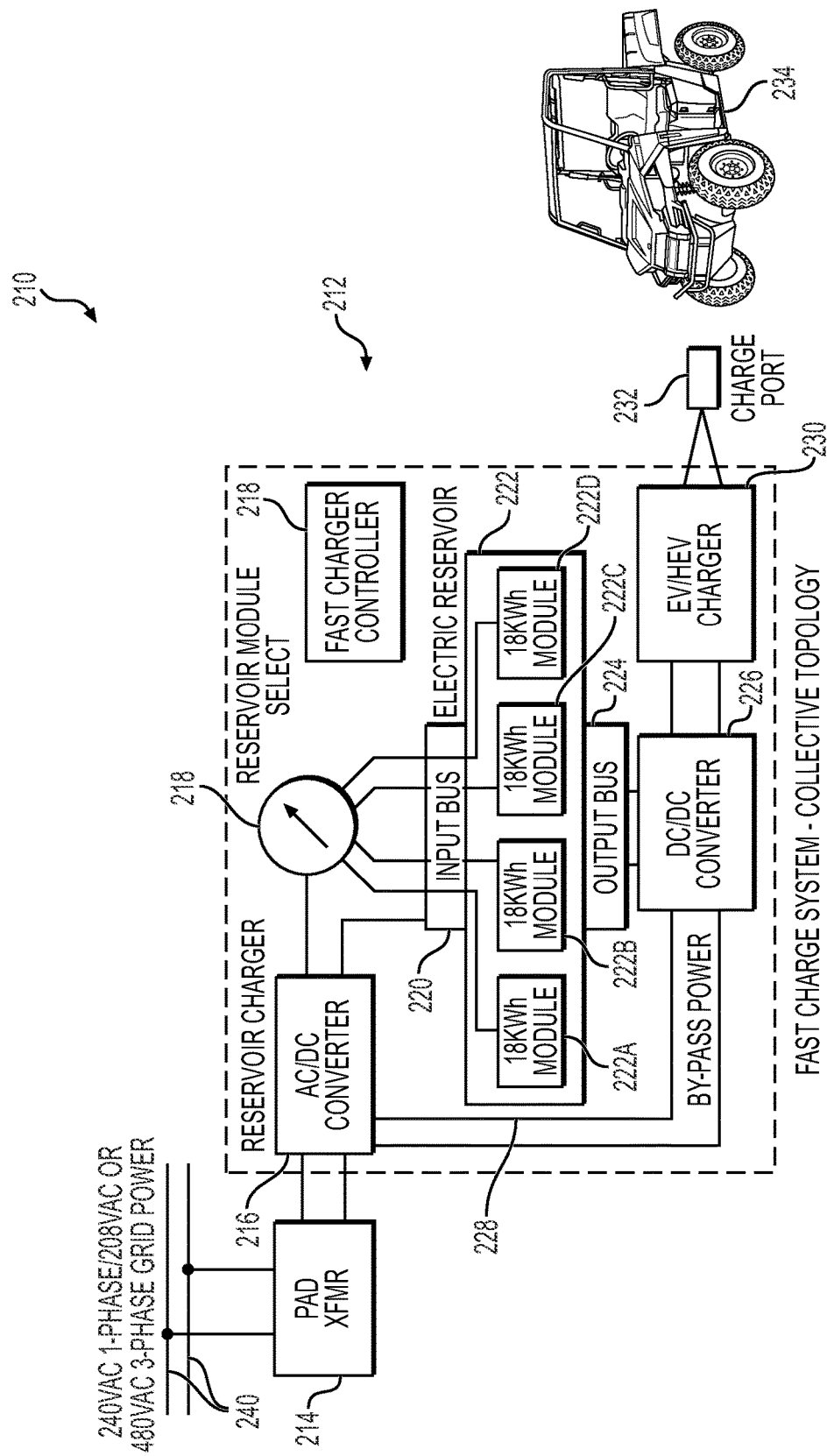
FIG. 19 is a diagrammatic view of a fast charge electric vehicle (EV) system according to the present invention with a collective AC/DC converter arrangement.

A fast charge electric vehicle (EV) system 210 with a collective AC/DC converter arrangement 212 is shown in FIG. 19. The fast charge electric vehicle (EV) system 210 can be integrated into a fast charge station according to the present invention.

The fast charge electric vehicle (EV) system 210 comprises a transformer 214 (e.g. pad transformer, PAD XFMR), an AC/DC converter 216; a fast charge controller 218; a selectable switch 219; an input bus 220; an electric reservoir 222 with four (4) electric reservoir modules 222A, 222B, 222C, 222D (e.g. 18 KWh electric reservoir modules); an output bus 224; a DC/DC converter 226; a by-pass power circuit 228; an EV charger 230; and an EV charge port 232 configured for charging an electric vehicle (EV) 234. The fast charger controller can be connected to one or more components of the fast charge electric vehicle (EV) system 210.

The fast charge electric vehicle (EV) system 210 comprises, or is connected to, a power supply 240 (e.g. external power supply, electric grid, for example, 240 VAC 1-PHASE/208 VAC or 480 VAC 3-PHASE GRID, as shown in FIG. 19, acting as a power supply for the fast charge electric vehicle (EV) system 210. The power supply 240, for example, can include one or more additional external power supplies, for example, a power supply generated by wind power (e.g. wind driven power generation system), hydroelectric power (e.g. water wheel, turbine), photovoltaic power generation system (e.g. solar panels), power generator (e.g. fuel powered generator), power plant, power station, or other types of power supplies.

The power supply 240 is connected to and supplies power to the transformer 214, which is connected to and supplies power to the AC/DC converter 216 acting as an electric reservoir charger.

The AC/DC converter 216 is connected to and supplies power to the fast charger controller 218, which is connected to and supplies power (e.g. selectively or simultaneously)

through the input bus 220 to the four (4) electric reservoir modules 222A, 222B, 222C, 222D of the electric reservoir 222 for charging the four (4) electric reservoir modules 222A, 222B, 222C, 222D. The number of electric reservoir modules can be decreased or increased from the four (4) shown in FIG. 19 (e.g. 1, 2, 3, 4, 5, 6, 7, 8, 9, 10, 11+ electric reservoir modules).

The four (4) electric reservoir modules 222A, 222B, 222C, 222D of the electric reservoir 222 are connected to and supply power through the output bus 224 to the DC/DC converter 226.

The by-pass power circuit 228 is connected between the AC/DC converter 216 and the DC/DC converter 226 for by-passing the fast charger controller 218, the input bus 220, the four (4) electric reservoir modules 222A, 222B, 222C, 222D, and output bus 224 for supplying power directly from the AC/DC converter 216 to the DC/DC converter 226.

The DC/DC converter 226 is connected to and supplies power to the EV charger 230, which is connected to and supplies power to the EV charge port 232 configured for connecting to and charging or recharging the electric vehicle (EV) 234.

In the collective AC/DC converter arrangement 212, the AC/DC converter 216, for example, is a single stage AC/DC converter configured for selectively charging each of the electric reservoir modules 222A, 222B, 222C, 222D on demand. In addition to this on demand charge capability, a maximum rated power of the AC/DC converter 216 is available for direct charging of a battery pack of the electric vehicle (EV) 234 when operating in a by-pass mode.

Figure 20:
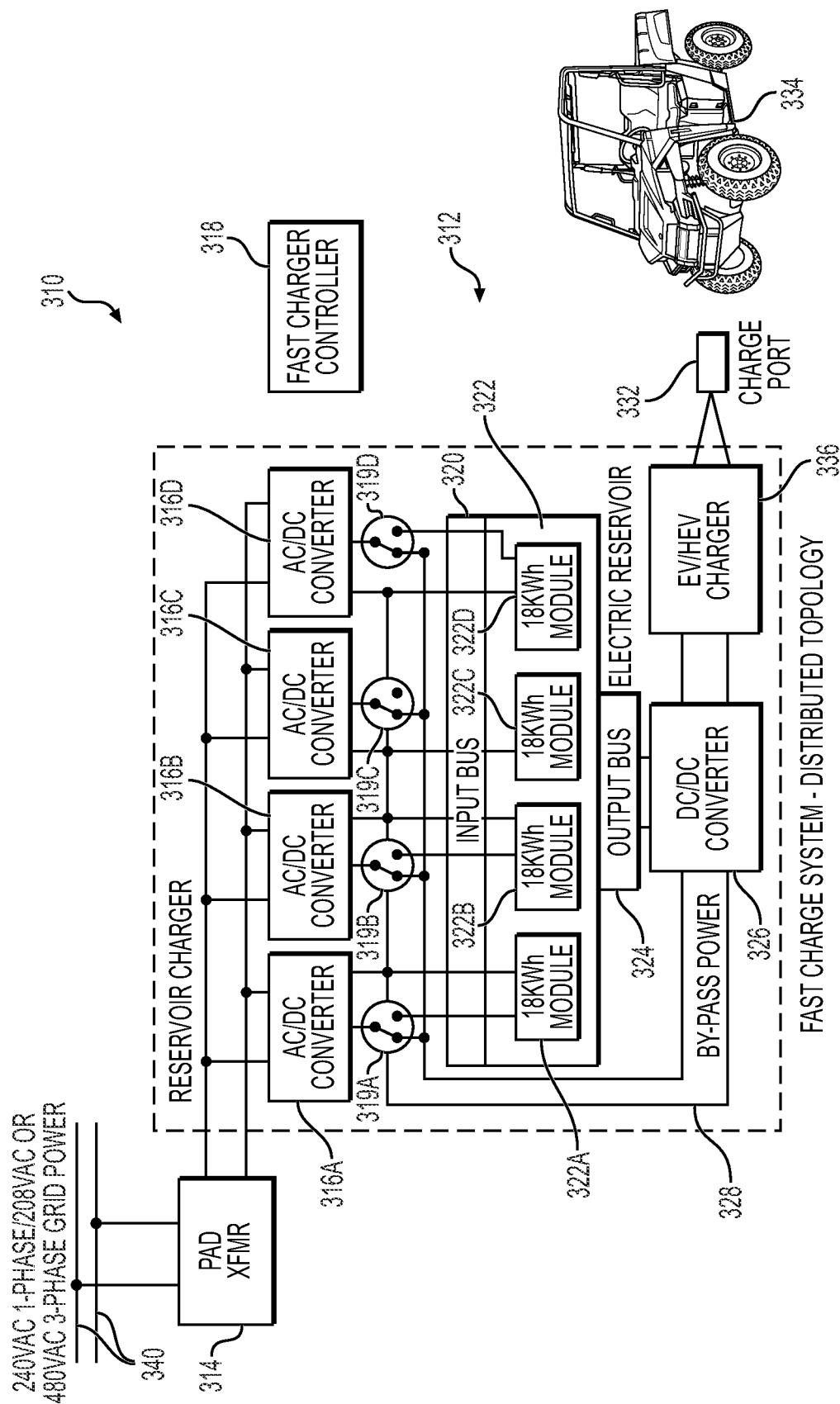
FIG. 20 is a diagrammatic view of a fast charge electric vehicle (EV) system according to the present invention with a distributed AC/DC converter arrangement.
Figure 25A:
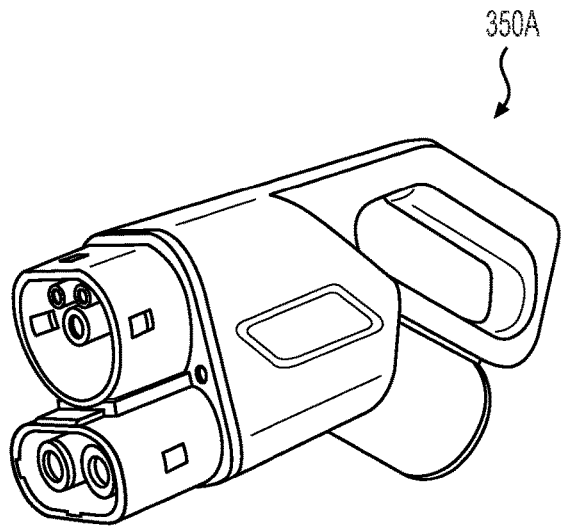
FIG. 25A is a perspective view of an EV connector for the fast charge electric vehicle (EV) system according to the present invention.
Figure 25B:
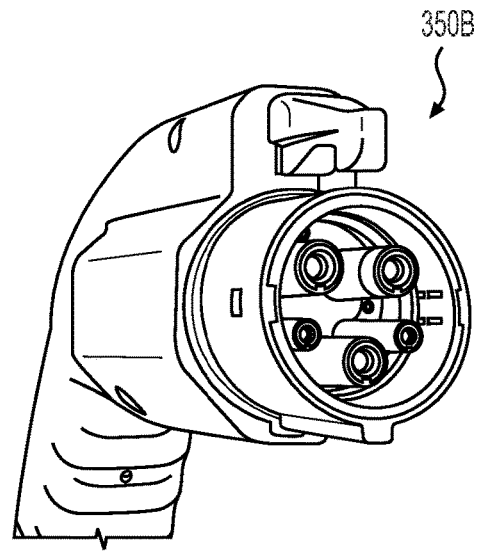
FIG. 25B is a perspective view of another EV connector for the fast charge electric vehicle (EV) system according to the present invention.
Figure 25C:
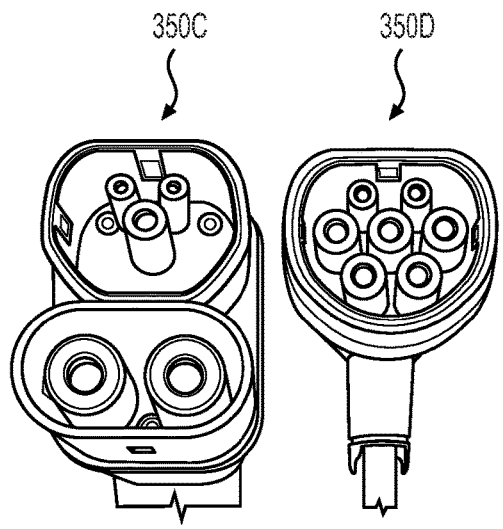
FIG. 25C is a perspective view of a further EV connector for the fast charge electric vehicle (EV) system according to the present invention.
Figure 25D:
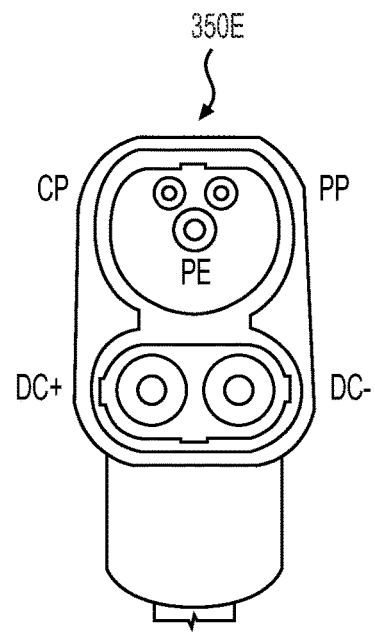
FIG. 25D is a perspective view of an even further EV connector for the fast charge electric vehicle (EV) system according to the present invention.

A fast charge electric vehicle (EV) system 310 with a distributed AC/DC converter arrangement 312 is shown in FIG. 20. The fast charge electric vehicle (EV) system 310 can be integrated into a fast charge station.

The fast charge electric vehicle (EV) system 310 comprises a transformer 314 (e.g. pad transformer, PAD XFMR); four (4) AC/DC converters 316A, 316B, 316C, 316D; a fast charger controller 318; four (4) switches 319A, 319B, 319C, 319D (e.g. by-pass switches); input bus 320, an electric reservoir 322 with four (4) electric reservoir modules 322A, 322B, 322C, 322D; an output bus 324; a DC/DC converter 326; a by-pass power circuit 328; and EV/HEV charger 330; and a charge port 332 for charging an electric vehicle (EV) 334. The fast charger controller 318 can be connected to and control one or more components of the fast charge electric vehicle (EV) system 310

The fast charge electric vehicle (EV) system 310 comprises the power supply 340, or is connected to the power supply 340 (e.g. external power supply, electric grid, for example, 240 VAC 1-PHASE/208 VAC or 480 VAC 3-PHASE GRID, as shown in FIG. 20, acting as a power supply for the fast charge electric vehicle (EV) system 310. The power supply 340, for example, can include one or more additional power supplies, for example, a power supply generated by wind power (e.g. wind driven power generation system), hydroelectric power, photovoltaic power generation system, power generator (e.g. fuel powered generator), or other types of power supplies.

The power supply 340 is connected to and supplies power to the transformer 314, which is connected to and supplies power to each of the four (4) AC/DC converters 316A, 316B, 316C, 316D acting as an electric reservoir charger.

The four (4) AC/DC converters 316A, 316B, 316C, 316D are connected to and supply power through the input bus 320 to the four (4) electric reservoir modules 322A, 322B, 322C, 322D of the electric reservoir 322 for charging the four (4) electric reservoir modules 322A, 322B, 322C, 322D.

The four (4) electric reservoirs 322A, 322B, 322C, 322D are connected to and supply power through the output bus 324 to the DC/DC converter 326. The output bus 324, for example, can carry the power supplied by one of the reservoir modules 322A, 322B, 322C, 322D and/or supplied by two or more reservoir modules 322A, 322B, 322C, 322D at the same time. For example, the fast charger controller 318 can be connected to switching for selectively controlling the supply of power from the reservoir modules 332A, 322B, 322C, 322D to the output bus 324.

A by-pass power circuit 328 is connected between the four (4) switches 318A, 3186, 318C, 318D and the DC/DC converter 324 for by-passing the four (4) electric reservoir modules 322A, 322B, 322C, 322D of the electric reservoir 322, and output bus 324 for supplying power directly from the four (4) AC/DC converters 316A, 316B, 316C, 316D to the DC/DC converter 326.

In the distributed AC/DC converter arrangement 312, the AC/DC converters 316A, 316B, 316C, 316D, for example, are a multi-channel AC/DC converter or individual AC/DC converters appropriately rated to each of the electric reservoir modules 322A, 322B, 322C, 322D, and independently charge each of the electric reservoir modules 322A, 322B, 322C, 322D on demand. In addition to this on demand charge capability, either a single channel rated power of one or more of the AC/DC converters 316A, 316B, 316C, 316D is available for direct charging of the battery pack of the electric vehicle (EV) 334 when operating in a by-pass mode, or with added circuity and software, the collective output of all the individual AC/DC converters 316A, 316B, 316C, 316D may be blended at the DC/DC converter stage for maximum rated power available for direct charging of the battery pack of the electric vehicle (EV) 334 when operating in the by-pass mode.

It is noted that hybrid architectures of these two variants of the fast charge electric vehicle (EV) system 210 and 310 are possible with increased circuit complexity.

Base Power

The electric reservoir modules 222A, 222B, 222C, 222D of the electric reservoir 222 of the fast charge electric vehicle (EV) system 210 and the electric reservoir modules 322A, 322B, 322C, 322D of the electric reservoir 322 of the fast charge electric vehicle (EV) system 310, for example, can each comprise or consist of eight (8) dual use industrial batteries (e.g. Li-ion batteries). The dual use industrial batteries, as defined, comprise or consist of an internal battery cell array, battery management system (BMS), and control circuitry that meets the voltage, capacity and integration requirements as defined herein.

Lithium-Ion Battery

The battery module specifications for a dual use industrial battery configuration to be used as base power for the electric reservoir(s) 222 or 322, for example, are shown in FIG. 21.

The cabling specifications for the internal cabling of the fast charge electric vehicle (EV) system 210 or 310, are shown in FIG. 22.

Additional product specifications for the fast charge electric vehicle (EV) system 210 or 310, are shown in FIG. 23.

Detailed Technical Specifications

The detailed technical specifications and system enhancements, which include increase battery pack voltages, USB-C charging circuitry, fast charge LED indicating power delivery, hot and cold temperature LEDs, and reverse polarity LED, are discussed below.

Dual Use Lithium-Ion Battery

The technical specifications for the dual use industrial battery lithium-ion cells to be used in the electrical reservoir modules 222A, 222B, 222C, 222D of the electric reservoir 222, or the electrical reservoir modules 322A, 322B, 322C, 322D of the electric reservoir 322, are shown in FIG. 24.

The above specifications shown in FIG. 24 are for the batteries themselves. When applied in the fast charge electric vehicle (EV) system 210 or 310, the continuous and burst discharge currents, for example, can be lower as a result of the electrical components, including smart switch, cables, clamps, and other related circuitry. The design of the fast charge electric vehicle (EV) system 210 or 310, for example, can minimize any power losses from the battery to achieve the highest possible energy output.

Interface Requirements

Human Interface

The fast charge electric vehicle (EV) system 210 or 310, for example, utilize interface elements. These elements shall include, but are not limited to the following.

The power head 336 is that portion of the fast charge electric vehicle (EV) system presented to the user as a human interface (FIG. 38), and for example, can appear as a stylized EV charger, fuel dispenser system, or EV charger/fuel dispenser, such that features are recognizable to the common user. The body, for example, consist of a stylized kiosk with design features.

The power head 336, for example, can incorporate a stylized integrated weather/rain canopy. The power head 336, for example, can further incorporate stylized lighting such that adequate illumination is available for use during darkness.

The power head 336, for example, can also include a pad provided with stylized protective barriers. The power head 336, for example, can incorporate a charge port with design elements similar to a fuel dispensing system nozzle such that its intended use in recognized by the user.

The power head 336, for example, can include a control panel that is backlit and recognizable to the user (e.g. touch pad control interface, backlit buttons, and switches, etc.). The pad, for example, provides the fast charge electric vehicle (EV) system 210 or 310 operational status, connectivity status, and charging status to the user in a recognizable display format. These pad and display elements include, but are not limited to system status, vehicle connectivity, charge status, fault status, instructional assistance, and/or completion of charge.

DC link cables, for example, can be supported by a mechanical lift assist, dependent upon weight, such that user effort required for port insertion and cable management is minimized (i.e. the weight of the DC link will exceed that of a fuel dispenser hose assembly).

The DC link cable, for example, can be 18 ft. in length from the high attach point on the power head 336 to the charge port connection at the EV/HEV. This is the same as the common length of a fuel dispenser hose.

EV/HEV Interface

The fast charge electric vehicle (EV) system 210 or 310 can utilize, for example, the combined charging system (CCS) standard for charging EV/HEV vehicles. As a DC fast charge electric vehicle (EV) system, for example, the fast charge electric vehicle (EV) system 210 or 310, for example, can support the Type I or IEC 62196 Type II Combo 2 DC connector for power service up to 60 KW and the normal Type II for 3 phase AC charging support (optional).

EV Connectors

Various EV connectors 350A, 350B, 350C, 350D, 350E for example, can be used in the fast charge electric vehicle (EV) system 210 or 310, as shown in FIGS. 25A, 25B, 25C, and 25D.

Figure 26A:
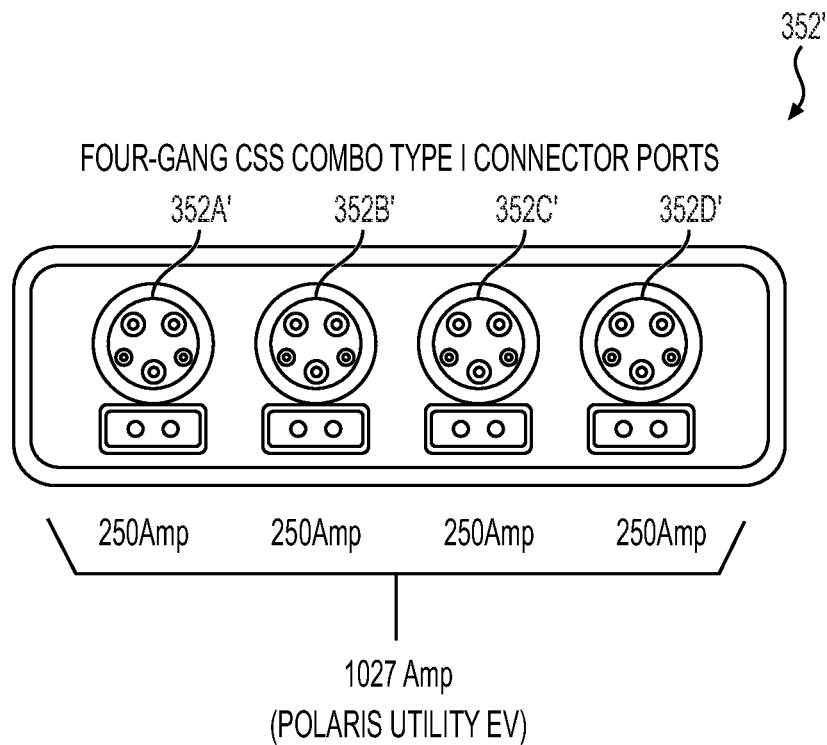
FIG. 26A is a front view of a four-gang CCS (Combined Charging System) combo Type I connector for use in the USA/North America with four connector ports for the fast charge electric vehicle (EV) system according to the present invention.
Figure 26B:
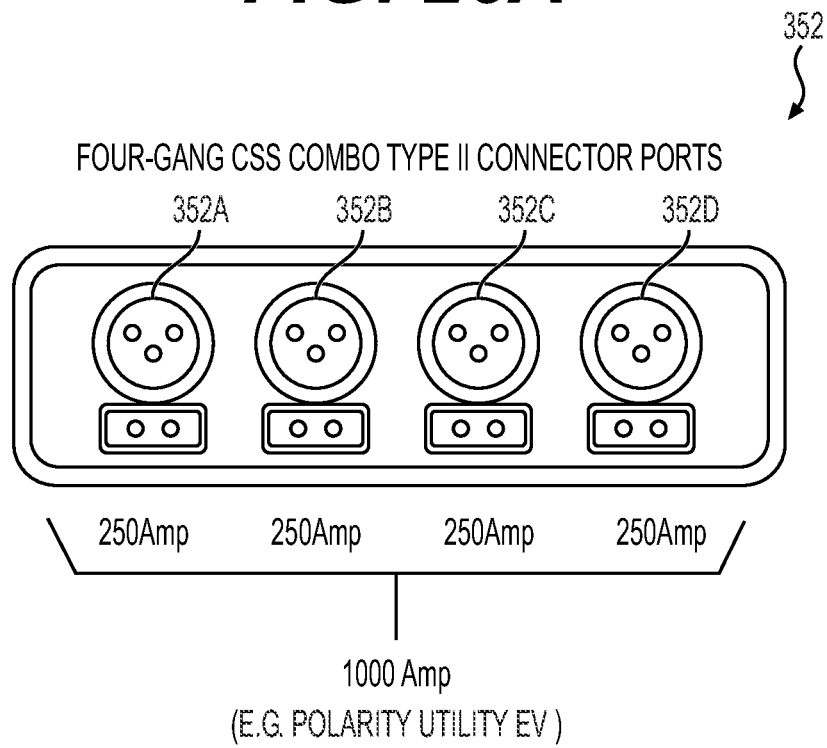
FIG. 26B is a front view of a four-gang CCS (Combined Charging System) combo Type II connector for use in Europe with four connector ports for the fast charge electric vehicle (EV) system according to the present invention.

Due to the current draw requirement of 1027 Amps, for example, for a Polaris Utility EV application, a four-gang connector 352 strategy can be implemented utilizing Type 1 for U.S. applications and Type II for European applications with combo 2 DC connectors 352A, 3526, 352C, 352D or 352A', 3526', 352C', 352D', as shown in FIGS. 26A and 26B.

This approach will provide the following benefits, such that significant resources to connector development will not be required, the required communication interface and software protocol to use this connector standard will be developed as a spring-board for a future fast charge EV platforms, and existing high voltage and high current protection provision can be incorporated into this connector standard.

These components can be purchased and modified via a simple four-gang plate adapter with a corresponding interface to the EV vehicle(s) charge port; and this approach will allow for a cleaner finish and execution for the purpose of industrial design and aesthetics.

Alternative Option

Figure 27:
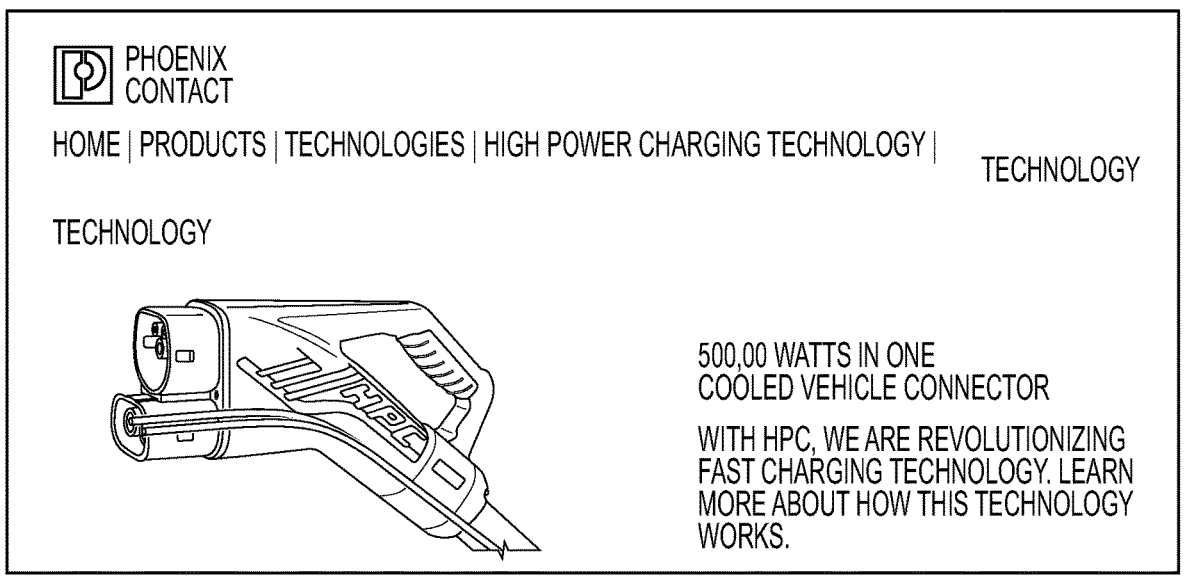
FIG. 27 is a perspective view of a Phoenix Contact cooled electric vehicle (EV) connector for the fast charge electric vehicle (EV) system according to the present invention.

A Phoenix Contact Glycol cooled power connection system 354, for example, can be used in the fast charge electric vehicle (EV) system 210 or 310, as shown in FIG. 27. This option provides higher current capacity due to a glycol cooled cable and port system. This option provides a streamlined power port connectivity, but will incur greater integration complexity for support of the liquid cooling system. Additionally, cost trade-offs must be considered. Also, when using cooled cable with 500 A capability, only two (2) will need to be ganged in parallel to allow charging 1000 A.

Commercial Interface

For commercial access deployments, the fast charge electric vehicle (EV) system 210 or 310, for example, can incorporate a standard point-of-sale system for credit/debit payment and for commercial interface to the establishment control point.

For support access deployments such as resorts and golf courses for which the system is owned and operated, the fast charge electric vehicle (EV) system 210 or 310, for example, can incorporate a control point with a coded access panel.

Electrical Requirements

Base Rated Electrical

The base rating of the fast charge electric vehicle (EV) system 210 or 310, for example, can be as follows:
   System Power Rating: 80 KW (based upon Shida 120 Ah Pouch Cell)
   Voltage Rating: 90 VDC
   240 Ah per Channel (e.g. in 7S2P Configuration)
   220 VAC, 60 Hz Utility Input
Utility Power Supply The fast charge electric vehicle (EV) system 210 or 310, for example, can receive input power from the power supply 240 or 340 (e.g. external utility electrical power grid).

Dependent upon the specific deployment installation site, this power input, for example, can be either 220 VAC or 480 VAC. The power supply 240 or 340 (e.g. power grid), for example, can be conditioned by means of an appropriately installed and rated pad transformer to be defined based upon the specific application. Alternatively, a 208 VAC 3-phase voltage line-line voltage can be utilized.

The interface circuit to the power utility, for example, can be constructed such that upon detection of loss of grid power, the electric reservoir 222 or 322 of the fast charge electric vehicle (EV) system 210 or 310 is mechanically disconnected and isolated from the power grid. This provision must conform to utility regulations and certification.

The size of the electric reservoir 222 or 322 capacity must be matched to the deployment site reserve power available such that the electric reservoir 222 or 322 may be recharged during "off-peak" hours. This shall require a site study to determine optimal "cyclic utility" of the fast charge electric vehicle (EV) system for a given deployment site.

Electric Reservoir

The electric reservoir, for example, can be rated as follows per channel:

Voltage: 90 VDC
Capacity: 240 Ah/Battery Module
Power: 20.16 KWh Minimum

Alternatively, the electric reservoir can use 16× 12.8V/120 Ah battery modules in series (16S1P), which results in a nominal reservoir voltage of 204.8V (per channel). The 204.8V level is used instead of the 90V level, as the latter does not allow enough head room for charging 72V type vehicles when using a buck converter.

The electric reservoir 222 or 322 of the fast charge electric vehicle (EV) system 210 or 310, for example, comprises or consists of four (4) channels each comprising, for example, a string array of 7S2P (i.e. two (2) electric reservoir modules arranged in parallel) dual use industrial batteries. The 7S2P string array can be updated to 16S1P, or optionally 16S2P.

The fast charge electric vehicle (EV) system 210 or 310, for example, can be capable, with the electric reservoir at full capacity, of charging a single EV/HEV (requirements defined below) from a single fully charged electric reservoir module 222A, 222B, 222C, 222D or 322A, 322B, 322C, 322D. Upon completion of the EV/HEV charge cycle, for example, the fast charge electric vehicle (EV) system can be configured to "circle" to the next electric reservoir modules 222A, 222B, 222C, 222D or 322A, 322B, 322C, 322D in preparation for charging the next EV/HEV in sequence.

Electric Reservoir Modules (e.g. Battery Modules)

The electric reservoir modules 222A, 222B, 222C, 222D of the fast charge electric vehicle (EV) system 210 or electric reservoir modules 322A, 322B, 322C, 322D of the fast charge electric vehicle (EV) system 310, for example, can be charged by an internal AC/DC converter (i.e. charger) system. For the hardware, this AC/DC converter shall consist of a stacked (as required) and distributed group of AC/DC units (e.g. commercially available) that meet a minimum of 7 KW capability per channel. As used in this requirement, for example, a single channel shall consist of a pair of electric reservoir modules 222A, 222B, 222C, 222D or 322A, 322B, 322C, 322D, which shall comprise or consist of a 7S2P dual use industrial battery array. Reference "Product Configuration" in this specification or description for alternate AC/DC converter options. The 7S2P dual use industrial battery array can be updated to 16S1P, or optionally to 16S2P.

Upon depletion of capacity of any utilized pair of electric reservoir modules 222A, 222B, 222C, 222D or 322A, 322B, 322C, 322D (i.e. pack), the AC/DC converter, for example, can be capable of recharging the pack to optimum capacity based on use and life history of the underlying batteries.

Charging EV/HEV Battery Pack

Charging of the EV/HEV target battery pack shall require that the fast charge electric vehicle (EV) system 210 or 310, once connected via the charge port, establishes a 'handshake' with the target battery pack battery management system (BMS). This handshake, for example, can accomplish the following, including open communication handshake, verify HVIL integrity, verify voltage isolation, verify functional safety (fault conditions of either EV/HEV battery pack or fast charge electric vehicle (EV) system), exchange basic charge request information, state of charge, voltage level, battery (pack) temperature, critical cell temperature, charge protocol (If/When applicable), status of recharge activity, completion of charge activity (De-energize electrical bus(es)), close communications, and end handshake.

EXAMPLE

The EV/HEV (i.e. electric vehicle/hybrid electric vehicle), for example, can be defined as either a Polaris Utility EV vehicle and/or an EZ-GO golf car. For the purpose of the fast charge electric vehicle (EV) system 210 or 310, the fast charge electric vehicle (EV) system 210 or 310 can utilize an integrated battery pack for the two (2) vehicles. The electric reservoir modules 222A, 222B, 222C, 222D or 322A, 322B, 322C, 322D, for example, can be reconfigured for safe deployment and operation in a mobile application. This approach, for example, can require significant re-packaging to meet integration requirements for the respective vehicles, but shall retain the same basic functional operating parameters. This will greatly decrease the burden and resource requirements for the purpose of EV/HEV battery pack development.

Isolation

Figure 28:
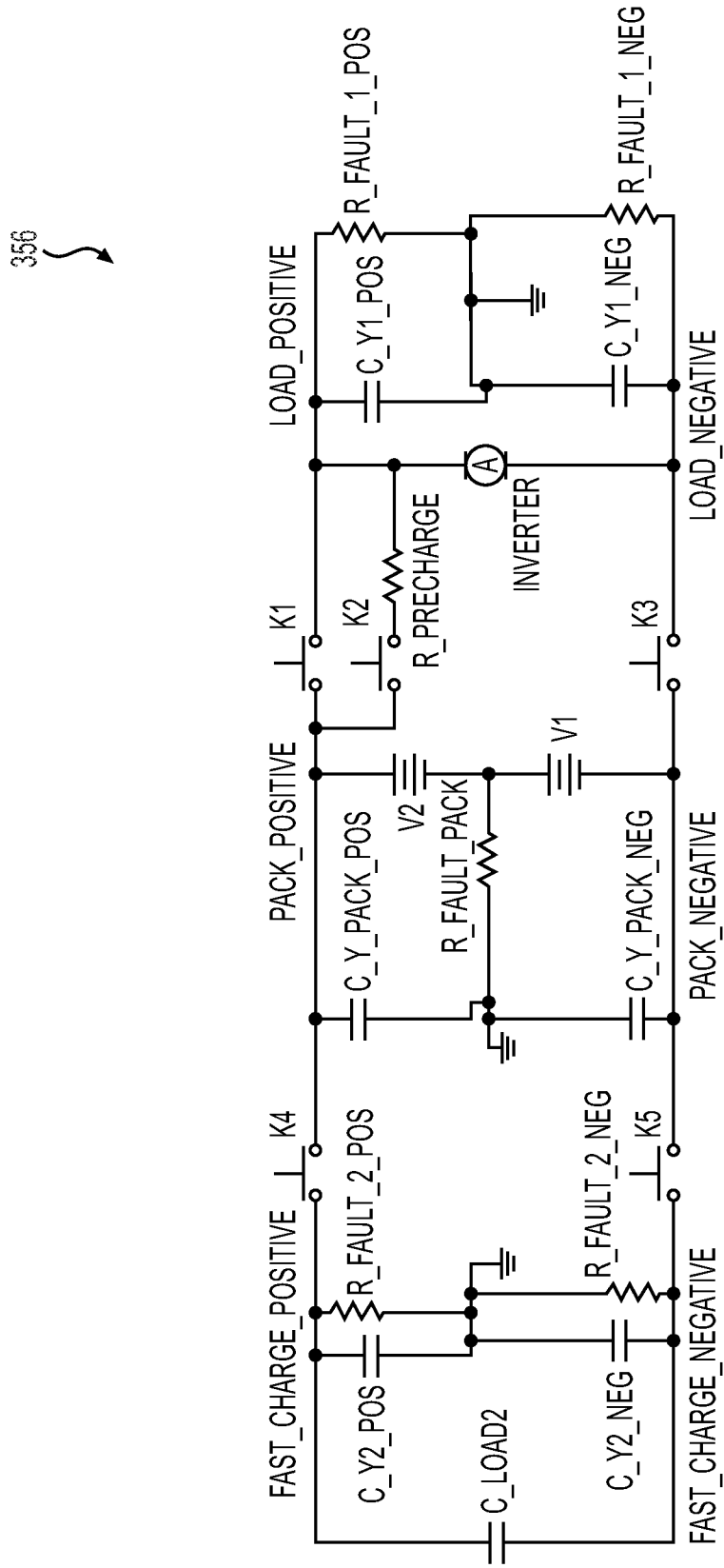
FIG. 28 is a circuit diagram of an electrical circuit for the fast charge electric vehicle (EV) system according to the present invention.

The fast charge electric vehicle (EV) system electrical circuit 356, for example, as shown in FIG. 28, can be designed such that high voltage isolation can be confirmed via a "function safety" software protocol. In the event that positive isolation detection is lost, the fast charge electric vehicle (EV) system architecture shall provide a means by which the internal voltage can be mechanically reduced to less than 60 VDC at any accessible touch points (i.e. potential for physical contact).

The fast charge electric vehicle (EV) system electrical circuit 356 shown in FIG. 28 is an example, and is disclosed in U.S. Pat. No. 9,007,066 entitled "Measuring isolated high voltage and detecting isolation breakdown with measures for self-detection of circuit faults."

The AC/DC converter, for example, can be galvanically isolated.

It is noted that when grounds of two different electrical circuits or equipment to be connected together are at different potentials, then, significantly high currents can flow unintentionally, or in the wrong direction, causing damage to equipment, and may be lethal to operators in contact or in proximity with the equipment.

In the DC EV Fast charging system, for example, the EV's On-Board-Charger (OBC) is bypassed and DC voltage provided by the off-board (external) Fast EV charger is supposed to be connected directly to the EV battery and its battery management system (BMS) through a contactor. The charging station power source is the AC power grid whose ground is at a different potential than the EV battery (load) ground. In order to safely connect these two systems, it is imperative that the source and load grounds be isolated, so that no DC current can flow between the two grounds. The DC EV charging system is based on switching power electronics. In such systems, galvanic isolation is achieved in a variety of ways and locations, depending on the power electronics topology/architecture used.

The power circuits are generally isolated using galvanic isolation which may be done at AC line frequencies in the AC/DC conversion stage (FIG. 4, component block 43) or at higher frequencies such up to several hundred kilo-hertz, in one or more of the DC/DC converter stages (FIG. 1, component block 64; FIGS. 6, 7, 8, 9, block 60).

Figure 41:
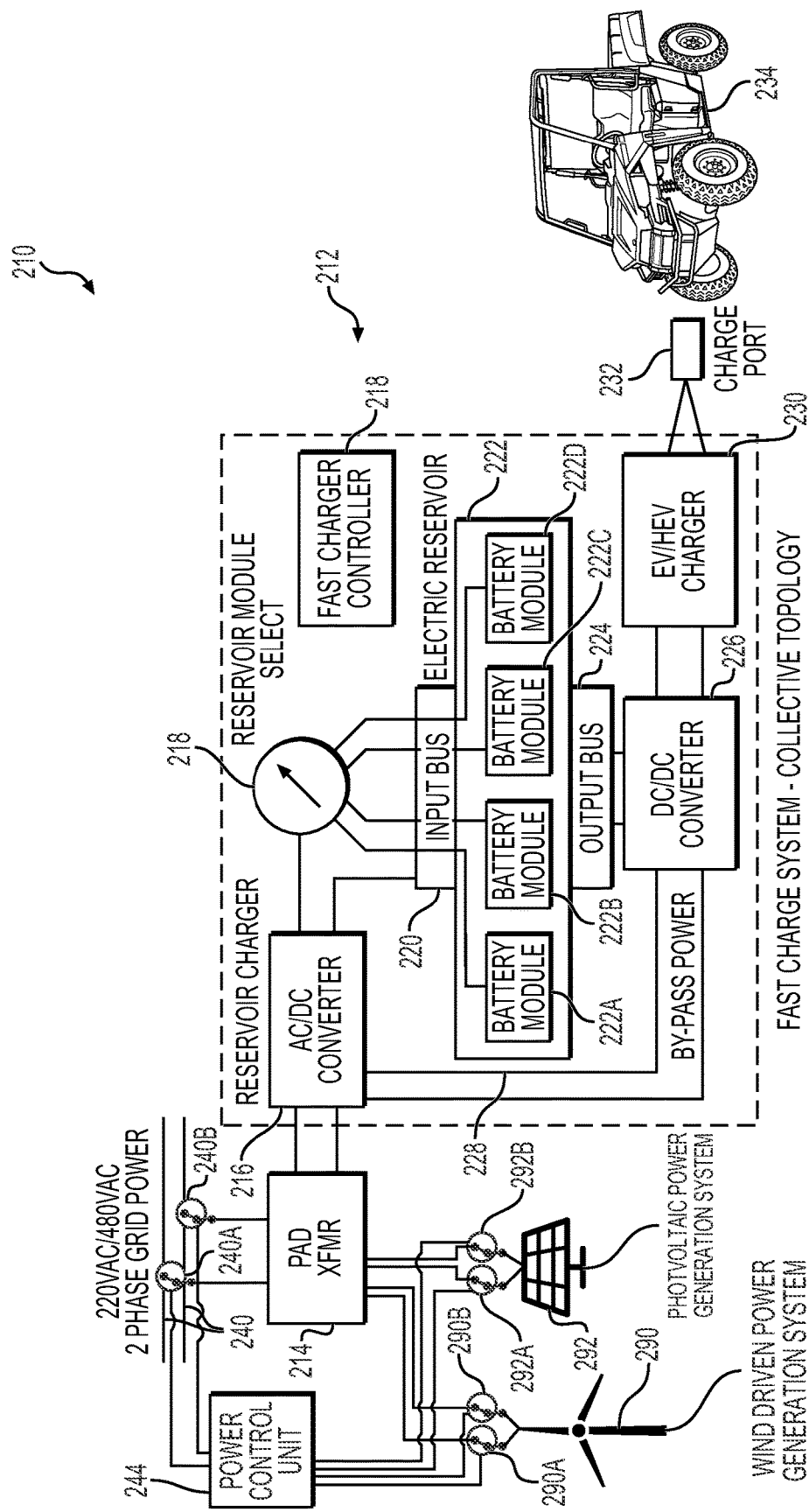
FIG. 41 is a diagrammatic view showing a fast charge electric vehicle (EV) system according to the present invention having collective topology with selective connection to the electric power grid and one or more additional power sources (e.g. wind driven power generation system and solar panel).
Figure 42:
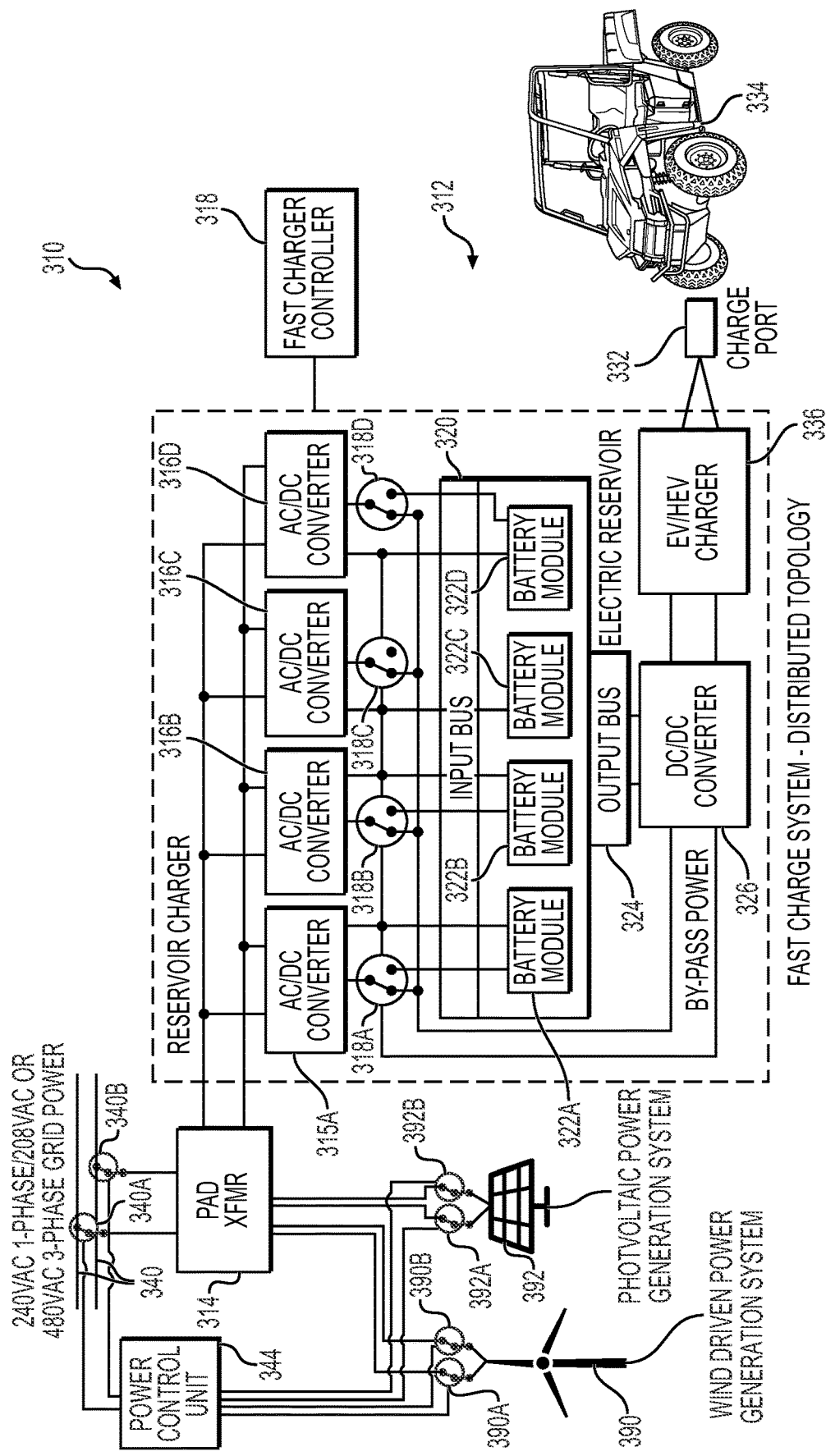
FIG. 42 is a diagrammatic view showing a fast charge electric vehicle (EV) system according to the present invention having distributed topology with selective connection to the electric power grid and one or more power sources (e.g. wind driven power generation system, and solar panel).
Figure 43:
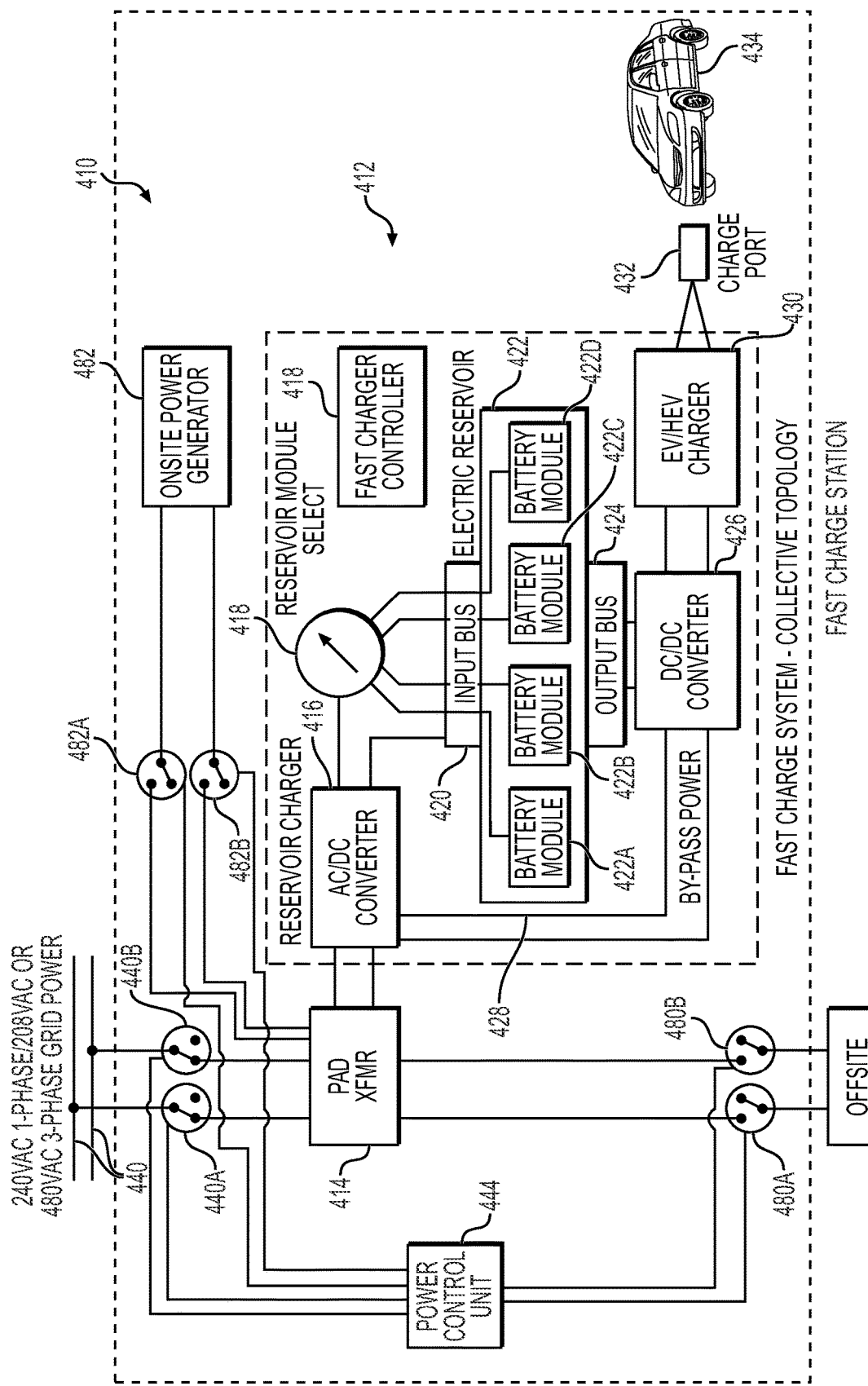
FIG. 43 is a diagrammatic view showing a fast charge electric vehicle (EV) system according to the present invention having collective topology with selective connection to the electric power grid and an onsite power generator and/or offside generator (e.g. onsite electric power generator, offsite electric power generator).
Figure 44:
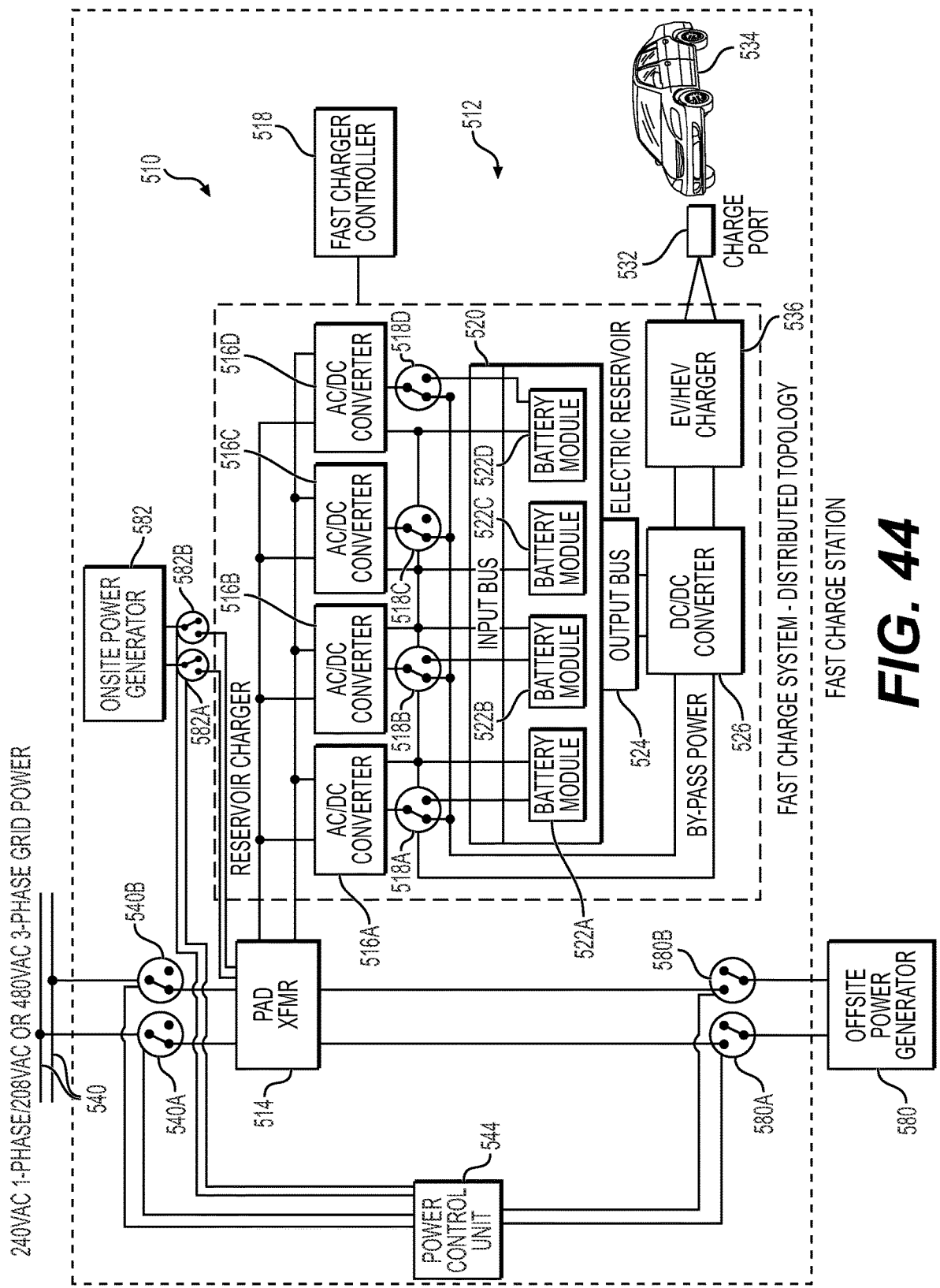
FIG. 44 is a diagrammatic view showing a fast charge electric vehicle (EV) system according to the present invention having distributed topology with selective connection to the electric power grid and an onsite power generator and/or offside generator (e.g. onsite electric power generator, offsite electric power generator).

In the fast EV charge system, for example, the galvanic isolation can be provided by means of a high frequency transformer present in the AC/DC converter (FIG. 4, component block 43; FIG. 41, component block 216; FIG. 42, component block 315A; FIG. 43, component block 416; FIG. 44, component block 515A).

The above description of the EV's OBC being bypassed during DC charging was made because Level 1 and Level 2 AC charging sources (as opposed to DC charging systems) do not have galvanic isolation, as the isolation is integrated within the OBC present in the EV. The OBC accepts AC input and rectifies it into a DC voltage. A subsequent DC/DC converter in the OBC translates the rectified voltage to the proper DC level suited to charge the EV battery during its various states of charge. The galvanic isolation in the OBC is generally provided during DC/DC conversion, mainly through high frequency transformers which are much smaller and more efficient compared to using bulky 50/60 Hz transformers to achieve isolation during AC/DC conversion.

The low voltage signaling and control loop or feedback circuits can be isolated using galvanic isolation (electromagnetic induction) or opto-electronic isolation or a combination. Such isolation is present in multiple feedback loops present in the various components of the charging system.

Grounding

The fast charge electric vehicle (EV) system 210 or 310 shall conform to all recognized electrical grounding principles understood within the state of the art. The fast charge electric vehicle (EV) system 210 or 310 shall be grounded such that a preferential current path is provided that offers lower electrical resistance than that posed by a human operator or bystander in physical contact with the system closures, human interface touch points, and commercial point-of-sale system interface.

High Voltage Interlock (HVIL)

The fast charge electric vehicle (EV) system 210 or 310, for example, can have an integral high voltage interlock system such that activation shall trigger an internal active discharge event. The circuit architecture, for example, can be designed such that an internal discharge circuit is able to discharge any potential high voltage source that may pose a hazard risk to any human user engaged to the system. Such events include but are not limited to the following, including premature disengagement of the charging port; short detection; software failure; removal of High Voltage access panels, loss of Isolation, and excessive HVIL signal bounce Base Battery Module Configuration The base battery module 372 (e.g. a 12 VDC Nom Battery Cell Array), for example, can comprise or consist of one or more NOCO brand12 VDC nominal 120 Ah dual use industrial batteries 370. The individual cells within this battery may be of either cylindrical cells or of pouch constructed cells. Cell selection shall be based upon the prevailing economic and/or performance attributes of a given cell.

Cylindrical Cell Array Construction

Figure 29:
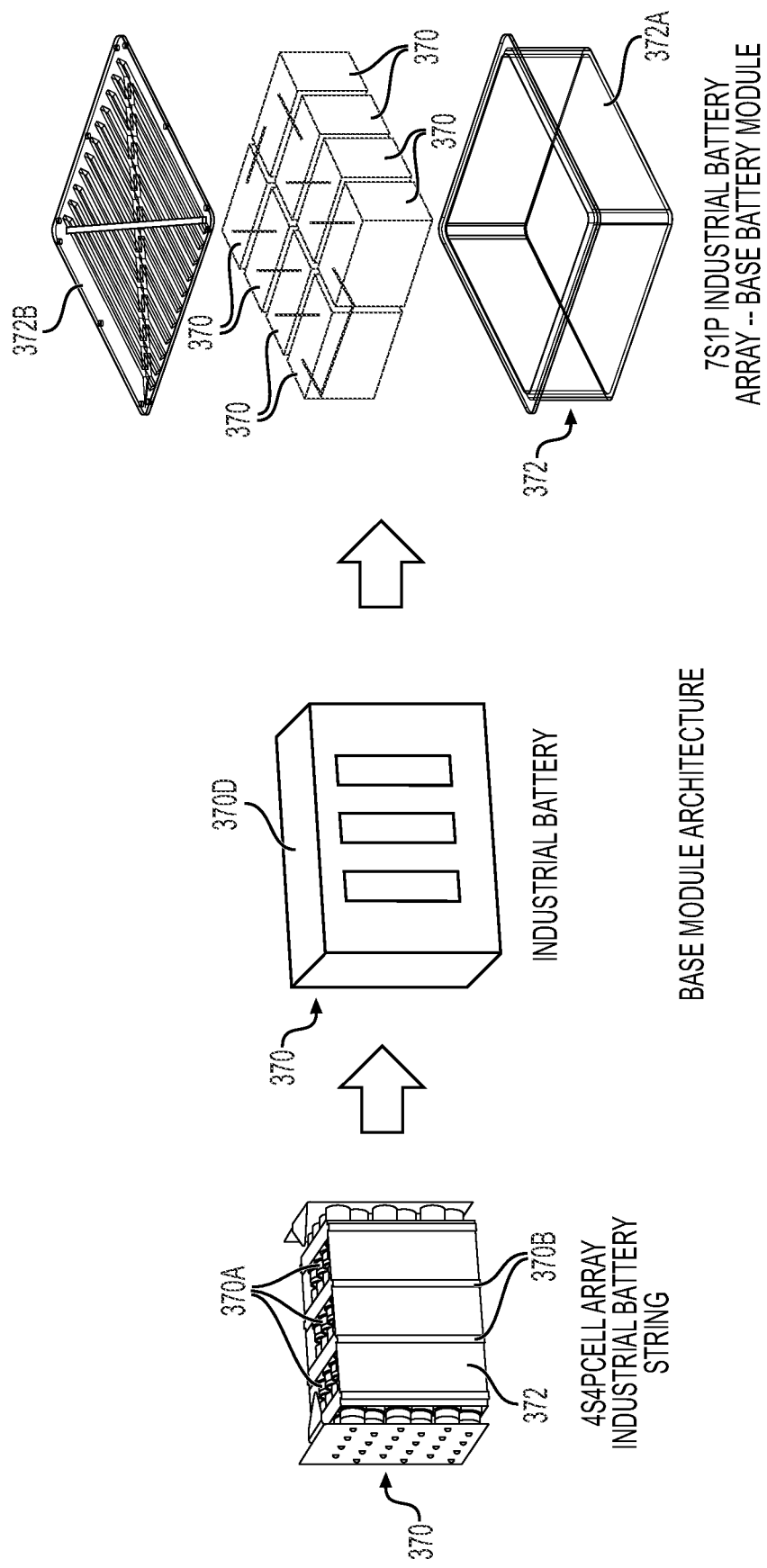
FIG. 29 is a flow diagram showing various stages of construction of a base battery module for use in an electric reservoir for the fast charge electric vehicle (EV) system according to the present invention.

The general construction of electric reservoir modules 222A, 222B, 222C, 222D or 322A, 322B, 322C, 322D comprising on consisting of one or more base battery modules 372, for example, is shown in FIG. 29.

The basic battery rating shall vary based upon the specific rated cells selected in the construction of the NOCO brand 12 VDC Nominal 100 Ah dual use industrial batteries 370. The ratings as defined in this specification will be based on the values prescribed in this section.

Alternative Construction

The general construction of an alternative construction of the electric reservoir modules 222A, 222B, 222C, 222D or 322A, 322B, 322C, 322D comprising or consisting of the base battery module 372', for example, is shown in FIG. 29.

Figure 30:
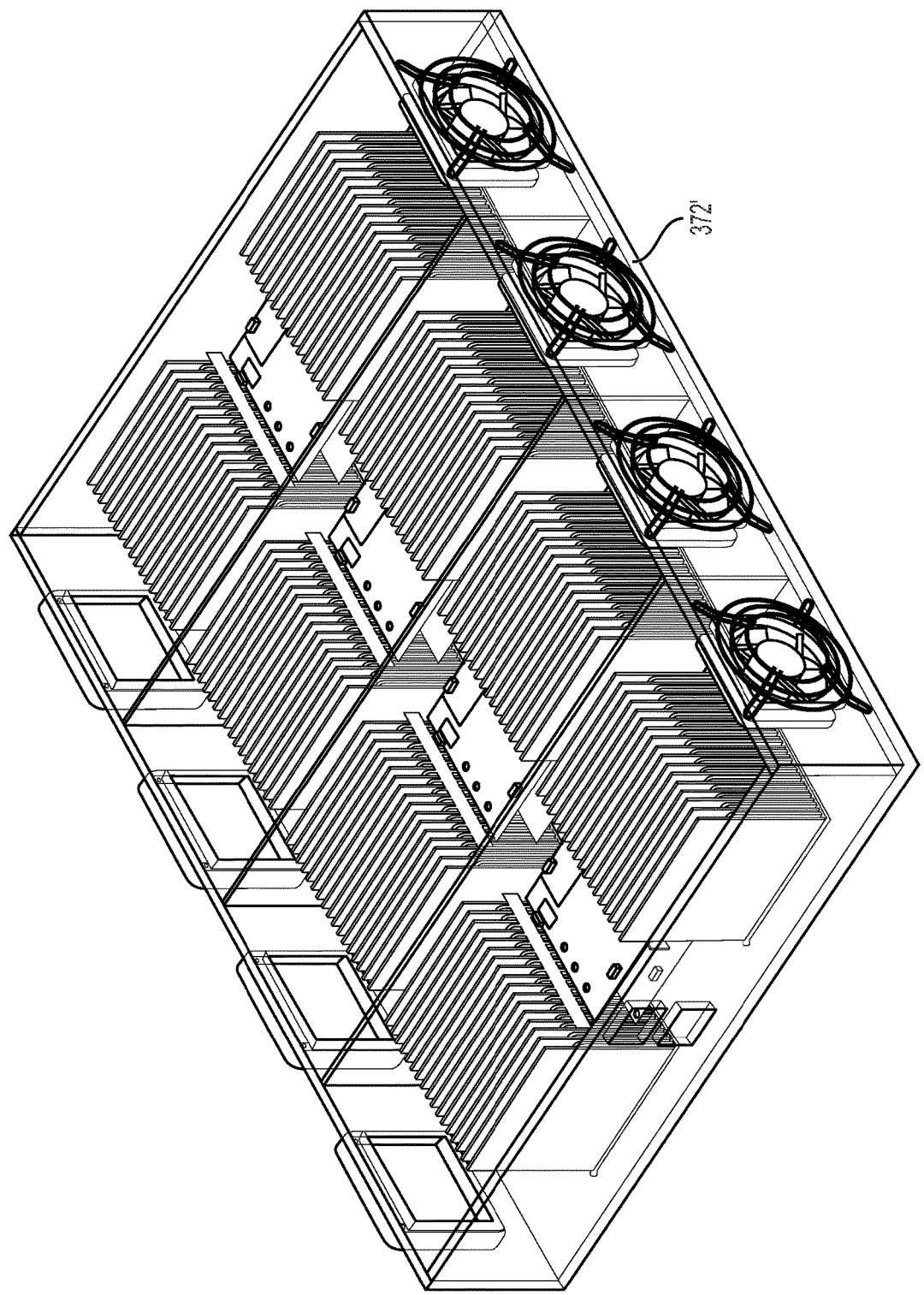
FIG. 30 is a perspective view showing an assembled base battery module without the base battery module lid installed.

In this construction, for example, a Shida 120 Ah pouch cell array and BMS(es) are integrated into an integrated thermal solution for packaging and cost efficiency, as shown in FIG. 30.

Battery Module Life

The electric reservoir modules 222A, 222B, 222C, 222D or 322A, 322B, 322C, 322D, for example, can have a life rating of >1000 charge/discharge cycles. A charge/discharge cycle is defined as the energy cycle between the maximum allowable charge voltage and the minimum cut-off voltage as specified by the manufacturer of the internal battery cell used in the construction of the NOCO brand dual use industrial battery.

To increase duty life, additional battery mass should be considered such that the current delivery requirements to the target EV/HEV battery pack(s) do not exceed 70% SOC of the NOCO brand dual use industrial batteries that comprise the electric reservoir modules 222A, 222B, 222C, 222D or 322A, 322B, 322C, 322D.

Power (Charge) Reservoir Requirements

Architecture

The electric reservoir 222 or 322 (FIGS. 19 and 20) comprise or consist of electric reservoir modules 222A, 222B, 222C, 222D or 232A, 232B, 232C, 232, which comprise or consist of one or more base battery modules 372. The base battery modules 372, for example, comprise or consist of one or more batteries 370 (e.g. dual use industrial battery, Li-ion battery), as shown in FIG. 29. For example, the electric reservoir modules 222A, 222B, 222C, 222D or 322A, 322B, 322C, 322D comprise or consist of multiple base battery modules 372 each comprising or consisting of multiple batteries 370.

Specifically, the electric reservoir 222 or 322 comprise or consist of multiple batteries 370 connected and assembled together (i.e. constructed). Each of the one or more batteries 370 can be assembled or constructed of multiple battery cells 370A connected together by conductive plates 370B to form a battery assembly 370C, which is enclosed in a battery cover 370D, as shown in FIG. 29. It is noted that the 7S1P array, for example, can be updated to an 8S1P array. Further, for example, the fast EV charge system can be updated to a 4S4P configuration of 30 Ah cells resulting in 12.8V/120 Ah battery.

Multiple batteries 370 can be arranged and connected together to provide one or more base battery modules 372. For example, the one or more base battery modules 372 each comprise or consist of a 7S1P string of 12 VDC nominal 120 Ah dual use industrial batteries (e.g. Li-ion batteries). The 7S1P can be updated to 8S1P (referring to the base battery module) of which two can be connected together in series to provide a 204.8V reservoir voltage.

For example, each base battery module 372 can comprise or consist of a battery module container 372A (e.g. tray, tub) and a battery module container lid 372B, and can house seven (7) dual use industrial batteries 370 connected together in a series configuration to provide 84 VDC nominal voltage. An eight ($8^{th}$) battery position within each base battery module 372 can be occupied by base battery module control electronics and integration hardware. The base battery module 372 buildup assembly is shown in FIG. 29. Alternatively, the $8^{th}$ battery position can be occupied by the battery itself in an 8S1P configuration. Further, the 84 VDC nominal figure shown can be updated to 12.8×4=102.4 VDC.

Figure 31:
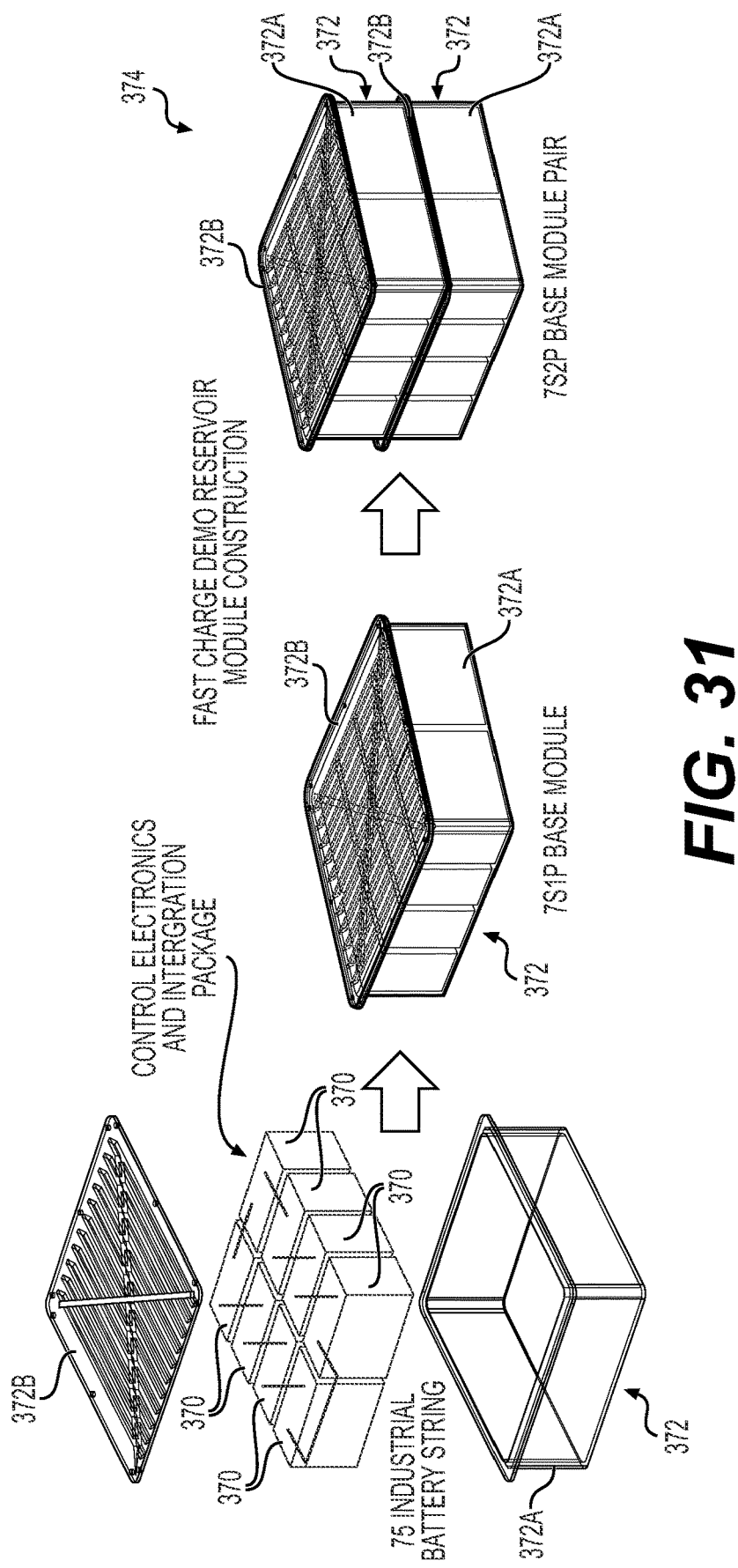
FIG. 31 is a flow diagram showing various stages of construction of a base battery modular pair for use in an electric reservoir for the fast charge electric vehicle (EV) system according to the present invention.

Two (2) base battery modules 372, for example, can be electrically connected together in parallel (e.g. 1S2P module battery array) to provide a base battery pair 374, as shown in FIG. 31. The base battery pair 374 (e.g. 7S2P battery array) can be capable of a minimum of 20.16 KWh.

Figure 32:
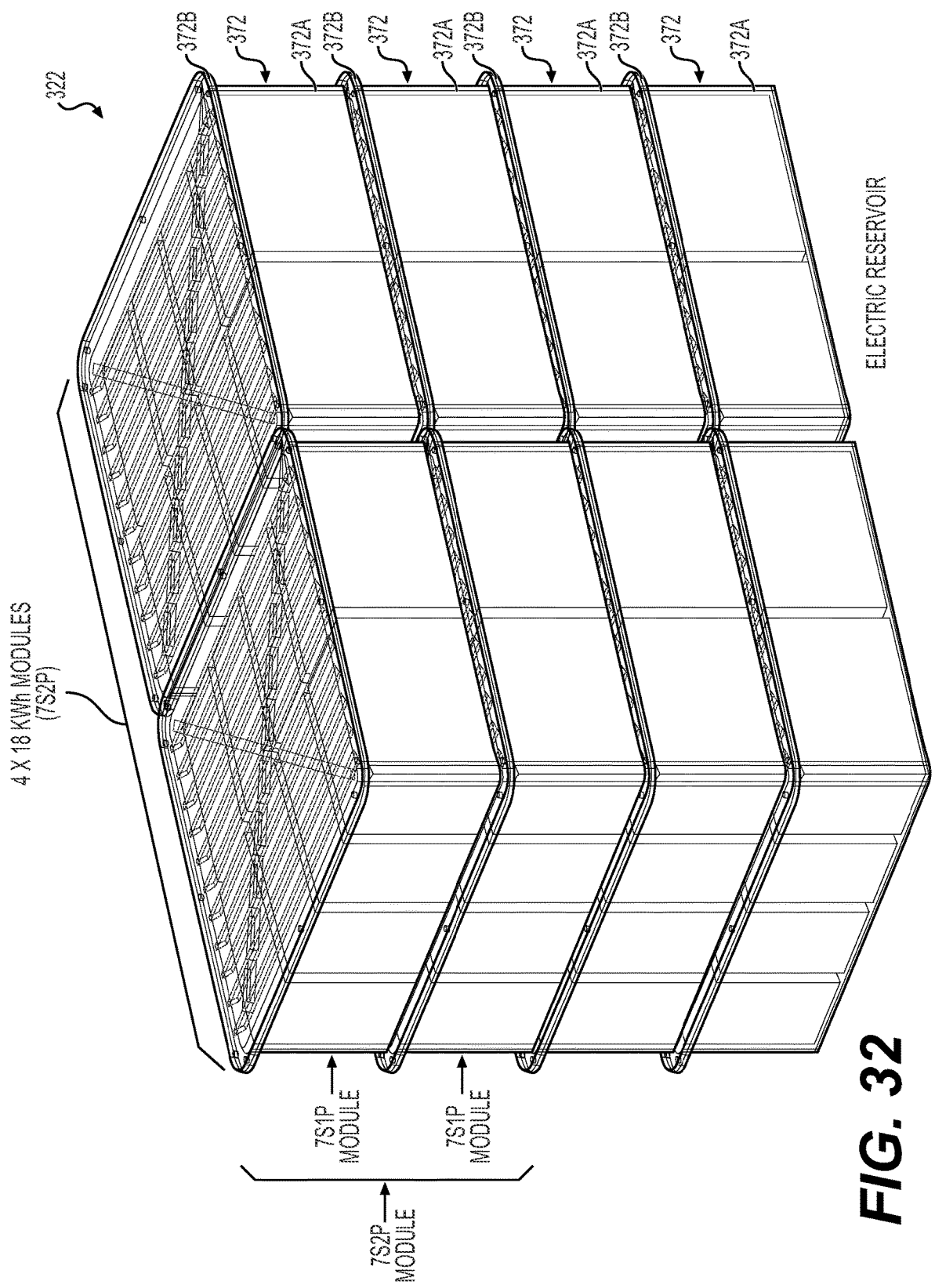
FIG. 32 is a perspective view of an assembled electric reservoir for the fast charge electric vehicle (EV) system according to the present invention.

The assembled electric reservoir 222, 322 (i.e. Fast Charge Electric Reservoir), for example, can comprise or consist of eight (8) base battery modules 372 connected electrically together in pairs (e.g. 1S2P base battery modules). These eight (8) base battery modules 372, for example, can be stacked in two (2) units consisting of four (4) modules per stack, for example, as shown in FIG. 32.

Base Module Configuration.
  Internal Base Module Array: 7S1P
    Alternatively, the fast EV charge system can use 2×8S1P base modules resulting in a 16S1P configuration yielding 204.8V/120 Ah reservoir.
Stacked Base Module Configuration
  Stacked Base Module Array: 1S2P
Charge Reservoir Configuration
  Charge Reservoir Array: 4× 20.16 KWh Modules (Stacked)
Power Head 336 Configuration The power head 336, for example, can be configured such that it is physically independent of the electric reservoir 222 or 322 structure (Reference: System Mechanization). The electric reservoir 222 or 322, for example, can be remotely located from the power head 336 such that all access panels of the electric reservoir 222 or 322 are available for service without required dis-assembly of the power head 336 (vice versa).

Consideration of this physical separation, for example, can be governed by an engineering assessment regarding the impact of cable length routing and resistance and power efficiency losses.

Power Management

The fast charge electric vehicle (EV) system 210 or 310, for example, can provide multi-mode operation. The primary modes of operation are defined below. These modes are not definitive and "blended modes" of operation are possible based upon circuit complexity and desired efficiency in the use of available power. These modes of operation shall be optimized based.

Electric Reservoir Charging

The fast charge electric vehicle (EV) system 210 or 310, for example, can be configured and capable with the electric reservoir 222 or 322 at full capacity, of charging a single EV/HEV from a single fully charged base battery module 372. Upon completion of the EV/HEV charge cycle, the fast charge electric vehicle (EV) system 210 or 310 shall "circle" to the next base battery module 372 in preparation for charging the next EV/HEV in sequence.

By-Pass Mode Charging

By-pass mode charging is defined as the transfer of charge directly between the primary AC/DC converter 216 or 316A, 316B, 316C, 316D of the fast charge electric vehicle (EV) system 210 or 310 and the target battery pack of the EV/HEV vehicle to be charged.

The fast charge electric vehicle (EV) system 210 or 310, for example, can be capable of operating in by-pass mode based upon the following criteria, including the base battery modules 372 are depleted, cyclic efficiency is advantageous in by-pass mode dependent upon the SOC of the base battery modules 372, cyclic efficiency is advantageous in "charge topping" with respect to the buck/boost operation dependent upon Battery Module SOC, direct charging from the AC/DC converter is advantageous based upon voltage/capacity characteristics of the target EV/HEV battery pack, and any combination of the above.

Power Transfer

The power transfer between the fast charge electric vehicle (EV) system 210 or 310 and the target EV/HEV battery pack to be charged shall follow the recommended charge protocol of the Original Equipment Manufacturer (OEM). It is anticipated that a "handshake" shall be communicated via the CSS DC charge port communications interface that allows for the selection of the appropriate charge protocol. In the event that this handshake is not possible, the fast charge electric vehicle (EV) system 210 or 310 shall select a charge protocol based upon the "sensed" voltage and initial current draw imposed by the target EV/HEV battery pack to be charged.

Battery SOC/DOD Operating Limits

The fast charge electric vehicle (EV) system 210 or 310 software logic must be capable of recognizing when the EV/HEV target battery pack is within serviceable limits. This may be achieved whether via data exchange during the "handshake" process between the charging system and the EV/HEV target battery pack or by means of simple voltage measurement at the terminals.

The behavior of this logic shall be as follows:
  When the EV/HEV target battery pack performance is within defined serviceable limits, the charging process shall proceed as monitored to completion (100% SOC or predetermined Terminal Voltage);
  When the EV/HEV target battery pack performance is outside of normal parameters, the charging process shall be halted and the common bus(es) discharged; and
  When, during the charging function, an inadequate input source of power is detected, the charging system shall close out the charging process in a normal mode of operation.

Reservoir Module Voltage Select
  A voltage split detection scheme.
Reservoir Circular Operation (Module Select)

The fast charge electric vehicle (EV) system 210 or 310, for example, can be capable of selecting the appropriate base battery module 372 based upon data available from the base battery module sub-controller and the charge request information obtained from the EV/HEV target battery during the "handshake" process.

The fast charge electric vehicle (EV) system 210 or 310 shall select the appropriate base battery module 372 (circling) based upon the overarching goal of maximizing power transfer and maximizing utility of capacity over a given duty cycle (daily operation). This shall be interpreted as, whenever possible, depleting the base battery modules 372 as near sequentially as possible based upon the voltage and capacity requirements of the EV/HEV target battery requirements.

Voltage Trimming (OPTION)

Figure 33:
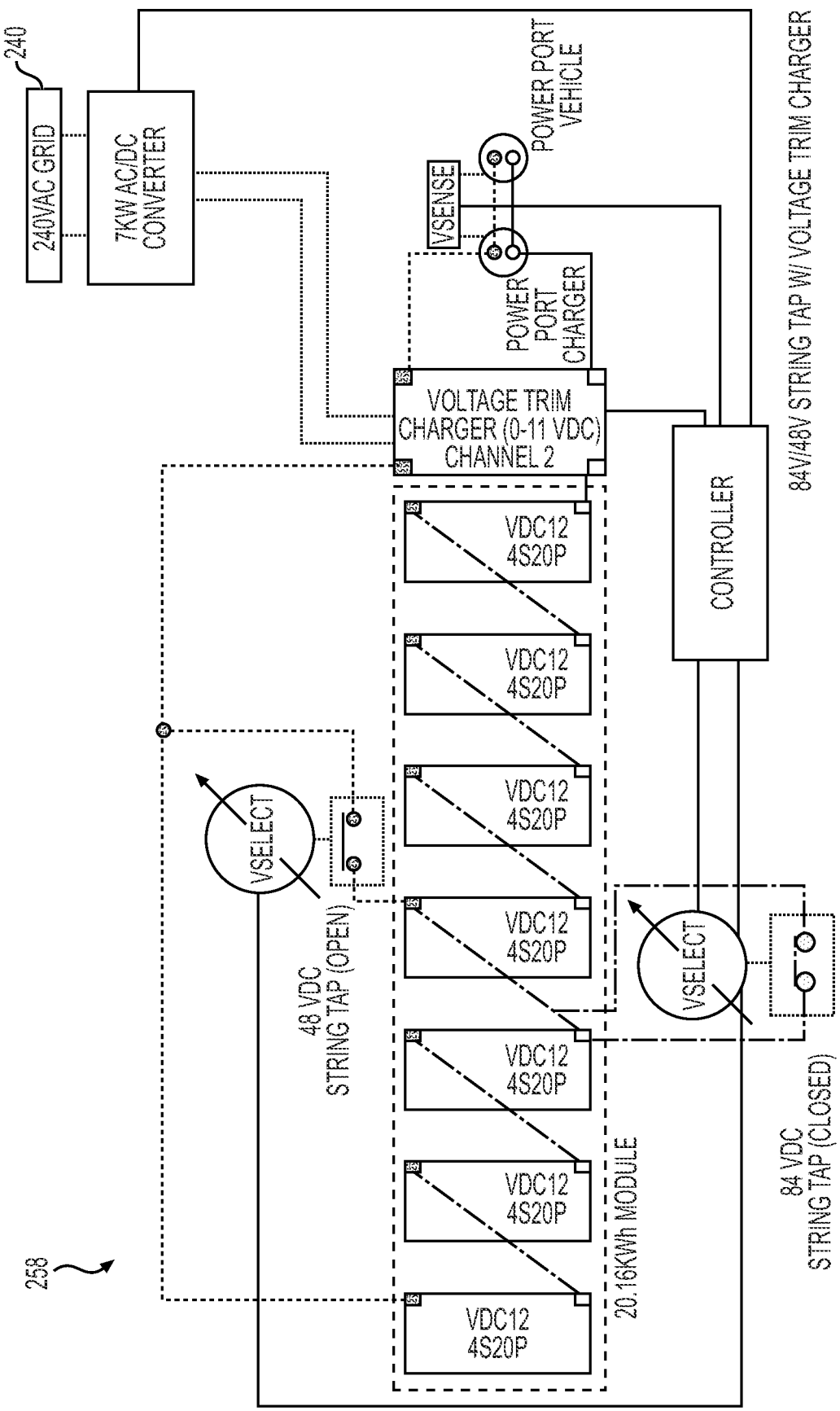
FIG. 33 is a diagrammatic view of a voltage trimming system for use in the fast charge electric vehicle (EV) system according to the present invention.

In the voltage trimming system 258 architecture, as shown in FIG. 33, the AC/DC converter 216 or 316A, 316B, 316C, 316D is configured such that its DC output is strung in series with the 7S string to provide the "trim" voltage required to create the specific output voltage needed for the instantaneous charge voltage of the target battery pack. The operating benefit is that the "trim" charge voltage is created from the available utility power grid source or supply such that the power losses involved with a "Buck/Boost" system are eliminated. This would result in more efficient use of the capacity available in the electric reservoirs 222 or 322.

An additional operating mode can be achieved by selectively splitting the 7S string such that it is sized to a 48V capability. This would effectively reduce the need for high Bucking ratios that would otherwise be required for the two targeted EV/HEV applications (i.e. EZ-GO @72 VDC and Polaris @48 VDC).

The drawback is increased complexity of the circuit design and the need to achieve a system for which the underlying voltage sources behave as "perfect voltage" sources.

Boost/Buck Select (OPTION)

Figure 34:
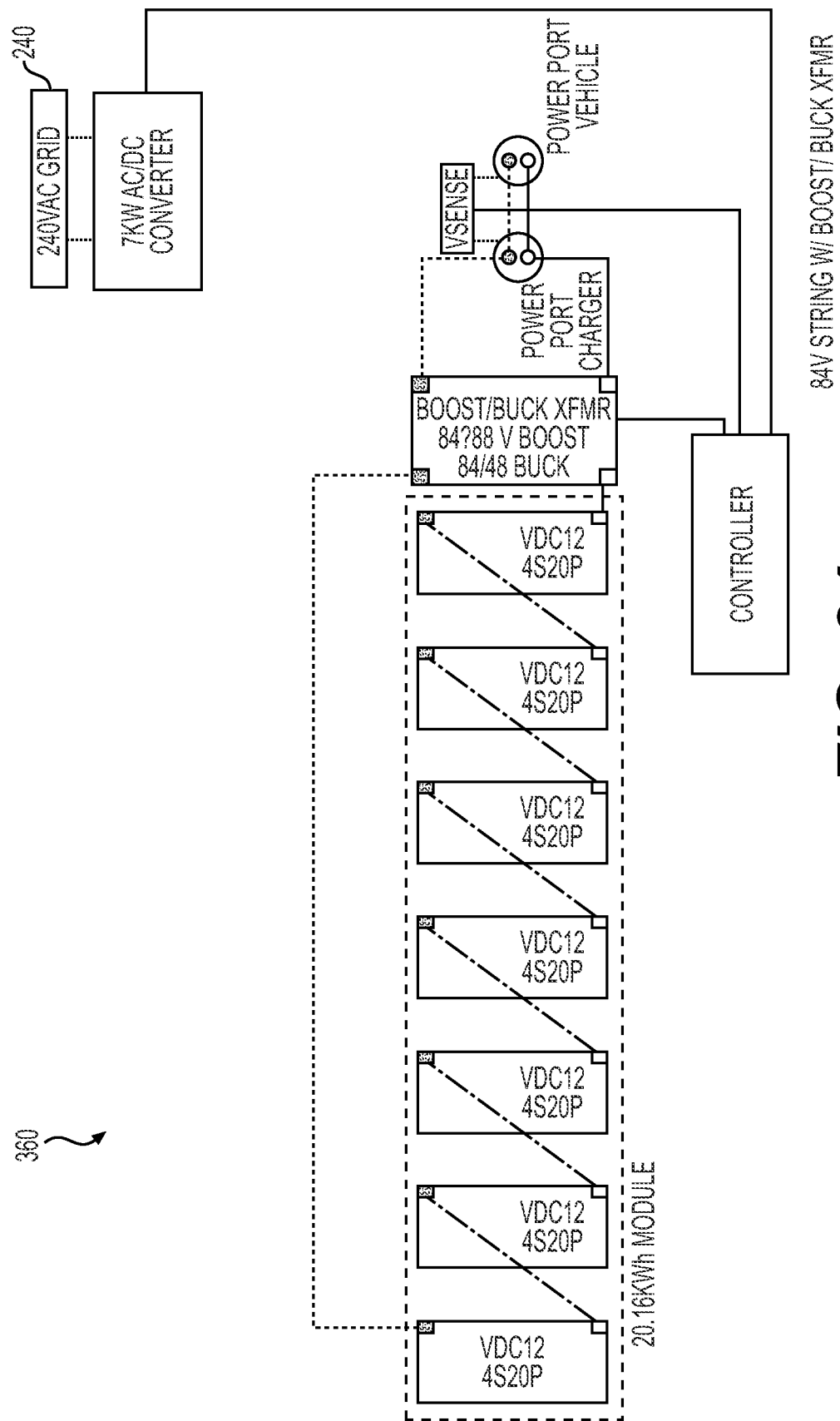
FIG. 34 is a diagrammatic view of a boost/buck system for use in the fast charge electric vehicle (EV) system according to the present invention.

In the Boost/Buck system 360 architecture, as shown in FIG. 34, the circuit shall incorporate a boost/buck transformer that behaves as follows.

When the electric reservoir 222 or 322 is providing a voltage above that required for the commanded charge voltage operating point, the Boost/Buck transformer shall operate in Buck mode at the appropriate Buck ratio required to achieve the commanded charging voltage. This is more efficient use of the capacity of the electric reservoir 222 or 322, and the system should be designed to maximize this mode of operation.

The electric reservoir 222 or 322, for example, can be designed with an appropriate base voltage rating such that buck operating mode is preferential to boost operating mode.

When the electric reservoir 222 or 322 is providing a voltage below that required for the commanded charge voltage operating point, the Boost/Buck transformer shall operate in boost mode at the appropriate boost ratio required to achieve the commanded charging voltage. This is a very inefficient use of the capacity of the electric reservoir 222 or 232, and the system should be designed to minimize this mode of operation.

FIGS. 33, 34 show a single 7 kW AC/DC converter, in the system. The 7 kW AC/DC converter, for example, can be selected for each 220V/40 A breaker as it should only carry 32 A continuous load per NEC (80% of 40 A rating). The 220V*32A~7 kW (for Unity Power Factor).

However, a fuel (e.g. gasoline) pumping station, for example, can have multiple 240V/40 A outlets or a pad mounted transformer with much higher ampacity (e.g. 500 A or 800 A), which would provide for a much larger charge rate of the electric reservoir.

For example, the fast charge electric vehicle (EV) system can use a single 30 kW AC/DC converter. In FIGS. 33 and 34, if 7 kW AC/DC converters are used, for example, several multiple 240V outlets (e.g. 4 or 5) can be provided each with a 7 kW AC/DC converter, and each supplying a separate reservoir. Alternately, the outputs of the individual 7 kW AC/DC converters can be arranged in parallel to effectively provide 28 kW or 35 kW of power into a larger reservoir. As an alternate, higher capacity AC/DC converter(s) can be fed from a 3-phase AC panel.

Blended Power

Blended Power is an operating mode in which the fast charge electric vehicle (EV) system 210 or 310, for example, can draw power from both the utility grid via the AC/DC converter 216 or 316A, 316B, 316C, 316D (maximally) and the electric reservoir 222 or 322 (minimally) as required to meet the commanded instantaneous charging voltage. The power, for example, can be blended as an output function of the synchronous (active) rectification process of the DC/DC converter 226, 326 stage.

This topology will likely produce the best system efficiently and result in the most efficient use of the capacity of the electric reservoir 222, 322. It must be noted that with elimination of string splitting in the "trim voltage" option above, trim voltage and blended power modes are very similar based upon circuit architecture decision.

The modes previously described are not mutually exclusive. Further engineering analysis is required to determine which methods or combination of methods will produce the best cost/efficiency solution for the fast charge electric vehicle (EV) system 210 or 310, and its requisite electric reservoir 222, 322.

Mechanical Requirements

Battery Module Geometry

The battery module geometry shall be constructed as follows:

Battery Module Container (Tray)

The base element of the base battery module 372, for example, can comprise or consist of the battery module container 372A (e.g. rotary mold formed, blow mold formed, or vacuum mold formed structural tray or tub) and a battery module container lid 372B (e.g. cover lid). For example, the battery module container 372A can have formed in detent features that secure each individual NOCO dual use industrial battery 370 in place.

Each NOCO dual use industrial battery 370 shall be secured in its individual detent in the battery module container 372A via a battery hold down bracket and fastener(s).

The battery module container 372A, for example, incorporate formed cleats on the outer bottom surface such that these formed cleats shall interlock to corresponding detents in the battery module container lid 372B of the subsequent base battery module 372 upon which it may be stacked.

The battery module container 372A, for example, can incorporate features on the upper flange for which threaded inserts may be pressed for closure of the battery module container lid 372B of the base battery module 372.

The battery module container 372A, for example, can incorporate flanges for assembly of trussing and support elements to assist with load bearing for stacking.

The battery module container 372A, for example, can incorporate channeling and a water drain on the inside of the bottom surface of the battery module container 372A to provide for a low point drain.

The top flange surface of the battery module container 372A shall incorporate a recessed channel in which either a sealant bead or sealing cord (e.g. O-ring or square-shaped ring) may be applied.

The battery module container 372A, for example, can incorporate cut-outs to accommodate blower fans 372C.

The battery module container 372A, for example, can have a flanged feature to accommodate the electrical and communication connections.

The battery module container 372A material shall comprise or consist, for example, an insulating plastic material (e.g. polyurethane, polyethylene).

Battery Cover (Lid)

The battery module container lid 372B, for example, can be structural with cross ribs and trussing such that is can support the weight of stacked and assembled base battery modules 372.

The battery module container lid 372B, for example, can incorporate locating detent features such that upon placement on the battery module container 372A, the fastening hardware locations are automatically aligned.

The battery module container lid 372B, for example, can have features in corresponding locations to the battery module container 372A such that metal inserts may be installed to support the flange pressures imposed by the fastening hardware.

The battery module container lid 372B, for example, can have a recessed channel that corresponds to that of the flange of the battery module container 372A such that either sealing compound or a sealing cord (see above) may be applied.

The battery module container lid 372B, for example, incorporate detents such that the corresponding cleats of the battery module container 372A may be positively registered for location and stacking.

The battery module container lid 372B material, for example, can comprise or consist of an insulating plastic material (e.g. polyurethane, polyethylene).

Base Battery Module Sealing

The base battery module 372, for example, can be configured to provide the primary weather sealing of the contained components.

The sealing methods employed, for example, can comprise or consist of direct sealant application, sealing cord application, or barrier methods such as louvered fans for preventing wind driven rain from entering the base battery module 372.

Base Battery Module Hardware

All hardware utilized in the construction or assembly of the base battery module 372, for example, can conform to ISO Class 10.9 standards or equivalent (SAE Grade 8.8).

All fasteners, for example, can be implemented with corresponding size and rated washers.

All inserts used in the construction or assembly of the base battery module 372, for example, can be equivalent to the fastener class/grade specified above.

Base Battery Module Cooling

Figure 35:
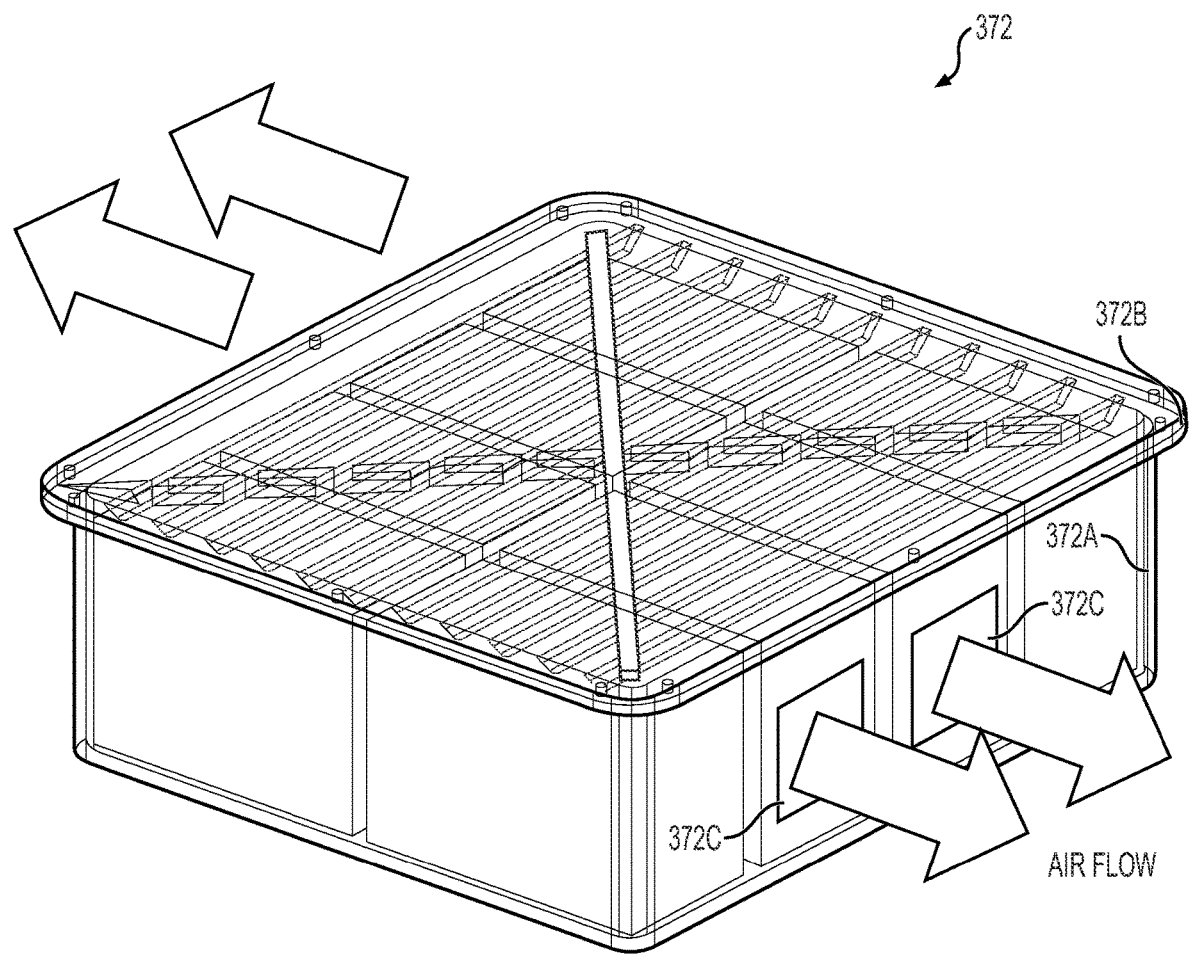
FIG. 35 is a perspective view of a base battery module showing air flow exiting the base battery module of the electric reservoir for use in the fast charge electric vehicle (EV) system according to the present invention.

The base battery module 372 can be configured to provide cooling and/or can include cooling equipment (e.g. vent(s), fan(s), air conditioning, cooling circuit) to prevent the base battery module 372 from overheating. For example, the base battery module 372 is provided with venting to allow outward air flow of heated air to exit the sides of the base battery module 372, as shown in FIG. 35.

Module Mechanization

Figure 36:
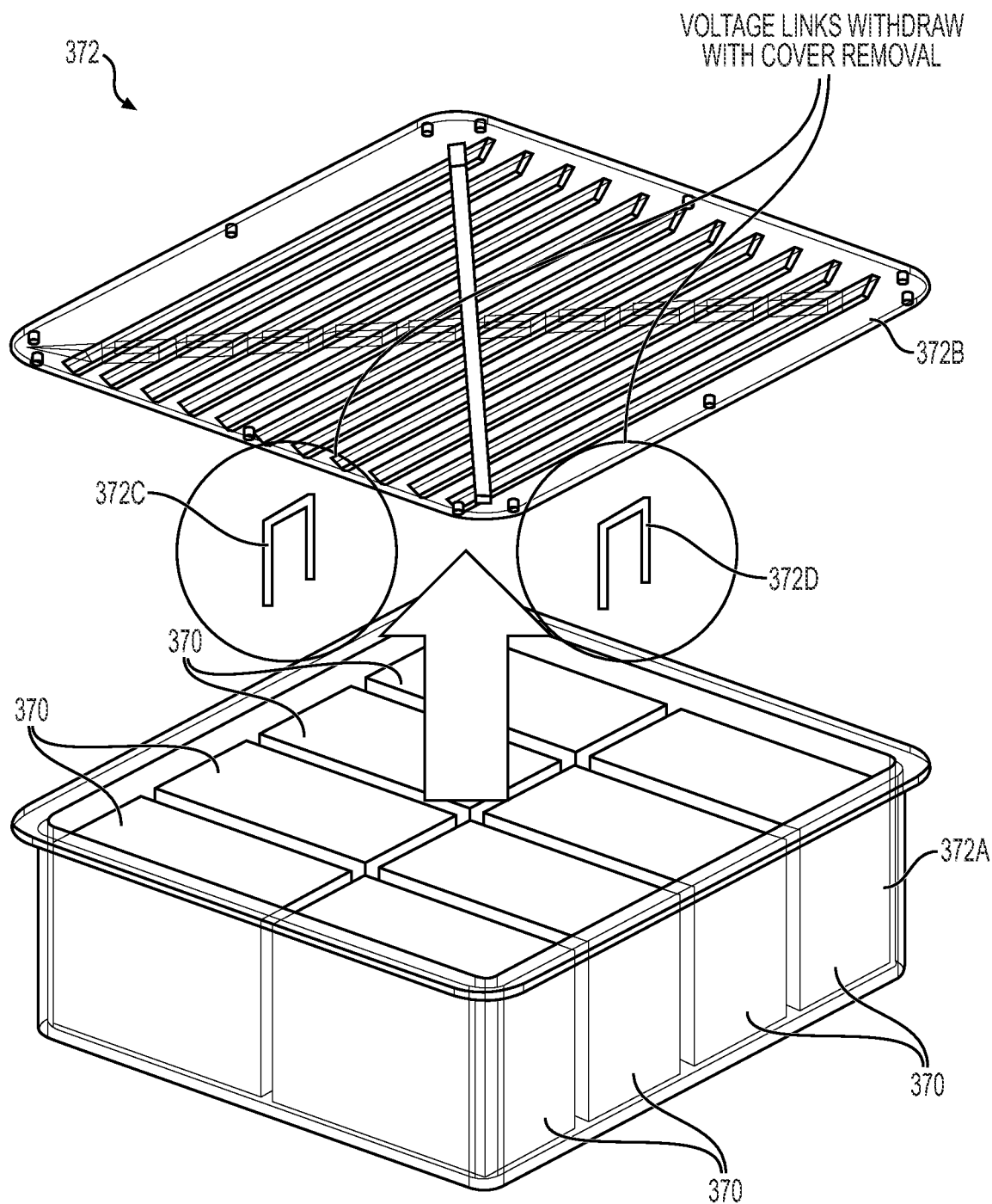
FIG. 36 is a perspective view of a base battery module showing "voltage continuity links" or "high voltage jumpers" embedded in the base battery module lid such that removal of the base battery module lid naturally sub-divides the battery array string voltage simply by removal of higher ordered components.
Figure 37:
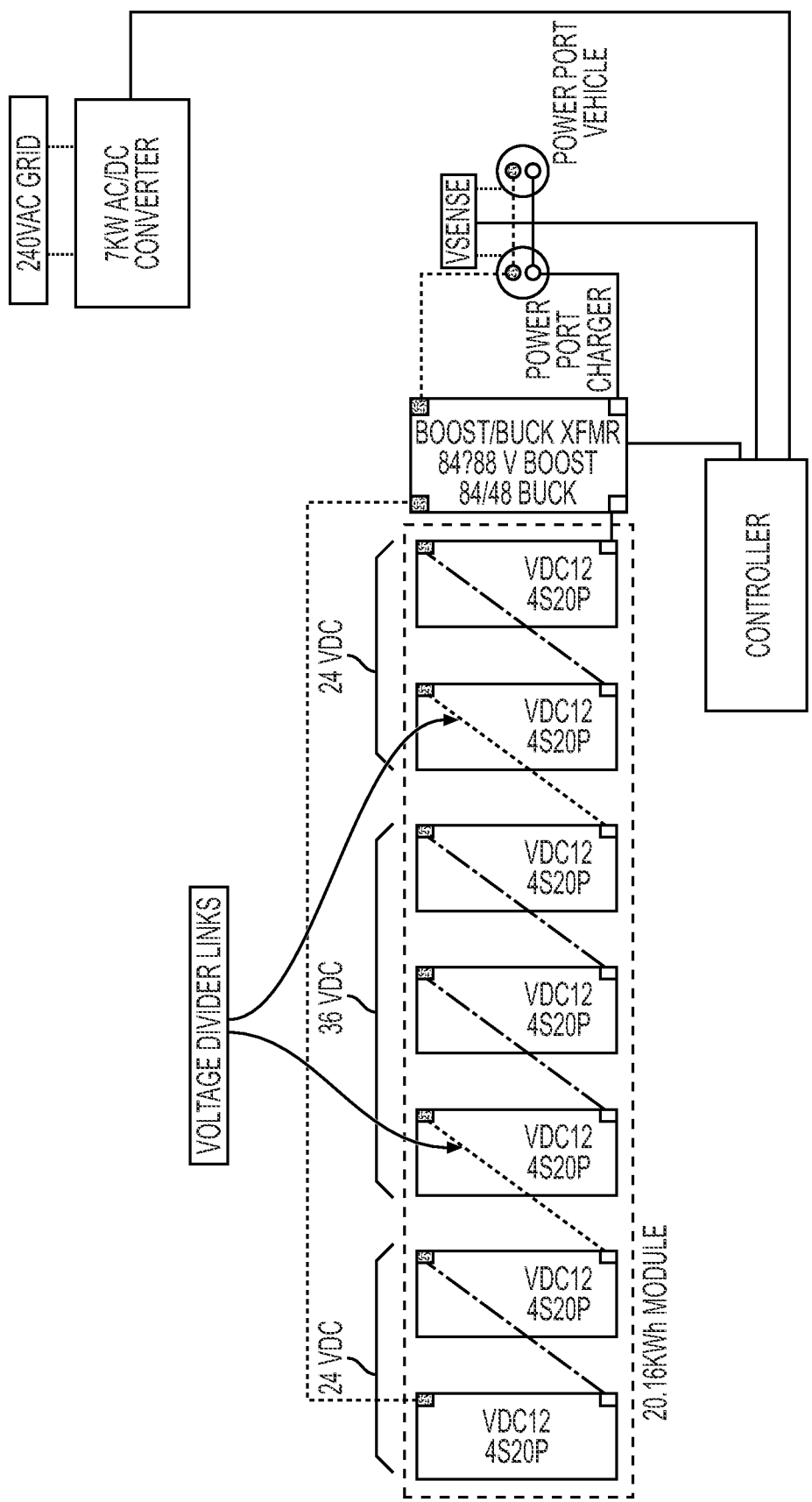
FIG. 37 is a diagrammatic view of the base battery module showing the "voltage continuity links" or "high voltage jumpers" embedded in the base battery module lid.

The base battery modules 372 of the electric reservoir 222 or 322, for example, can be constructed such that the process of dis-assembly of the base battery modules 372 forces the internal voltage level to be reduced as a function of dis-assembly, as shown in FIG. 36. This may be achieved by means of voltage continuity links 372C and 372D (or high voltage jumpers) embedded in the base battery module lid 372B such that removal of the base battery module lid 372B naturally sub-divides the battery array string voltage simply by removal of higher ordered components, as shown in FIG. 37. The purpose of these features is to provide inherent high voltage safety to both assembly and service personnel.

System Mechanization

The fast charge electric vehicle (EV) system 210 or 310 mechanization is as follows.

Figure 38:
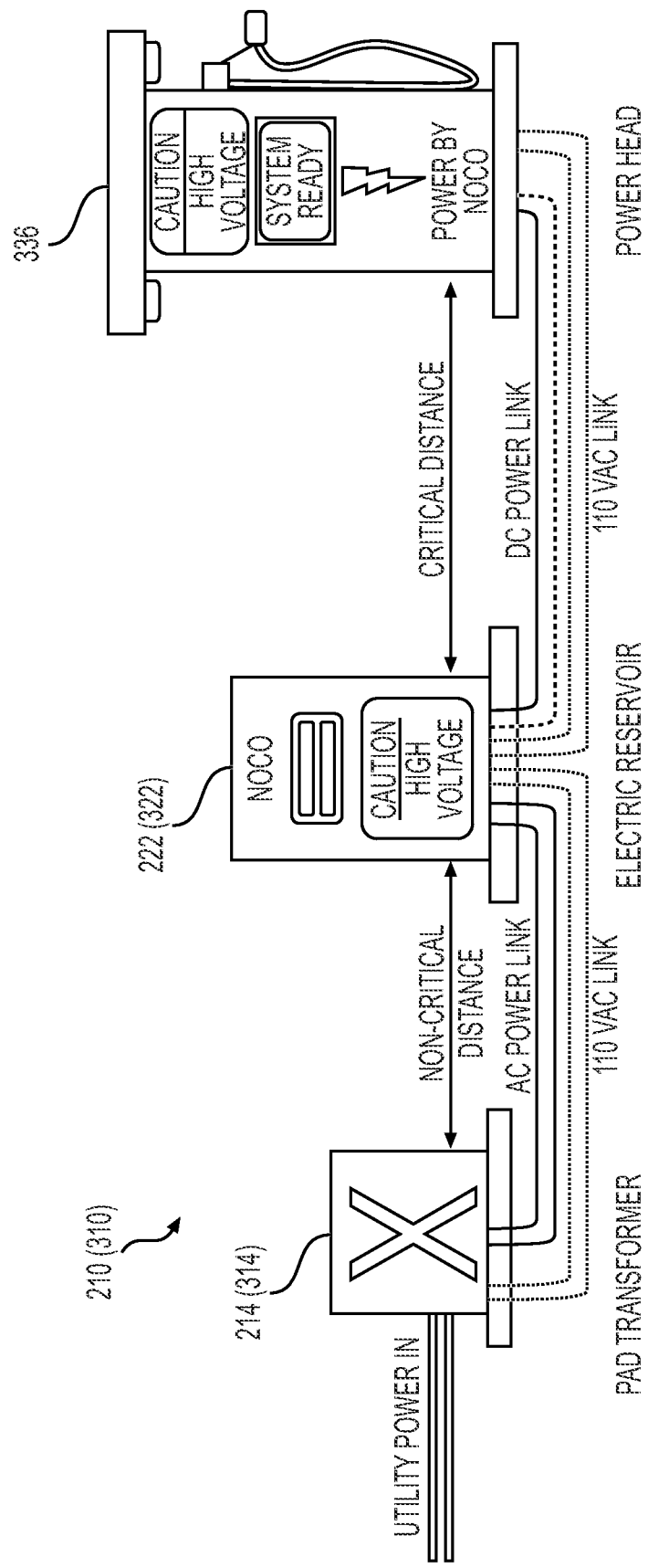
FIG. 38 is a diagrammatic view showing power flow and power conversion stages from the power grid to the power head for charging the electric vehicle (EV).

A utility grid AC power drives a pad transformer 380, as shown in FIG. 38. The pad transformer 380 steps down the AC power to the appropriate voltage.

The conditioned AC power is then directed to the electric reservoir 222 or 322.

The AC power is then converted to DC power to either charge the base battery modules 372 of the electric reservoir 222 or 322, or by-pass the electric reservoir 222 or 322 to directly charge an EV/HEV target battery pack via the power head 336.

When grid power is inadequate, DC power is drawn from the electric reservoir 222 or 322 and directed to the power head 336 to charge an EV/HEV target battery pack. The system "circles" to the next base battery module 372 to continue sequentially charging the next EV/HEV target battery pack.

High Voltage Creepage and Clearance Requirements

For the purposes of fast charge electric vehicle (EV) system 210 or 310 creepage and clearance requirements, ISO 6469-1:2009 (High Voltage Onboard charging systems), for example, can be referenced until a suitable stationary deployment specification can be found.

All high voltage creepage and clearance distances between devices of rated potential shall be evaluated and conform to this standard.

Thermal Management

The fast charge electric vehicle (EV) system 210 or 310 will require a multi-modal thermal management system. It is anticipated that the following thermal management techniques will apply to the following subsystems, including electric reservoir 222 or 322, conductors/bus bars (e.g. input bus 220 or 320, and output bus 224 or 324), for example, can be conductively cooled. The batteries 370 (e.g. NOCO Dual Use Industrial Li-ion Batteries), for example, can be convectively air cooled via dedicated blower fans 372C (or vents) within each base battery module 372, as shown in FIG. 35. These fans, for example, can be positively controlled, and:

Electronic control modules, for example, can be convectively air cooled via sealed external (i.e. external with respect to the control module but internal to the base battery Module) housing heat sinks;

Electric reservoir 222 or 322 containment and environmental housing structure shall be vented to atmosphere, however, should be designed to meet all environmental/weather protection requirements of that sub-section;

AC/DC converter(s) 216 or 316A, 316B, 316C, 316D, for example, can each be a sealed module with internal conductive cooling to an external heat sink. The external surfaces of the heat sink shall be convectively air cooled via air blower fan(s);

DC/DC converter(s) 226 or 326, for example, can be a sealed module with internal conductive cooling to an external heat sink. The external surfaces of the heat sink shall be convectively air cooled via air blower fan(s); and Power head 336 Kiosk, for example, can be fan cooled.

Electric Reservoir Housing (Mechanical)

The electric reservoir 222 or 322 of the fast charge electric vehicle (EV) system 210 or 310, for example, can comprise or consist of a separately housed battery module array. This unit shall be enclosed in an appropriately grounded structure. The maximum distance of displacement from the power head 336 shall be defined based upon the DC link conductor resistance losses.

Although the electric reservoir 222 or 322 may be stylized and graphically decorated, the mechanical implementation shall be utilitarian (similar to an electrical transformer housing). This unit size will scale directly with the selected power deployment and should be modular in design (block volumes).

Power Head 336 Structure (Mechanical)

The power head 336 structure and design, for example, can be highly stylized to project the brand image (e.g. NOCO brand image) to the customer. The construction of this housing, for example, can be configured using internal pillars with stylized outer panels and cladding.

The materials selected for the structural pillars, for example, can preferentially be made of non-conductive material(s) with some metal elements to impart strength and rigidity. No conductive structural elements shall be within "contact proximity" to high voltage bus works and electrical components such that impact damage to the Power head 336 may result in high voltage potential external to the unit. The materials selected for the outer surfaces shall be of non-conductive material.

Fast Charge Electric Vehicle (EV) Systems Data I/O Connection

The fast charge electric vehicle (EV) system 210 or 310, for example, can be equipped with Ethernet connectivity. This Ethernet connectivity shall be capable of accessing the fast charge electric vehicle (EV) system data stored for data mining and system performance. The data to be accessible, for example, can include, but not be limited to battery module state of health (SOH), state of charge (SOC) history, battery cycle life monitoring (HOBBS), fault history, functional safety history, system readiness, and software support and maintenance.

EV/HEV I/O

The fast charge electric vehicle (EV) system 210 or 310, for example, can establish a "handshake" with the EV/HEV vehicle upon port connection. The characteristics to be shared in this "handshake" shall be used to define the charge protocol. These characteristics shall include but are not limited to:

EV/HEV target battery pack voltage;
EV/HEV target battery pack ident;
EV/HEV target battery pack charge protocol request; and
EV/HEV target battery pack charge completion.

Protection and Security

The fast charge electric vehicle (EV) system 210 or 310 components (i.e. electric reservoir 222 or 322 and power head 336) shall be designed and constructed by means of secure features that discourage dis-assembly and unauthorized access to internal subsystems. This may be achieved by means of security type fasteners, locking access panels and interlocking closure panels.

The design shall utilize inherent safety techniques such that removal of access and closure panels and/or violation of voltage protection barriers internal to the system while in a "powered state" shall trigger the HVIL system and break down the high voltage potential and discharge the bus(es) to safe voltage levels. For example, these safety features must be designed such that the panels and barriers are impossible to remove in a time that is less than the "detect and discharge time" capability of the HVIL safety circuit and logic.

Modular Scalability

The fast charge electric vehicle (EV) system 210 or 310, for example, can be designed such that each deployment is "power scaled" based upon both the available reserve grid power at the site and the desired capabilities requested by site authorities.

The primary factors affecting scalability are listed below, including available utility voltage at the application site, available utility reserve power at the application site, available reserve power based upon the usage of the commercial operation at the site, the number of vehicles throughput at the site, the EV/HEV vehicle battery pack voltage "mix" encountered at the site, the EV/HEV vehicle battery pack capacity "mix" encountered at the site; and the recovery capacity for the Charge Reservoir based on the factors noted above.

Electromechanical Architecture

The electromechanical architecture, for example, takes into account this concept of scalability. The bus works and the termination points within the electric reservoir 222 or 322, for example, can be constructed to maximize scalability (i.e. battery module connectivity). The electric reservoir 222 or 322 modularity, for example, can allow for the system to be expanded in a block format.

The power head 336, for example, can be designed and constructed, for example, to meet the maximum 350 KW power rating. For economic consideration, this shall be a common design for all power deployment variants.

Voltage Trim/Tapp

Buck/Boost

The buck mode is the preferred mode of operation for the purpose of maximizing efficiency. For regions of operation that require boost mode, for example, this mode can be limited to a 2:1 boost ratio for the purposes of efficiency.

To meet operational voltage requirements, it may be preferential to increase the battery module sting voltage that to operate within a sustained boost mode.

Software Requirements

As a high voltage apparatus, the fast charge electric vehicle (EV) system 210 or 310 shall require a high degree of operational control and system monitoring.

Charge System Control

The charge cycle and "circling" function required for maintenance of the electric reservoir 222 or 322, for example, can require a sub-controller (e.g. embedded controller) to be deployed within each base battery module 372. The base battery module 372 operational data parameters acquired by each sub-controller (e.g. embedded controller) shall be uploaded to a central controller for the purpose of determining system readiness, fault status, and functional safety.

System Monitoring

The primary elements of the monitoring system are stated below, including battery module state of charge, battery module state of health (SOH), fault monitor, functional readiness, functional safety, high voltage isolation, and high Voltage Interlock.

System Data I/O Protocol

EV/HEV Interface Protocol

The system protocol format will most likely be developed by vehicle OEM's for selection of specific battery pack charge profiles.

Regulatory Requirements

The regulatory requirements shall be based upon compatibility with those of mobile EV/HEV vehicle high voltage requirements. These requirements shall remain under continuous review for the purpose determining necessity for application to the fast charge electric vehicle (EV) system 210 or 310.

The standards that follow are for guidance and "engineering decision making" in the development of the fast charge electric vehicle (EV) system 210 or 310.

NEMA
  NFPA70 (NEC)
NEC
  National Electrical Code (NEC);
  NFPA 70 (Connection to Grid Power);
  625.10 Electric Vehicle Coupler;
  625.15 Marking;
  625.16 Means of Coupling;
  625.17 Cable and cable ampacity;
  625.18 Interlock (Control Pilot);
  625.19 Automatic De-energization of the cable;
  625.22 Personnel Protection Equipment;
  625.41 Overcurrent Protection;
  625.43 Disconnecting Means;
  625.44 Equipment Connection;
  625.48 Interactive Systems—Bidirectional;
  625.101 Part IV Wireless Power Transfer Equipment;
  Article 210.8 (Ground Fault Protection); and
  Article 210.12 (Arc Fault Arc Fault Protection);
IEEE
  IEEE 1547—Interconnecting Distributed Resources with Electric Power Systems;
  IEEE 1547.1—Conformance Test Procedures for Equipment Interconnecting Distributed Resources with Electrical Power Subsystems; and
  IEEE 2030.5.
UL
  UL 2202—Electrical Vehicle (EV) Charging System Equipment;
  UL 2594—Electric Vehicle Supply Equipment (EVSE);
  UL 2251—Plugs, Receptacles and Couplers for Electric Vehicles;
  UL 62—Flexible Cords and Cables;
  UL 2231-1 & -2—Personal Protection for EVSEs;
  UL 9741—Bidirectional EV Charging System Equipment (V2G);
  UL 1741—Standards for Inverters, Converters, Controllers and Interconnection;
  System Equipment for Use with Distributed Energy Resources (Grid);
  UL 458;
  UL 943;
  Subject 943C;
  UL 2231-1/2; and
  UL 1022.
IEC
  IEC 62196;
  61851-1;
  61850-90-8;
  IEC 60529
ISO
  ISO 15118
SAE
  SAE J1772;
  SAE J1850;
  SAE J2178; and
  SAE 2293.
Isolation Requirements
EMI/EMC Requirements
Environmental Durability Requirements
Materials
Sealing/Containment
Connectivity Requirements
Power Port (EV/HEV)

The EV/HEV charge port will be defined by the charge port configuration of the fast charge electric vehicle (EV) system.
Data
  Wi-Fi.
  Serial (Support).
  Ethernet.
Industrial Design Requirements
  Form Factor
  Style and Cosmetics.
Functional Safety Requirements
  Automatic System Indicator Requirements.
  Error Indicators.
  Cold Indicator(s).
  Hot Battery Indicator.
  Short Circuit Detection.
  Powering Accessory Devices.
  USB-C Charge Input & Output.

| Battery Temp | Charge |
|---|---|
| −15 C. to 0 C. | Slow Charge |
| 0 C. to 45 C. | Fast Charge |
| 45 C. to 55 C. | Slow Charge |

USB-A Charge Input & Output.
Diagnostic Mode.

All products, for example, can include provisions for a diagnostic mode. The diagnostic method, for example, can provide internal diagnostic information, including critical parameters to the main MCU. The USB-C Port shall be used for this function.

Fast Charge Station

Figure 40:
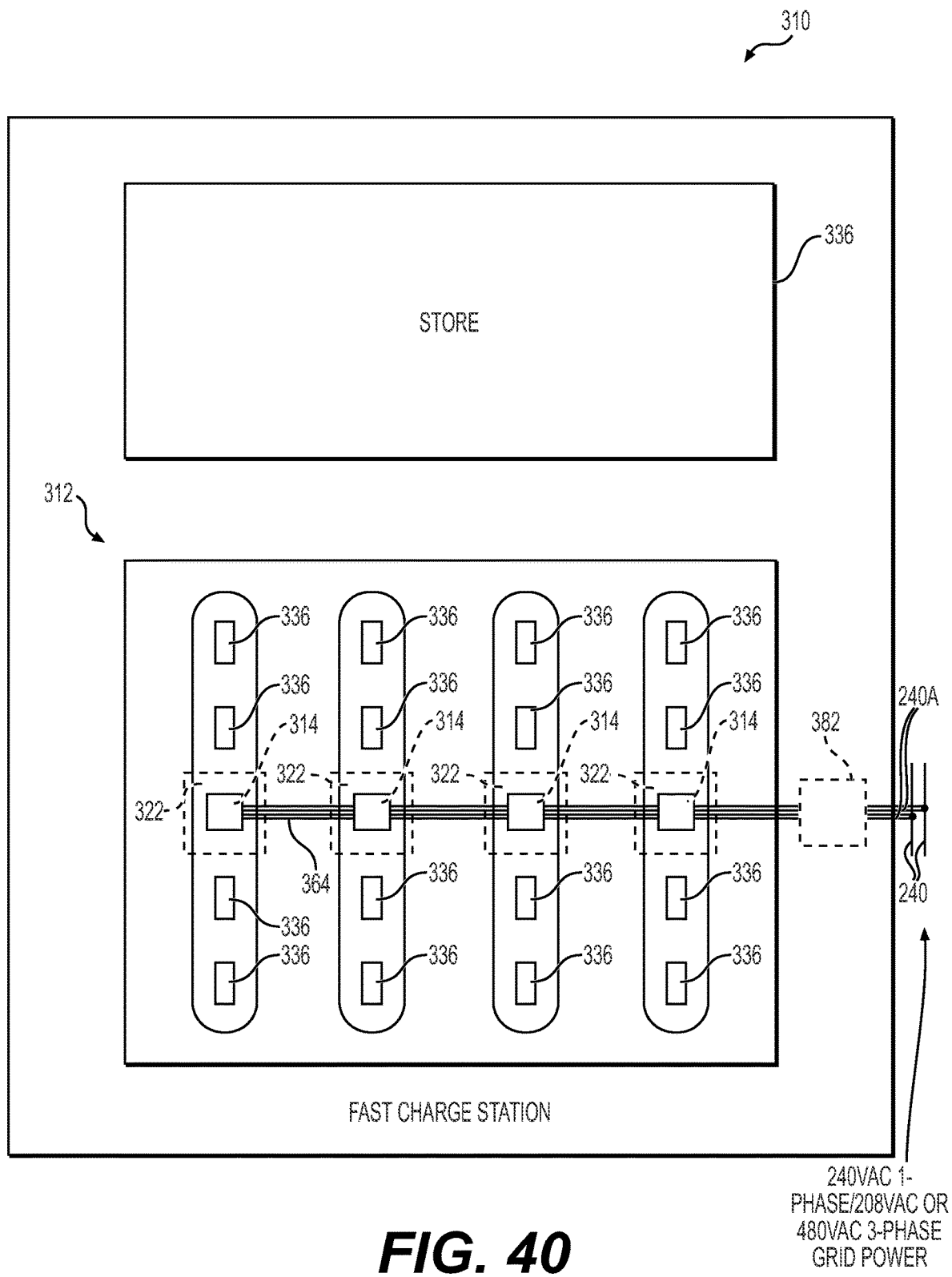
FIG. 40 is a diagrammatic view showing a fast charge electric vehicle (EV) system according to the present invention having multiple electric reservoirs (e.g. base battery modules) and multiple transformers (e.g. pad transformers) for providing power to multiple power heads.

A fast charge station 310 according to the present invention is shown in FIG. 40. The fast charge station 310 can be combined with a fuel station to provide a fuel/fast charge station. For example, a fuel station having multiple fuel pumps or fuel/electric pumps can be provided on a different side (e.g. left side, right side, opposite side) of the store 36 to provide a fuel/fast charge station. Alternatively, the power heads 336 shown in FIG. 40 can be replaced with fuel/electric pumps 12 (FIG. 7) according to the present invention to provide the fuel/fast charge station.

The fast charge station 310 comprises a fast charge electric vehicle (EV) system 312 and a store 336, as shown in FIG. 40.

The fast charge electric vehicle (EV) system 312 comprises power heads 336, transformers 314, electric reservoirs 332, a trunk power line 364, and a power distribution box 382. For example, the fast charge electric vehicle (EV) system 312 comprises a plurality of power heads 336 (e.g. sixteen (16) power heads 336) arranged with four (4) power heads 336 in four (4) rows, a plurality of transformers 314 (e.g. four (4) transformers 314 with one (1) transformer 314 provided in each row), a plurality of electric reservoirs 332 (e.g. four (4) electric reservoirs 332 with one (1) electric reservoir 332 located in each row), a trunk power line 364 selectively connected to the transformers 314 and/or the electric reservoirs 332 for powering the fast charge electric vehicle (EV) system 312. One end of the trunk power line 364 extends into the power distribution box 382 and connect with power lines 240A, which connect to the electric power grid 240.

The power heads 336 can be configured to each charge at least one electric vehicle. Alternatively, the power heads 336 can be configured to charge multiple electric vehicles at the same time (e.g. power heads 336 each configured with two (2) EV chargers and respective charging cables to separately removably connect and charge at least two (2) electric vehicles each located on opposite sides of each power head 336 to allow for charging of at least thirty (32) electric vehicles at the same time at the fast charge station 310).

The transformers 314 and the electric reservoirs 322 are selectively or simultaneously connected to the trunk power line 364 to selectively or simultaneously power the transformer 314 and the electric reservoirs 322 from power supplied by the electric power grid 240. For example, a power controller or control system can be provided and connected to one or more power switches configured to control power being selectively or simultaneously supplied from the electric power grid 240 to the transformers 314 and the electric reservoirs 322. For example, the power controller or control system can be configured to selectively or simultaneously supply power to each of the power heads 336 (e.g. to turn on or turn off each power head 336).

The power heads 336 can each be provided with a battery or battery array (e.g. Li-ion battery or Li-ion battery array) the same or similar to that provided in the housing of the fuel/electric pump 12 (FIGS. 6-9) to provide another level of energy storage with each battery or battery array acting as an additional electric reservoir within each power head 336.

Fuel/charge Station or Fast Charge Station with Power Generator

The fuel/charge station or fast charge station according to the present invention, for example, can comprise one or more power generators (e.g. electric power generators). The one or more power generators, for example, can be one or more onsite power generators and/or one or more offsite power generators.

The one or more power generators, for example, can produce electrical energy and electrical power to provide an additional power source for charging electric vehicles and/or charging the one or more energy storage devices (e.g. electric reservoirs) used for charging the electric vehicles.

The three major categories of energy for electricity generation are fossil fuels (e.g. coal, natural gas, and petroleum), nuclear energy, and renewable energy sources. Most energy is generated with steam turbines using fossil fuels, nuclear, biomass, geothermal, solar thermal energy, and wind power.

The one or more power generators for use with the fuel/charge station or fast charge station according to the present invention, for example, can be provided by power generating equipment, fuel operated generators, electromechanical generators, hydroelectric generators, hydroelectric turbines, wind generators, wind turbines, solar generators, solar panels, geo-thermal power generator, power stations, and/or power plants (e.g. mobile, small-sized, medium-sized power stations or power plants located onsite or offsite relative to the fuel/charge station or fast charge station according to the present invention).

The one or more power generators, for example, can be operated when the power grid supplying power to the fuel/charge station is shut down, or when the power grid cannot provide sufficient power for the power demands of the fuel/charge station or the fast charge station according to the present invention, for example, when charging the one or more electric reservoirs and/or powering the EV chargers.

The one or more power generators allow for constructing and operating the fuel/charge station or the fast charge station according to the present invention for charging electric vehicles in areas or locations where electric power sources (e.g. the power grid) is limited, for example, in remote areas of a country or state (e.g. located along low density population or remote sections of state or interstate highways).

The ability to generate energy and power, and then store the energy at or near the fuel/charge station or the fast charge station according to the present invention provides for greater reliability and continuous 24/7 operation of the fuel/charge station or the fast charge station according to the present invention.

In the case of the fuel/charge station or the fast charge station, fuel such as gas, gasoline, petroleum, oil, diesel, bio-diesel, kerosene, petrol, natural gas, methane, propane, liquid propane, butane, alcohol, methanol, ethanol, coal gas, coal, hydrogen, biomass, wood, and other suitable fuels can be stored at the fuel/charge station or fast charge station according to the present invention. For example, the fuel can be stored at the fuel/charge station or fast charge station in containers (e.g. tanks, above ground tanks, below ground tanks, portable storage containers) and used for fueling or refueling vehicles. This stored fuel (e.g. same fuel for refueling vehicles (e.g. gasoline, diesel) or different fuel (e.g. liquid propane, hydrogen) can also be used for supplying the one or more power generators of the fuel/charge station or fast charge station according to the present invention.

A fast charge station 210 comprising a fast charge electric vehicle (EV) system 212 with a collective topography, a pad transformer 214 selectively connected to the electric power grid 240 via power switches 240A, 240B, a wind driven power generation system 290 via power switches 290A, 290B, and a photovoltaic power generation system 292 via power switches 292A, 292B, and a power control unit 244, is shown in FIG. 41.

The power control unit 244, for example, can be connected to the power switches 240A, 240B, 290A, 290B, 292A, 292B, and configured to selectively control power supply from the electric power grid 240, wind driven power generation system 290, and the photovoltaic power generation system 292 to the pad transformer 214 of the fast charge electric vehicle (EV) system 212. For example, the power control unit 244 and power switches 240A, 240B, 290A, 290B, 292A, 292B are configured to provide a power control system to selectively turn on or turn off one or more of the power switches 240A, 240B, 290A, 290B, 292A, 292B to connect one (1) power source, two (2) power sources, or three (3) power sources from the electric power grid 240, wind driven power generation system 290, and/or the photovoltaic power generation system 292 to the pad transformer 214 of the fast charge electric vehicle (EV) system 212. The power control unit 244, for example, can be programmable to control the power switches 240A, 240B, 290A, 290B, 292A, 292B based on the power demand and/or operational conditions of the fast charge station 210.

A fast charge station 310 comprising a fast charge electric vehicle (EV) system 312 with a distributed topography, a pad transformer 314 selectively connected to the electric power grid 340 via power switches 340A, 340B, a wind driven power generation system 390 via power switches 390A, 390B, and a photovoltaic power generation system 392 via power switches 392A, 392B, and a power control unit 344, is shown in FIG. 42.

The power control unit 344, for example, can be connected to the power switches 340A, 340B, 390A, 390B, 392A, 392B, and configured to selectively control power supply from the electric power grid 340, the wind driven power generation system 390, and the photovoltaic power generation system 392 to the pad transformer 314 of the fast charge electric vehicle (EV) system 312. For example, the power control unit 344 and power switches 340A, 340B, 390A, 390B, 392A, 392B are configured to provide a power control system to selectively turn on or turn off one or more of the power switches 340A, 340B, 390A, 390B, 392A, 392B to connect one (1) power source, two (2) power sources, or three (3) power sources from the electric power grid 340, the wind driven power generation system 390, and/or photovoltaic power generation system 392 to the pad transformer 314 of the fast charge electric vehicle (EV) system 312. The power control unit 344, for example, can be programmable to control the power switches 340A, 340B, 390A, 390B, 392A, 392B based on the power demand and/or operational conditions of the fast charge station 310. Alternatively, or in addition, solar thermal and concentrated solar type power generation systems can be added.

A fast charge station 410 comprising a fast charge electric vehicle (EV) system 412 with a collective AC/DC converter arrangement, is shown in FIG. 43. The fast charge electric vehicle (EV) system 412 is integrated into the fast charge station 410, as shown in FIG. 43.

The fast charge station 410 comprises a transformer 414 (e.g. pad transformer, PAD XFMR), an AC/DC converter 416; a fast charge controller 418; an input bus 420; an electric reservoir 422 with four (4) electric reservoir modules 422A, 422B, 422C, 422D; an output bus 424; a DC/DC converter 426; a by-pass power circuit 428; an EV charger 430; and an EV charge port 432 configured for charging an electric vehicle (EV) 434.

The fast charge station 410 comprises, or is selectively connected to a power source 440 (e.g. external power supply, electric power grid, 240 VAC 1-PHASE/208 VAC or 480 VAC 3-PHASE GRID via control switches 440A, 440B, as shown in FIG. 43, acting as a power source 440 for the fast charge station 410. The power source 440, for example, can include one or more additional external power sources, for example, a power source generated by wind power (e.g. wind driven power generation system), hydroelectric power (e.g. water wheel, water turbine), photovoltaic power generation system (e.g. solar panels), power generator (e.g. fuel powered generator), power plant, power station, or other types of offsite power sources.

The fast charge station 410 can further comprises an offsite power generator 480 and/or an onsite power generator 482 for supplying additional electric power to the fast charge station 410. The fast charge station 410 shown in FIG. 43, for example, can be provided with one or more fuel tanks (e.g. above ground fuel tank, below ground fuel tank, mobile fuel tank) for storing and supplying fuel to at least the onsite power generator 482.

The power supply 440 with power switches 440A, 440B, the offsite power generator 480 with power switches 480A, 4806, and/or the onsite power generator 482 with power switches 482A, 482B can be selectively connected individually or in various combinations to supply power to the transformer 414 by the power control unit 444. The transformer 414 is connected to and supplies power to the AC/DC converter 416 acting as an electric reservoir charger.

The AC/DC converter 416 is connected to and supplies power to the fast charger controller 418, which is connected to and supplies power (e.g. selectively or simultaneously) through the input bus 420 to the four (4) electric reservoir modules (e.g. battery modules 422A, 422B, 422C, 422D) of the electric reservoir 422 for charging the four (4) electric reservoir modules (e.g. battery modules 422A, 422B, 422C, 422D. The number of electric reservoir modules can be decreased or increased from the four (4) shown in FIG. 43 (e.g. 1, 2, 3, 4, 5, 6, 7, 8, 9, 10, 11+ electric reservoir modules).

The four (4) electric reservoir modules (e.g. battery modules 422A, 422B, 422C, 422D) of the electric reservoir 422 are connected to and supply power through the output bus 424 to the DC/DC converter 426. The output bus 424, for example, can selectively be supplied power from one or more of the four (4) electric reservoir modules (e.g. battery modules 422A, 422B, 422C, 422D).

The by-pass power circuit 428 is connected between the AC/DC converter 416 and the DC/DC converter 426 for by-passing the fast charger controller 418, the input bus 420, the four (4) electric reservoir modules 422A, 422B, 422C, 422D, and output bus 424 for supplying power directly from the AC/DC converter 416 to the DC/DC converter 426.

The DC/DC converter 426 is connected to and supplies power to the EV charger 430, which is connected to and supplies power to the EV charge port 432 configured for connecting to and charging or recharging the electric vehicle 434.

In the collective AC/DC converter arrangement 412, the AC/DC converter 416, for example, is a single stage AC/DC converter configured for selectively charging each of the electric reservoir modules 422A, 422B, 422C, 422D on demand. In addition to this on demand charge capability, a maximum rated power of the AC/DC converter 416 is available for direct charging of a battery pack of the electric vehicle 434 when operating in a by-pass mode.

A fast charge station 510 comprising a fast charge electric vehicle (EV) system 512 with a distributed AC/DC converter arrangement, is shown in FIG. 44. The fast charge electric vehicle (EV) system 512 is integrated into the fast charge station 510, as shown in FIG. 44.

The fast charge electric vehicle (EV) system 510 comprises a transformer 514 (e.g. pad transformer, PAD XFMR); four (4) AC/DC converters 516A, 516B, 516C, 516D; four (4) switches 518A, 518B, 518C, 518D (e.g. by-pass switches); input bus 520, an electric reservoir 522 with four (4) electric reservoir modules 522A, 522B, 522C, 522D); an output bus 524; a DC/DC converter 526; a by-pass power circuit 528; and EV/HEV charger 530; and a charge port 532 for charging an electric vehicle 534.

The fast charge electric vehicle (EV) system 510 comprises the power source 540, or is connected to the power supply 540 (e.g. external power supply, electric grid, for example, 240 VAC 1-PHASE/208 VAC or 480 VAC 3-PHASE GRID, as shown in FIG. 44, acting as a power supply for the fast charge electric vehicle (EV) system 510. The power supply 540, for example, can include one or more additional power supplies, for example, a power supply generated by wind power (e.g. wind driven power generation system), hydroelectric power, photovoltaic power generation system, power generator (e.g. fuel powered generator), or other types of power sources.

The fast charge station 510 can further comprises an offsite power generator 580 and/or an onsite power generator 582 for supplying additional electric power to the fast charge station 510. The fast charge station 510 shown in FIG. 44, for example, can be provided with one or more fuel tanks (e.g. above ground fuel tank, below ground fuel tank, mobile fuel tank) for storing and supplying fuel to at least the onsite power generator 582.

The power supply 540 with power switches 540A, 540B, the offsite power generator 580 with power switches 580A, 5806, and/or the onsite power generator 582 with power switches 582A, 582B can be selectively connected individually or in various combinations to supply power to the transformer 514 by the power control unit 544. The transformer 514 is connected to and supplies power to the AC/DC converter 516 acting as an electric reservoir charger.

The power supply 540 is connected to and supplies power to the transformer 514, which is connected to and supplies power to each of the four (4) AC/DC converters 516A, 516B, 516C, 516D acting as an electric reservoir charger.

The four (4) AC/DC converters 516A, 516B, 516C, 516D are connected to and supply power through the input bus 520 to the four (4) electric reservoir modules 522A, 522B, 522C, 522D of the electric reservoir 522 for charging the four (4) electric reservoir modules 522A, 522B, 522C, 522D.

The four (4) electric reservoirs 522A, 522B, 522C, 522D are connected to and supply power through the output bus 524 to the DC/DC converter 526. The output bus 524, for example, can selectively receive power from one or more of the four (4) electric reservoir modules (e.g. four (4) battery modules 522A, 522B, 522C, 522D).

A by-pass power circuit 528 is connected between the four (4) switches 518A, 5186, 518C, 518D and the DC/DC converter 524 for by-passing the four (4) electric reservoir modules 522A, 522B, 522C, 522D of the electric reservoir 522, and output bus 524 for supplying power directly from the four (4) AC/DC converters 516A, 516B, 516C, 516D to the DC/DC converter 526.

In the fast charge electric vehicle (EV) system 512 with distributed AC/DC converter arrangement, the AC/DC converters 516A, 516B, 516C, 516D, for example, are a multi-channel AC/DC converter or individual AC/DC converters appropriately rated to each of the electric reservoir modules 522A, 522B, 522C, 522D, and independently charge each of the electric reservoir modules 522A, 522B, 522C, 522D on demand. In addition to this on demand charge capability, either a single channel rated power of one or more of the AC/DC converters 516A, 516B, 516C, 516D is available for direct charging of the battery pack of the electric vehicle 534 when operating in a by-pass mode, or with added circuity and software, the collective output of all the individual AC/DC converters 516A, 516B, 516C, 516D may be blended at the DC/DC converter stage for maximum rated power available for direct charging of the battery pack of the electric vehicle 534 when operating in the by-pass mode.

It is noted that hybrid architectures of these two variants of the fast charge station 410 and 510 are possible with increased circuit complexity.

Figure 45:
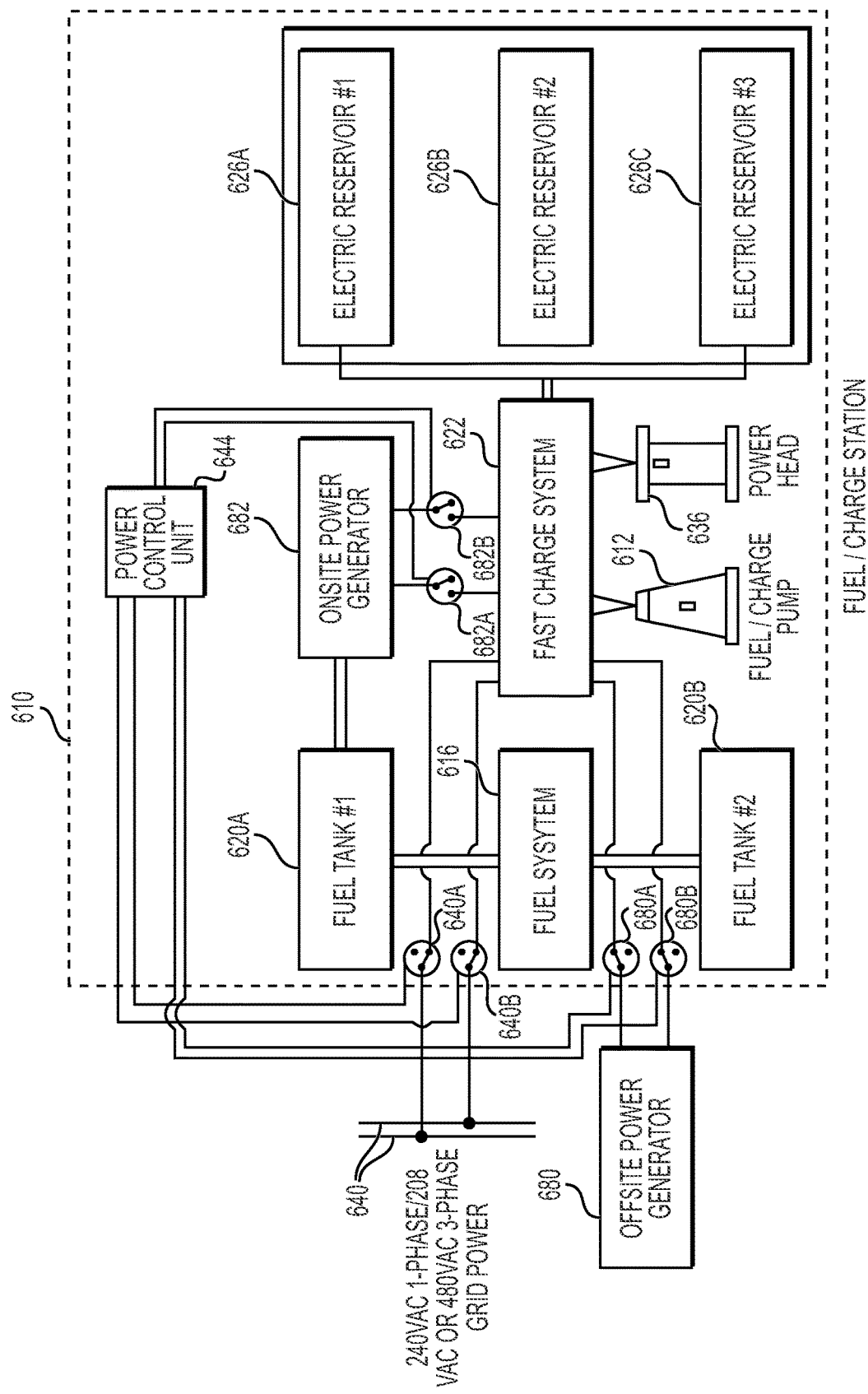
FIG. 45 is a diagrammatic view showing a fuel/charge system according to the present invention having one or more fuel tanks for fueling or refueling fuel type vehicles and providing fuel for the onsite power generator and/or offsite power generator.

A fuel/charge fast charge electric vehicle (EV) system 610 comprising one or more fuel/charge pumps 612 and one or more power heads 636, is shown in FIG. 45.

The one or more fuel/charge pumps 612 are connected to and supplied fuel by a fuel system 616 connected to fuel tank 620A (i.e. fuel tank #1) and fuel tank 620B (i.e. fuel tank #2).

The one or more power heads 636 are connected to, or part of the fast charge electric vehicle (EV) system 622 comprising electric reservoir 626A (i.e. electric reservoir #1), electric reservoir 626B (i.e. electric reservoir #2), and electric reservoir 626C (i.e. electric reservoir #3).

The fast charge electric vehicle (EV) system 622 is connected to and selectively receives electric power from the electric power grid 640, offsite power generator 680, and onsite power generator 682.

Clauses

1. An electric vehicle charging station for charging electric vehicles, the electric vehicle charging station comprising:
   one or more power sources supplying electric power to the electric vehicle charging station for charging the electric vehicles;
   one or more energy storage devices receiving and storing energy from the one or more power sources and/or the one or more power generators, the one or more energy storage devices each comprising multiple electric reservoir modules;
   one or more power heads for charging the electric vehicles at the electric vehicle charging station, the multiple power heads receiving electrical power from the one or more energy storage devices, the multiple power heads each being configured for releasably connecting to each of the electric vehicles for charging at the electric vehicle charging station; and
   one or more electric power source controls or control systems configured to control supplying power from the one or more power sources to the multiple electric reservoir modules of the one or more energy storage devices.

2. An electric vehicle charging station for charging electric vehicles at the electric vehicle charging station, the electric vehicle charging station comprising:
   one or more power sources for supplying electrical power to the electric vehicle charging station for charging the electric vehicles;
   one or more power generators supplying electric power to the electric vehicle charging station for charging the electric vehicles;
   one or more energy storage devices receiving and storing energy from the one or more power sources and/or the one or more power generators, the one or more energy storage devices each comprising multiple electric reservoir modules;
   multiple power heads for simultaneously charging multiple electric vehicles at the electric vehicle charging station, the multiple power heads receiving electrical power from the one or more power sources, the one or more power generators, and/or the one or more energy storage devices, the multiple power heads each being configured for releasably connecting to each of the multiple electric vehicles for charging at the electric vehicle charging station;
   one or more electric power source controls or electric power source control systems configured to control supplying power from the one or more power sources to the multiple electrical reservoirs of the one or more energy storage devices; and
   one or more electric reservoir controls or electric reservoir control systems configured to control supplying power from the multiple electrical reservoirs to the multiple power head.

3. An electric vehicle charging station for charging electric vehicles at the electric vehicle charging station, the electric vehicle charging station comprising:
   multiple power sources for supplying electrical power to the electric vehicle charging station for charging the electric vehicles;

one or more power generators supplying electric power to the electric vehicle charging station for charging the electric vehicles;

multiple energy storage devices located at or adjacent to the electric vehicle charging station for receiving and storing energy from the multiple power sources and/or the one or more power generators, the multiple energy storage devices each comprising multiple electric reservoir modules;

multiple power heads for simultaneously charging multiple electric vehicles at the electric vehicle charging station, the multiple power heads receiving electrical power from one or more of the multiple power sources and/or one or more of the multiple energy storage devices, the multiple power heads each being configured for releasably connecting to each of the electric vehicles for charging at the electric vehicle charging station;

one or more electric power source controls or electric power source control systems configured to control supplying power from the one or more of the multiple power sources to the multiple electric reservoir modules of one or more of the multiple energy storage devices; and one or more electric reservoir controls or electric reservoir control systems configured to control supplying power from the multiple electrical reservoirs to the multiple power heads.

4. The station according to any of the preceding clauses 1-3, further comprising one or more electric reservoir controls or control systems configured to control supplying power from the multiple electrical reservoirs to the one or more power heads.

5. The station according to any of the preceding clauses 1-4, wherein the electric vehicle power station is configured so that the one or more power heads receive electric power from the one or more power sources and/or the one or more energy storage devices.

6. The station according to any of the preceding clauses 1-5, wherein the electric vehicle charging station is configured to simultaneously charge multiple electric vehicles at the electric vehicle charging station at the same time.

7. The station according to any of the preceding clauses 1-6, wherein the one or more power heads is multiple power heads for simultaneously charging multiple electric vehicles at the electric vehicle charging station, the multiple power heads receiving electric power from the one or more power sources and/or the one or more energy storage devices, the multiple power heads each being configured for releasably connecting to each of the electric vehicles for charging at the electric vehicle charging station 8. The station according to any of the preceding clauses 1-7, further comprising one or more electrical power charging controls or systems configured to control supplying electric power from the multiple energy storage units of the one or more energy storage devices to the multiple electric vehicles being charged at the electric vehicle charging station.

9. The station according to any of the preceding clauses 1-8, wherein the one or more power sources comprises an electric power grid.

10. The station according to any of the preceding clauses 1-9, wherein the one or more power generators use fuel for operating the one or more power generators.

11. The station according to any of the preceding clauses 1-10, wherein the one or more power generators is located onsite the electric vehicle charging station.

12. The station according to any of the preceding clauses 1-11, wherein the one or more power generators is located offsite the electric vehicle charging station.

13. The station according to any of the preceding clauses 1-12, wherein the one or more energy storage devices is multiple energy storage devices.

14. The station according to any of the preceding clauses 1-13, wherein the one or more power heads is multiple power heads.

15. The station according to any of the preceding clauses 1-14, wherein the one or more electric controls or control systems is configured to control supplying power from multiple power sources to the multiple electric reservoir modules of the one or more energy storage devices.

16. The station according to any of the preceding clauses 1-15, including one or more electrical controls or systems configured to control supplying power from the one or more power sources to the multiple electric reservoir modules of the one or more energy storage devices.

17. The station according to any of the preceding clauses 1, including one or more electrical power charging controls or control systems configured to control supplying electrical power from the multiple electric reservoir modules of the one or more energy storage devices to multiple electric vehicles being charged at the electric vehicle charging station.

18. The station according to any of the preceding clauses 1, wherein the one or more power sources is multiple power sources.

19. The station according to clause 18, including one or more electrical controls or control systems configured to control supplying power from the multiple power sources to the multiple electric reservoir modules of the one or more energy storage devices.

20. The station according to clause 19, wherein the one or more electrical controls or systems is configured to charge the multiple energy storage units in a sequence.

21. The station according to clause 19, wherein the one or more electrical controls or systems is configured to circle to repeat the sequence one or more times.

22. The station according to any of the preceding clauses 1-21, further comprising a fast charge electric vehicle (EV) system with a collective AC/DC converter arrangement.

23. The station according to clause 22, wherein the fast charge electric vehicle (EV) system with the collective AC/DC converter arrangement comprises:

a transformer;

an AC/DC converter connected to and receiving electrical power from the transformer;

a fast charge controller connected to and receiving electrical power from the AC/DC converter;

an input bus connected to and receiving electrical power from the fast charge controller;

an electric reservoir with multiple electric reservoir modules connected to and receiving electrical power from the input bus;

an output bus connected to an receiving electrical power from the multiple reservoir modules;

a DC/DC converter connected to and receiving electrical power from the output bus;

an EV charger connected to and receiving power from the DC/DC converter; and an EV charge port connected to and receiving power from the EV charger, the EV charge port configured for charging the one or more electric vehicles.

24. The station according to clause 23, further comprising a by-pass power circuit connecting the AC/DC converter to the DC/DC converter.
25. The station according to any of the preceding clauses 1-24, further comprising a fast charge electric vehicle (EV) system with a distributed AC/DC converter arrangement.
26. The station according to clause 25, wherein the fast charge electric vehicle (EV) system with the distributed AC/DC converter arrangement comprises:
 a transformer;
 multiple AC/DC converters connected to and receiving power from the transformer;
 multiple switches each connected to and receiving power from the respective multiple AC/DC converters (e.g. by-pass switches);
 an input bus connected to and receiving power from the multiple switches;
 an electric reservoir with multiple electric reservoir modules connected to and receiving power from the input bus;
 an output bus connected to and receiving power from the multiple electric reservoir modules of the electric reservoir;
 a DC/DC converter connected to and receiving power from the output bus;
 an EV/HEV charger connected to and receiving power from the DC/DC converter; and
 a charge port connected to and receiving power from the EV/HEV charger, the charge port configured for charging the one or more electric vehicles.
27. The station according to clause 26, including a by-pass power circuit connecting the multiple switches to the DC/DC converter.
28. The station according to any of the preceding clauses 1-27, further comprising one or more power generators supplying electric power to the electric vehicle charging station for charging the electric vehicles.
29. The station according to clause 28, wherein the one or more energy storage devices receives and stores energy from the one or more power sources and/or the one or more power generators.
30. The station according to clause 29, wherein the one or more energy storage devices each comprise multiple electric reservoir modules.

The invention claimed is:
1. An electric vehicle charging station for charging electric vehicles, the electric vehicle charging station comprising:
 one or more power sources supplying electric power to the electric vehicle charging station for charging the electric vehicles;
 one or more power generators supplying electric power to the electric vehicle charging station for charging the electric vehicles;
 one or more energy storage devices receiving and storing energy from the one or more power sources and/or the one or more power generators, the one or more energy storage devices each comprising multiple electric reservoir modules;
 one or more power heads for charging the electric vehicles at the electric vehicle charging station, the multiple power heads receiving electrical power from the one or more energy storage devices, the multiple power heads each being configured for releasably connecting to each of the electric vehicles for charging at the electric vehicle charging station;
 a computer control system configured to monitor a charging demand at each of the one or more power heads and to connect one or more of the multiple electric reservoir modules to one or more of the power heads based on the charging demand of the one or more power heads; and
 one or more electric power source controls or control systems configured to control supplying power from the one or more power sources to the multiple electric reservoir modules of the one or more energy storage devices.

2. An electric vehicle charging station for charging electric vehicles at the electric vehicle charging station, the electric vehicle charging station comprising:
 one or more power sources for supplying electrical power to the electric vehicle charging station for charging the electric vehicles;
 one or more power generators supplying electric power to the electric vehicle charging station for charging the electric vehicles;
 one or more energy storage devices receiving and storing energy from the one or more power sources and/or the one or more power generators, the one or more energy storage devices each comprising multiple electric reservoir modules;
 multiple power heads for simultaneously charging multiple electric vehicles at the electric vehicle charging station, the multiple power heads receiving electrical power from the one or more power sources, the one or more power generators, and/or the one or more energy storage devices, the multiple power heads each being configured for releasably connecting to each of the multiple electric vehicles for charging at the electric vehicle charging station;
 a computer control system configured to monitor a charging demand at each of the one or more power heads and to connect one or more of the multiple electric reservoir modules to one or more of the power heads at programmed times; and
 one or more electric power source controls or electric power source control systems configured to control supplying power from the one or more power sources to the multiple electrical reservoirs of the one or more energy storage devices; and one or more electric reservoir controls or electric reservoir control systems configured to control supplying power from the multiple electrical reservoirs to the multiple power head.

3. An electric vehicle charging station for charging electric vehicles at the electric vehicle charging station, the electric vehicle charging station comprising:
 multiple power sources for supplying electrical power to the electric vehicle charging station for charging the electric vehicles;
 one or more power generators supplying electric power to the electric vehicle charging station for charging the electric vehicles;
 multiple energy storage devices located at or adjacent to the electric vehicle charging station for receiving and storing energy from the multiple power sources and/or the one or more power generators, the multiple energy storage devices each comprising multiple electric reservoir modules;
 multiple power heads for simultaneously charging multiple electric vehicles at the electric vehicle charging station, the multiple power heads receiving electrical power from one or more of the multiple power sources and/or one or more of the multiple energy storage devices, the multiple power heads each being configured for releasably connecting to each of the electric vehicles for charging at the electric vehicle charging station;

one or more electric power source controls or electric power source control systems configured to control supplying power from the one or more of the multiple power sources to the multiple electric reservoir modules of one or more of the multiple energy storage devices;

a computer control system configured to monitor a charging demand at each of the one or more power heads and to connect or disconnect one or more of the multiple electric reservoir modules to one or more of the power heads at programmed times; and one or more electric reservoir controls or electric reservoir control systems configured to control supplying power from the multiple electrical reservoirs to the multiple power heads.

4. The station according to claim 1, further comprising one or more electric reservoir controls or control systems configured to control supplying power from the multiple electrical reservoirs to the one or more power heads.

5. The station according to claim 1, wherein the electric vehicle power station is configured so that the one or more power heads receive electric power from the one or more power sources and/or the one or more energy storage devices.

6. The station according to claim 1, wherein the electric vehicle charging station is configured to simultaneously charge multiple electric vehicles at the electric vehicle charging station at the same time.

7. The station according to claim 6, wherein the one or more power heads is multiple power heads for simultaneously charging multiple electric vehicles at the electric vehicle charging station, the multiple power heads receiving electric power from the one or more power sources and/or the one or more energy storage devices, the multiple power heads each being configured for releasably connecting to each of the electric vehicles for charging at the electric vehicle charging station.

8. The station according to claim 1, further comprising one or more electrical power charging controls or systems configured to control supplying electric power from the multiple energy storage units of the one or more energy storage devices to the multiple electric vehicles being charged at the electric vehicle charging station.

9. The station according to claim 1, wherein the one or more power sources comprises an electric power grid.

10. The station according to claim 1, wherein the one or more power generators use fuel for operating the one or more power generators.

11. The station according to claim 1, wherein the one or more power generators is located onsite the electric vehicle charging station.

12. The station according to claim 1, wherein the one or more power generators is located offsite the electric vehicle charging station.

13. The station according to claim 1, wherein the one or more energy storage devices is multiple energy storage devices.

14. The station according to claim 1, wherein the one or more power heads is multiple power heads.

15. The station according to claim 14, wherein the one or more electric controls or control systems is configured to control supplying power from multiple power sources to the multiple electric reservoir modules of the one or more energy storage devices.

16. The station according to claim 1, including one or more electrical controls or systems configured to control supplying power from the one or more power sources to the multiple electric reservoir modules of the one or more energy storage devices.

17. The station according to claim 1, including one or more electrical power charging controls or control systems configured to control supplying electrical power from the multiple electric reservoir modules of the one or more energy storage devices to multiple electric vehicles being charged at the electric vehicle charging station.

18. The station according to claim 1, wherein the one or more power sources is multiple power sources.

19. The station according to claim 18, including one or more electrical controls or control systems configured to control supplying power from the multiple power sources to the multiple electric reservoir modules of the one or more energy storage devices.

20. The station according to claim 19, wherein the one or more electrical controls or systems is configured to charge the multiple energy storage units in a sequence.

21. The station according to claim 19, wherein the one or more electrical controls or systems is configured to circle to repeat the sequence one or more times.

22. The station according to claim 1, further comprising a fast charge electric vehicle (EV) system with a collective AC/DC converter arrangement.

23. The station according to claim 22, wherein the fast charge electric vehicle (EV) system with the collective AC/DC converter arrangement comprises:
a transformer;
an AC/DC converter connected to and receiving electrical power from the transformer;
a fast charge controller connected to and receiving electrical power from the AC/DC converter;
an input bus connected to and receiving electrical power from the fast charge controller;
an electric reservoir with multiple electric reservoir modules connected to and receiving electrical power from the input bus;
an output bus connected to an receiving electrical power from the multiple reservoir modules;
a DC/DC converter connected to and receiving electrical power from the output bus;
an EV charger connected to and receiving power from the DC/DC converter; and
an EV charge port connected to and receiving power from the EV charger, the EV charge port configured for charging the one or more electric vehicles.

24. The station according to claim 23, further comprising a by-pass power circuit connecting the AC/DC converter to the DC/DC converter.

25. The station according to claim 1, further comprising a fast charge electric vehicle (EV) system with a distributed AC/DC converter arrangement.

26. The station according to claim 21, wherein the fast charge electric vehicle (EV) system with the distributed AC/DC converter arrangement comprises:
a transformer;
multiple AC/DC converters connected to and receiving power from the transformer;
multiple switches each connected to and receiving power from the respective multiple AC/DC converters (e.g. by-pass switches);

an input bus connected to and receiving power from the multiple switches;
an electric reservoir with multiple electric reservoir modules connected to and receiving power from the input bus;
an output bus connected to and receiving power from the multiple electric reservoir modules of the electric reservoir;
a DC/DC converter connected to and receiving power from the output bus;
an EV/HEV charger connected to and receiving power from the DC/DC converter; and
a charge port connected to and receiving power from the EV/HEV charger, the charge port configured for charging the one or more electric vehicles.

27. The station according to claim 26, including a by-pass power circuit connecting the multiple switches to the DC/DC converter.

28. The station according to claim 1, wherein the charging demand is based on an amount of electrical power provided by each of the one or more power heads.

29. The station according to claim 2, wherein the charging demand is based on an amount of electrical power provided by each of the one or more power heads.

30. The station according to claim 3, wherein the charging demand is based on an amount of electrical power provided by each of the one or more power heads.

* * * * *